(12) United States Patent
Hoyt

(10) Patent No.: US 11,228,115 B2
(45) Date of Patent: Jan. 18, 2022

(54) METHODS AND APPARATUS FOR MANUFACTURE AND IN-SPACE ASSEMBLY OF ANTENNAS

(71) Applicant: Tethers Unlimited Inc., Bothell, WA (US)

(72) Inventor: Robert Hoyt, Bothell, WA (US)

(73) Assignee: Tethers Unlimited Inc., Bothell, WA (US)

( * ) Notice: Subject to any disclaimer, the term of this patent is extended or adjusted under 35 U.S.C. 154(b) by 773 days.

(21) Appl. No.: 16/069,510

(22) PCT Filed: Jan. 11, 2017

(86) PCT No.: PCT/US2017/013076
§ 371 (c)(1),
(2) Date: Jul. 11, 2018

(87) PCT Pub. No.: WO2017/123677
PCT Pub. Date: Jul. 20, 2017

(65) Prior Publication Data
US 2019/0027835 A1 Jan. 24, 2019

Related U.S. Application Data

(60) Provisional application No. 62/277,157, filed on Jan. 11, 2016.

(51) Int. Cl.
*H01Q 21/00* (2006.01)
*H01Q 1/28* (2006.01)
(Continued)

(52) U.S. Cl.
CPC ........... *H01Q 21/0087* (2013.01); *B64G 1/66* (2013.01); *H01Q 1/288* (2013.01); *H01Q 3/2658* (2013.01);
(Continued)

(58) Field of Classification Search
CPC .. H01Q 1/288; H01Q 3/2658; H01Q 21/0087; H01Q 19/19; B64G 1/66
See application file for complete search history.

(56) References Cited

U.S. PATENT DOCUMENTS 6,229,501 B1 * 5/2001 Roth ..................... B64G 1/66
343/912
6,491,256 B1 * 12/2002 Wingo ................... B64G 1/002
244/118.1

(Continued)

OTHER PUBLICATIONS

Rhodes, Marvin D., "Baseline Tests of an Autonomous Telerobotic System for Assembly of Space Truss Structures". NASA Technical Paper 3448. Jul. 1994. (Year: 1994).*

*Primary Examiner* — Andrea Lindgren Baltzell
*Assistant Examiner* — Amal Patel
(74) *Attorney, Agent, or Firm* — Arthur M. Dula

(57) ABSTRACT

Apparatus for Manufacture and In-Space Assembly of Antennas comprising: a prefabricated primary reflector center section; a trusselator truss assembler; a phased feed array; wherein said prefabricated reflector center section, trusselator, and phased feed array are fixedly connected to one another; a self-positioning and orienting tool; a truss extending from said trusselator; a secondary reflector attached to said truss; robotic arms; a nibbler end effector mounted on one of said robotic arms; a grapple end effector mounted on one of said robotic arms; a mold for casting a piece of a primary reflector; a power cube; a solar array providing power to said power cube; refabricator plus; and an ESPA ring.

1 Claim, 48 Drawing Sheets

(51) Int. Cl.
  *H04Q 1/00*   (2006.01)
  *H01Q 19/17*  (2006.01)
  *H01Q 3/46*   (2006.01)
  *H01Q 19/10*  (2006.01)
  *H01Q 25/00*  (2006.01)
  *H01Q 19/185* (2006.01)
  *B64G 1/66*   (2006.01)
  *H01Q 3/26*   (2006.01)
  *H01Q 19/19*  (2006.01)
  *H01Q 15/14*  (2006.01)

(52) U.S. Cl.
  CPC .............. *H01Q 3/46* (2013.01); *H01Q 15/141* (2013.01); *H01Q 19/104* (2013.01); *H01Q 19/17* (2013.01); *H01Q 19/185* (2013.01); *H01Q 19/19* (2013.01); *H01Q 25/007* (2013.01); *H04Q 1/00* (2013.01)

(56) References Cited

U.S. PATENT DOCUMENTS

| | | | |
|---|---|---|---|
| 10,730,643 B1* | 8/2020 | Zils | B64G 1/222 |
| 2014/0139386 A1* | 5/2014 | Liu | H04B 1/40 |
| | | | 343/781 CA |

* cited by examiner

Figure 6 - Phases of Operation, Tasks Performed, and Subsystems Used During rbWeaver Operation.

• = Center Grapple Locations

Figure 12
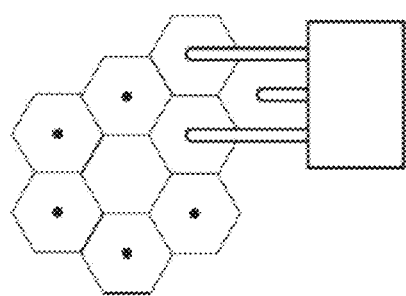 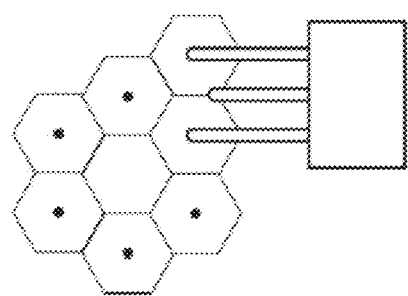
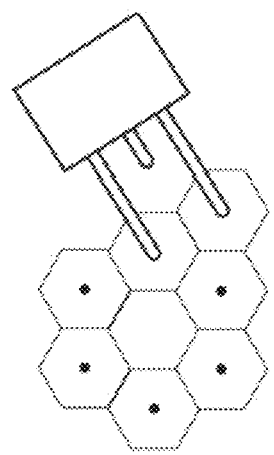 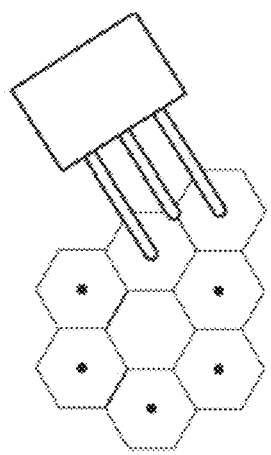

METHODS AND APPARATUS FOR MANUFACTURE AND IN-SPACE ASSEMBLY OF ANTENNAS

This application is a 371 of international PCT/US17/13076 which claims the benefit of provisional application No. 62/277,157 filed on 11 Jan. 2016 and incorporates application No. 62/277,157 by reference. Application Ser. No. 14/553,970 is also hereby incorporated by reference.

Certain antenna assembly apparatus embodiments are referred to hereafter as OrbWeaver. An OrbWeaver 10 embodiment can provide affordable, resilient SATCOM capabilities by recycling a space debris object, such as an unmodified ESPA ring 20, on-orbit to form a large aperture phased array 210 capable of providing high-bandwidth SATCOM services to K-band VSAT terminals on the ground. An OrbWeaver system 10 in accordance with an embodiment integrates novel technologies for in-space recycling, in-space manufacturing, and in-space assembly, all of which have been prototyped to at least the proof-of-concept level and several of which are in process for flight demonstrations. Feasibility studies have developed detailed concept-of-operations for all phases of the repurposing of an ESPA ring 20 and in-space assembly of the SATCOM satellite. The phased array system design was developed through de-tailed end-to-end analyses of RF system performance. In addition to the DoD-relevant VSAT communications application, OrbWeaver systems 10 also enable affordable construction of novel SATCOM systems, such as Direct-To-Smartphone Broadband satellites. OrbWeaver's 10 in-space recycling technologies also enable a viable path to commercially supported remediation of the space debris environment. An OrbWeaver 10 embodiment can provide a cost-leverage deterrent against present threats to DoD-critical SATCOM systems by enabling any launch using an ESPA ring 20 to place on orbit a system able to responsively transform a nondescript 'space debris' object into a tactically-relevant SATCOM asset.

BACKGROUND

OrbWeaver 10 embodiments address both the DoD's needs for affordable, resilient broadband satellite communications (SATCOM) capabilities as well as a commercial market opportunity for 'Direct-To-Smartphone Broadband' (DTSB) data services.

Our nation's tactical and strategic operations are highly reliant upon SATCOM services. At present, these services are provided primarily by a handful of government SAT-COM and leased commercial SATCOM satellites located in geosynchronous orbit (GEO), most of which are highly subscribed with little surge capacity. These GEO SATCOM satellites are now vulnerable to adversarial anti-satellite capabilities. There is, therefore, a critical need for capabilities to rapidly and affordably reconstitute or augment these SAT-COM services in order to provide system resiliency as well as to serve as deterrents to any adversarial action against existing assets.

In the commercial sector, there is currently significant interest and investment in developing constellations of low Earth orbit (LEO) communications satellites to provide broadband data services to customers that are underserved by existing terrestrial cable and wireless data services (e.g. OneWeb and SpaceX constellation), as well as to provide low-latency communications links (e.g. BridgeSat, LeoSat, SkyFi) for financial markets. A key limitation of all the broadband constellations under development is that they rely upon traditional fixed or deployable antennas on the satellites, which are limited in gain due to size and cost constraints. As a result, closing the link to the LEO satellite requires a bulky and expensive satellite terminal or 'hotspot' on the ground. This requirement limits the potential market of these services to customers able to afford costs of the 'hotspot' antenna. If, however, the satellite side of the system had sufficient gain to close the data link directly to an unmodified mobile device, the potential market of such a system could be every smartphone user on the planet, a market size expected to exceed 2.5 billion customers by 2018.

After several decades of stagnancy and contraction, the Space Industry is currently experiencing a reinvigoration as the rapid advance of small satellite capabilities has enabled commercial and government organizations to affordably and incrementally develop ventures that previously required massive up-front investments. Nonetheless, the Space Industry is still constrained by a Space Manufacturing Supply Chain (SMSC) that evolved out of the early aircraft supply chain and has remained largely unevolved for the six decades of the Space Age. The structure and costs of the traditional supply chain have always been dominated by the laws of gravity, which drive the high costs and high risks of "getting out of the gravity well."

Up until now, the only means to deploy space systems has been to build them in factories here on Earth, at the bottom of the gravity well, and then blast them into space on a rocket. Despite more than a trillion dollars in cumulative global investment in rocket and missile technologies, this remains an incredibly expensive and highly risky endeavor. The design labor, hardware mass, and testing required to ensure spacecraft operate reliably after experiencing ten minutes of abuse during launch are a dominant driver of the high life-cycle costs and many-year schedules of most space systems. As a result, a large fraction of the engineering cost, launch mass, and schedule of space systems is required exclusively to ensure the system survives the stress and abuse of launch. This is particularly true for systems with physically large components, such as antennas, booms, and panels, which must be designed to stow for launch and then deploy reliably on orbit. Even with such investments, such deployments do not always succeed, resulting in loss or substantially degraded performance of the satellite.

Furthermore, the need to transport fully-integrated satellites also places severe constraints on the kinds of systems that government and commercial space users can employ. The performance of space systems is largely determined by the sizes of their antennas, solar panels, optics, and other key apertures, and the sizes of these apertures are limited by the traditional SMSC's requirement to stow them within available launch fairings. Current deployable technologies, such as unfurlable antennas, coilable booms, and deployable solar panels enable apertures, baselines, and arrays of up to several dozen meters to be stowed within existing launch shrouds. However, the costs and risks of these components scale very quickly with increased size, driven by the complexity of the mechanisms required to enable them to fold up within the available volume as well as the extensive testing necessary to ensure they deploy reliably on orbit. As a result, aperture sizes significantly beyond 25 meters are generally not feasible or affordable with current technologies, and the high costs of deployable antennas are one of the dominant cost drivers for many SATCOM systems.

BRIEF DESCRIPTION OF THE DRAWINGS

FIG. 12 shows a process to add a new reflector section during assembly of the reflector in accordance with an embodiment.

DESCRIPTION

Figure 1:
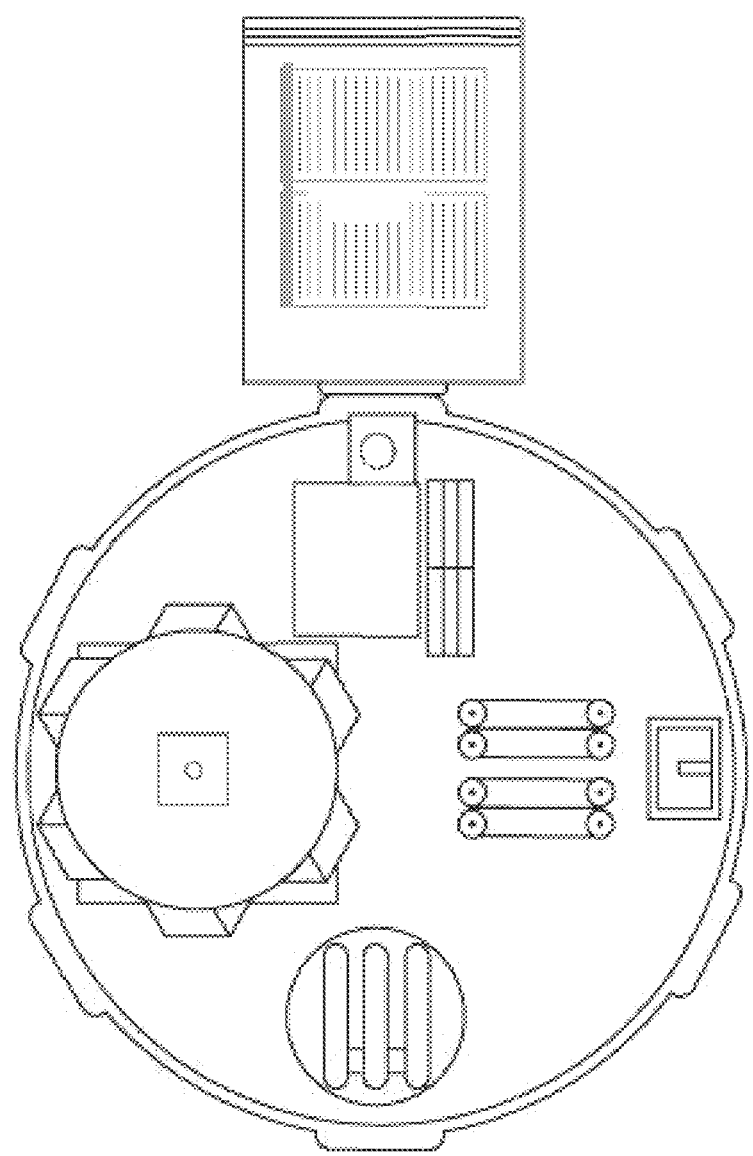
FIG. 1 shows an OrbWeaver embodiment in its launch configuration.
Figure 2:
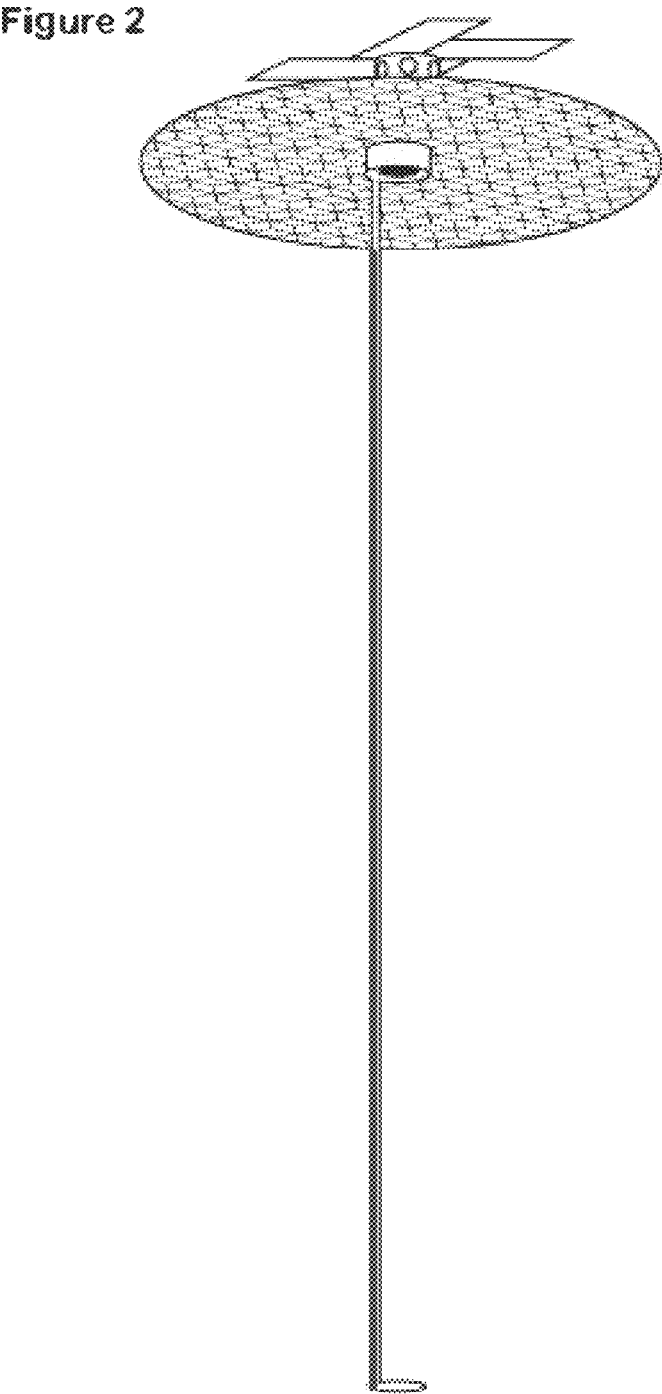
FIG. 2 shows System constructed by OrbWeaver to provide Ka-band SATCOM to VSAT terminals in accordance with an embodiment.

Technology and process advances over the last three decades have enabled significant transformations in the supply chains serving many industries, producing significant gains in productivity and efficiency. Key elements of those transformations have been: repositioning manufacturing and distribution closer to the point of use to reduce transportation costs and risks as well as to increase design options; introducing new technologies such as robotics to improve productivity and reduce manufacturing times; and sourcing supplies locally.

Certain embodiments are methods of In-Space Manufacturing (ISM). The essence of In-Space Manufacturing is shifting significant elements of the supply chain out of the gravity well to low Earth orbit (LEO) and beyond, thereby avoiding many of the costs, risks, and constraints of the traditional SMSC.

The value proposition and benefits of In-Space Manufacturing—lower costs, lower launch risks, faster time to deployment, larger and higher-performance components such as RE apertures, increased operating life, and greater ROI—accrue from the differences between terrestrial manufacturing within the current SMSC and on-orbit manufacturing:

ISM reduces the mass and weight of a total system because the design of systems can be optimized for the microgravity loads of space, not the multiple Gs of vibration and shocks they must survive during launch. Furthermore, the 'parasitic mass' of hinges, latches, and other mechanisms required for deployment can in most cases be eliminated;

ISM eliminates the size constraints imposed by the necessity of folding and fitting a system into a launch shroud. The best examples of this are antenna sizes. Bandwidth, resolution, and sensitivity are generally proportional to the size of a system's antenna, and current antennas are limited to what can be built to fold up in a launch shroud. For example, typical GEO K-band communications satellites are currently limited to deploying four 2.6 m antennas. ISM of antennas could enable these systems to support 8 or more 4+m antennas, allowing the satellite to re-use its frequency allocation across twice as many smaller beam footprints, effectively doubling the revenue-generating capacity of the satellite;

ISM reduces the volume of space required for a system on a launch vehicle, enabling the use of smaller, less expensive launch vehicles or launch of many more systems on a large vehicle;

ISM enables many high-value components for a large space system to be separated and launched using several flights of a small rocket, rather than a single launch of a large rocket. This enables ISM to take advantage of the dramatic cost savings enabled by frequent flight of small reusable launch systems;

ISM reduces the complexity of the system that must survive launch stresses. For example, rather than needing a delicate, folded antenna to survive launch stresses and then successfully unfold, ISM enables launching compact and durable packages of raw material such as carbon fiber and metal wire and then process these materials into large antennas and other components;

ISM reduces the amount of time, budget, and infrastructure spent on testing a system's ability to survive launch stresses;

ISM will dramatically reduce launch insurance premiums by moving the launch risk event before the costs associated with manufacture, integration, and validation;

ISM tools also enable on-orbit servicing and repair to extend operational lifetimes and ROI of satellites. Capability for repair and adjustment will provide transformational benefits to space users, dramatically reducing risks associated with design flaws, component failures, and micrometeorite impacts, and enabling responsive reconfiguration for changing mission needs.

ISM also enables use of "Orbital In-Situ Resources"—the material available in spent upper stages, interstage rings, ESPA adapters and defunct satellites that otherwise would contribute to the space debris population. Technologies that enable profitable re-purposing of such 'space waste' could enable the space debris problem and the impending "Kessler Syndrome" to be addressed by self-supporting commercial endeavors rather than by relying upon the creation of a multi-billion dollar government "superfund" cleanup program.

OrbWeaver 10 embodiments advance the maturity of key technologies for in-space recycling, in-space manufacturing, and in-space assembly. While the scale of the RF aperture created by the proposed OrbWeaver 10 system described below is modest and within the capabilities of current deployable antenna technologies, the ISM approach has potential for not only enabling significant cost reductions for creating resilient SATCOM capabilities but also scaling to aperture sizes not realizable with current deployable technologies. For the K-band frequencies of interest for future tactical SATCOM, current state of the art deployable antenna solutions have very high recurring costs, on the order of \$500K/$m^2$, with total costs scaling very rapidly with increased aperture diameter. The OrbWeaver's ISM approach has the potential to create high-precision antennas with costs nearly independent of antenna size, enabling significant reductions in recurring costs for large-aperture systems.

Figure 3:
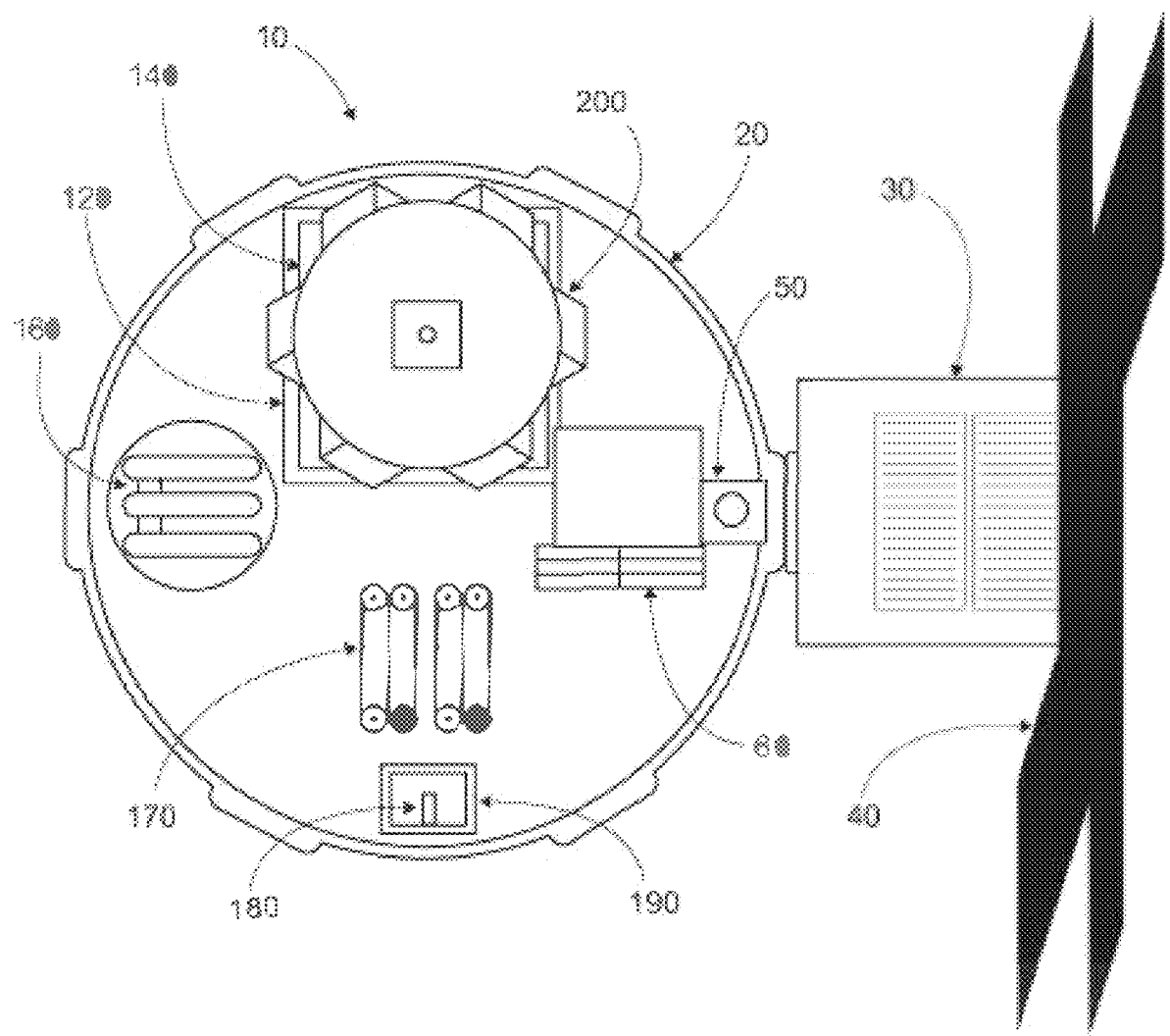
FIG. 3 shows OrbWeaver Subsystems in accordance with an embodiment.

OrbWeaver systems comprise methods and apparatus for repurposing components of launch systems to affordably and responsively create large phased-array communications systems. An example OrbWeaver system deconstructs a standard aluminum ESPA ring 20 to create a 3.5 m diameter K/Ka-band antenna 100. The subsystems required for this deconstruction and reconstruction process are shown in FIG. 3. Most of the system, including the recycling, manufacturing, and assembly subsystems 90, can occupy the center section of the ESPA ring 20, which is unused volume in a typical launch configuration. The only resource external to the ESPA ring 20 that is required is the PowerCube 30, a smallsat bus providing attitude control, C&DH, TT&C, and power via a deployable "SunMill" solar array 40 that generates approximately 2 kW of electrical power.

Re-Purposing Approach: An example OrbWeaver 10 embodiment enables recycling of launch system components, such as ESPA rings 20 and rocket shrouds, into feedstock for in-space manufacturing processes without requiring design changes to those components. This approach, rather than designing a custom ESPA ring 20 optimized for recycling, eliminates costs and schedule impacts associated with re-design and re-qualification of the adapter as well as to makes an embodiment applicable to recycling existing space debris objects. To accomplish this recycling, an OrbWeaver system 10 integrates robotic tools for de-constructing the aluminum structure of an ESPA ring 20 into small pieces 80—without generating any debris. This embodiment's upgraded recycling system, called the "Refabricator-Plus" 50, will melt the aluminum pieces 80, filter out 'impurities' such as stainless steel inserts, and deliver the molten aluminum to this embodiment's "Hexcaster 60" casting subsystem that casts hexagonal reflector segments. This embodiment's robotic manipulation and attachment subsystems 90 will then integrate these hexagonal segments to create large-aperture phased array antennas 100 to support Tactical SATCOM and DTSB services. Phased Array Design Approach: An OrbWeaver system 10 can create an antenna system that uses a hybrid ReflectArray-Cassegrain configuration. An example OrbWeaver ISM system 10 can create a 3.5 m diameter, 12 m radius-of-curvature spherical primary reflector 110, and this spherical reflector can be driven by a compact phased array feed 120. An adjustable reflectarray subreflector 130 provides correction of spherical aberration on the beam. The subreflector 130 is deployed below the primary reflector 110 using a "Trusselator 140" device that manufactures an 8.35 m composite truss 150 in between the primary reflector 110 and subreflector 130.

Design drivers include:

In comparison to a 'traditional' large, flat-panel phased array antenna, the hybrid ReflectArray-Casse-grain reflector configuration can be constructed within 2-3 years, not the decade predicted for flat-panel phased array systems to mature, and achieve comparable multi-beam and beam-steering capabilities with significantly lower system complexity, lower power, lower part count, and dramatically lower non-recurring costs.

Flat-panel phased array antennas generate numerous side-lobes that can cause significant problems with interference between adjacent satellites in a constellation. The ReflectArray-Cassegrain configuration mitigates this side-lobe issue.

Use of a spherical primary reflector 110, rather than a parabolic reflector, enables all of the hexagonal segments to be identical, enabling a single, relatively simple casting tool 60 to produce all of the pieces 80 of the reflector 110. In other embodiments, the Hexcaster 60 can be augmented with additive manufacturing processes or subtractive processes to vary the shaping of each segment to enable creation of more complex reflector geometries such as offset, shaped-beam parabolic reflectors. Additionally, use of a spherical reflector 110 improves the beam quality at high steering angles.

In-space manufacturing of the long truss 150 supporting the reflectarray 130 enables the primary reflector to have a large radius of curvature. This large radius of curvature results in very small spherical surface deviations from the ideal parabola [Section 1.6.2], and the resulting spherical aberration is readily corrected by a reflectarray subreflector 130. The large radius of curvature also minimizes polarization losses in the beam, providing more bits of throughput per Mhz of bandwidth allocation than a traditional short radius antenna.

Constructible Antenna Reflector Assembly Process

Figure 4:
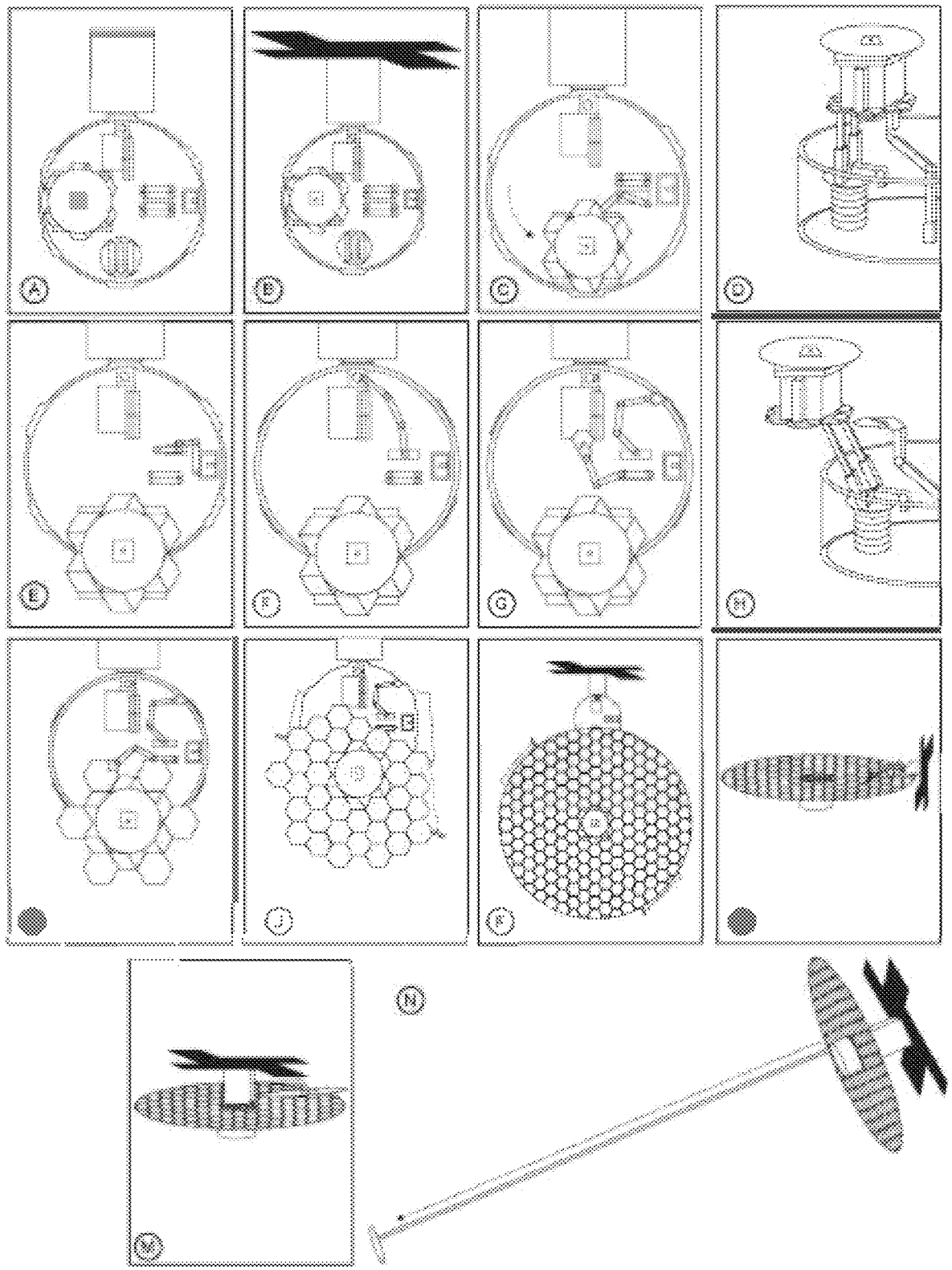
FIG. 4 shows OrbWeaver CONOPS for Recycling ESPA into a Large Phased Array SATCOM System in accordance with an embodiment.
Figure 5:
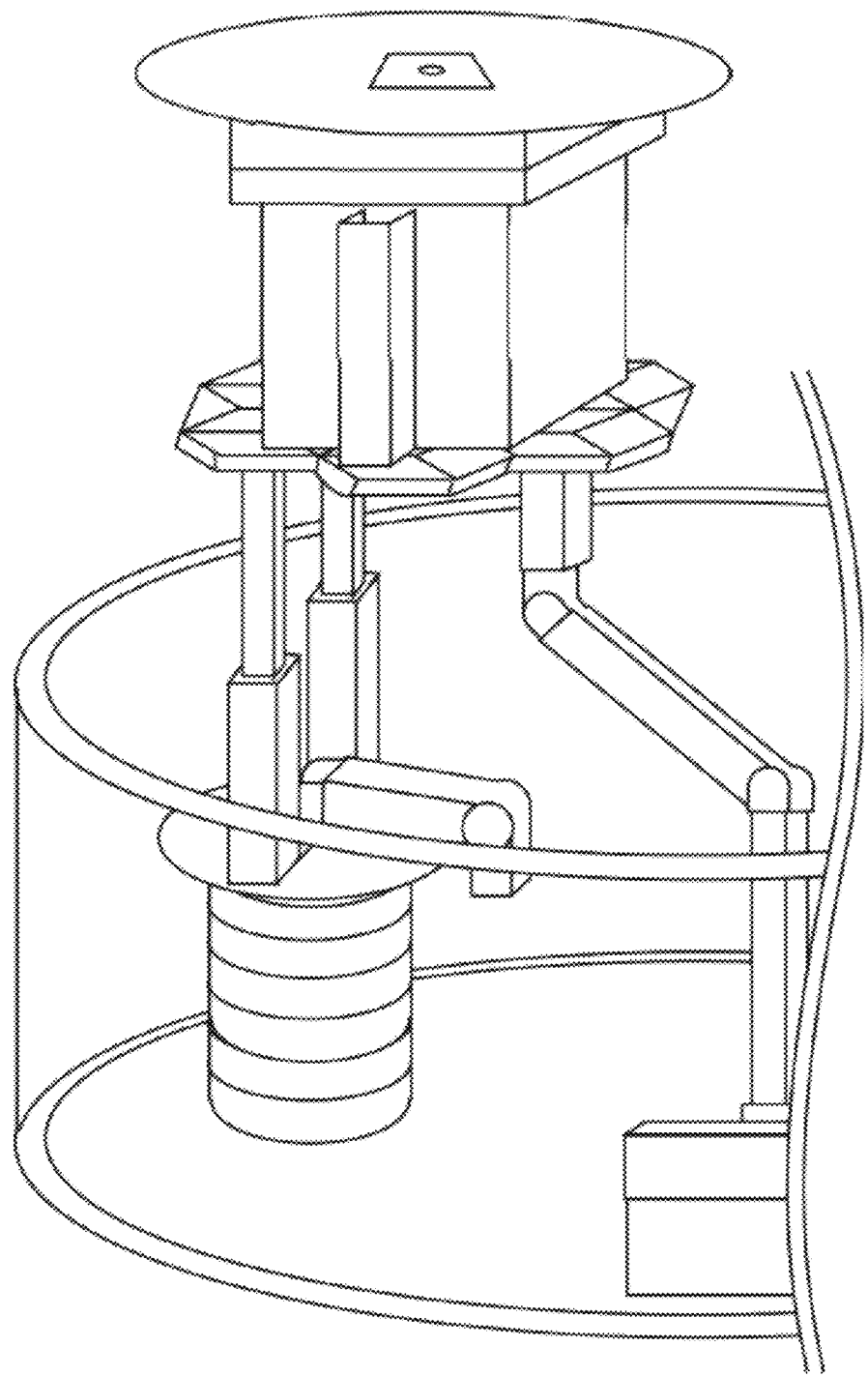
FIG. 5 shows an OrbWeaver with Deployed Phased Array Feed Center Section in accordance with an embodiment.
Figure 6:
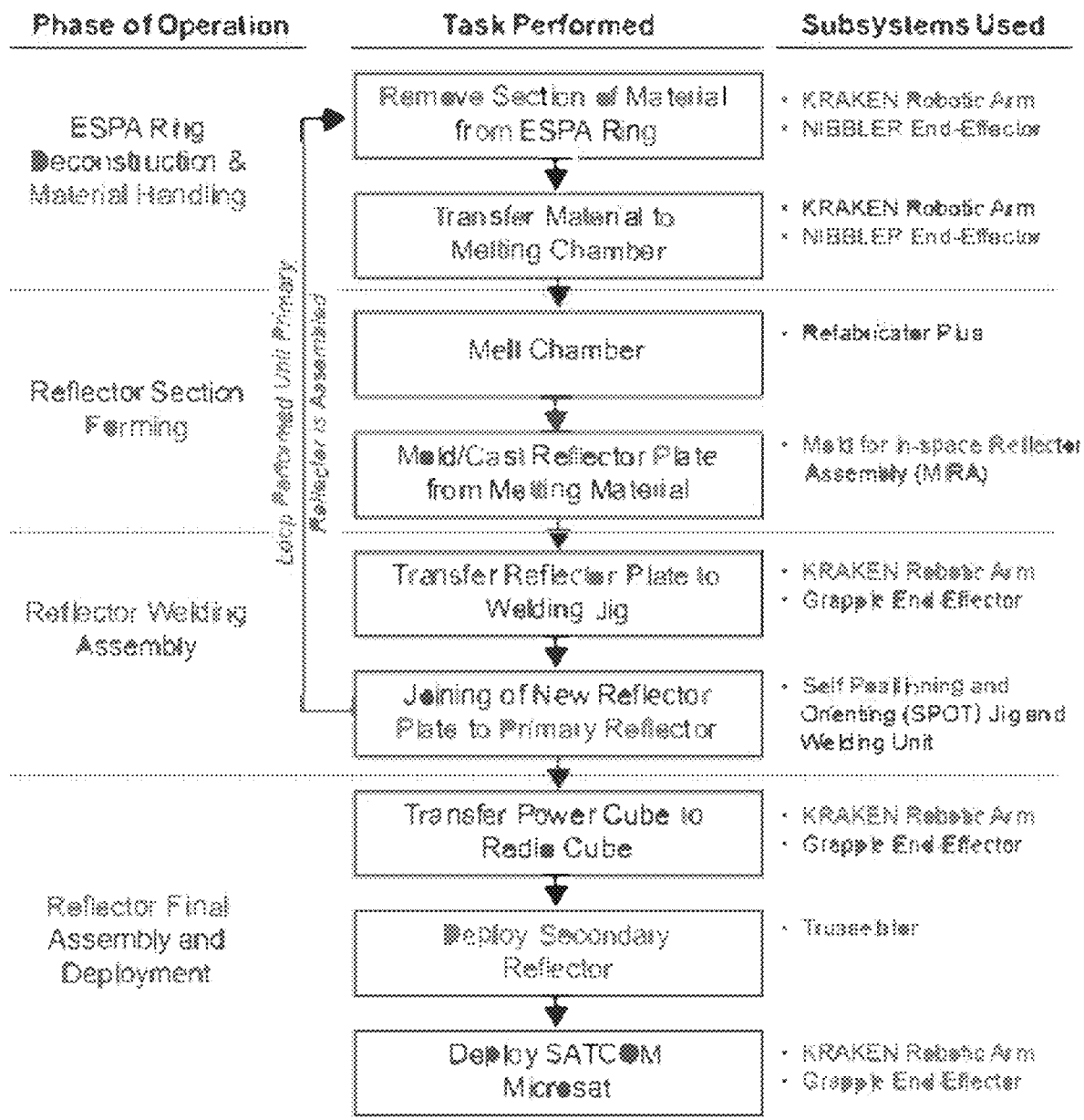
FIG. 6 shows Phases of Operation, Tasks Performed, and Subsystems Used During OrbWeaver Operation in accordance with an embodiment

FIGS. 4 and 6 show the OrbWeaver 10 process for repurposing an ESPA 20 to create a SATCOM system 210. Prior to antenna fabrication from the ESPA ring 20, OrbWeaver 10 will: (1) deploy the solar arrays 40 as shown in FIG. 4 to support the required power generation, (2) remove and stow wires other non-recyclable components from the ESPA, and (3) prepare the phased array antenna feed center section. Since the location of the wires, clamps, and other components on the ESPA ring 20 are known prior to launch; the KRAKEN robotic arms 170, with assorted end-effectors, can be used to remove these components and store them in a container. The path planning and removal processes can be tested on the ground prior to launch to ensure a proper removal process. The "RF Assembly" 120 comprises a prefabricated reflector center section 200, the phased array feed 120, TUI's Trusselator, and the antenna subreflector 130. All of these items are preassembled on the ground prior to launch. As depicted in FIGS. 4 and 5, the KRAKEN Robotic Arm 170 will lift this RF Assembly 120 out of the ESPA ring 20 center. The "Self Positioning and Orientation Tool" (SPOT 160), a precision fixturing and welding jig, will then extend its positioning arms, and the KRAKEN Arm 170 will hand off the RE Assembly 120 to one of SPOT's positioning arms.

After deployment of the PowerCube's solar arrays 40 and preparation of the RF Assembly 120, OrbWeaver 10 uses four phases of operation to convert the aluminum ESPA ring 20 to a 35 m diameter K-band antenna 110. The logical flow of the four phases of operation, the tasks that are performed in these phases of operation, and the subsystems used are detailed in FIG. 5. These four phases of operation are discussed in detail in the following sections.

Figure 7:
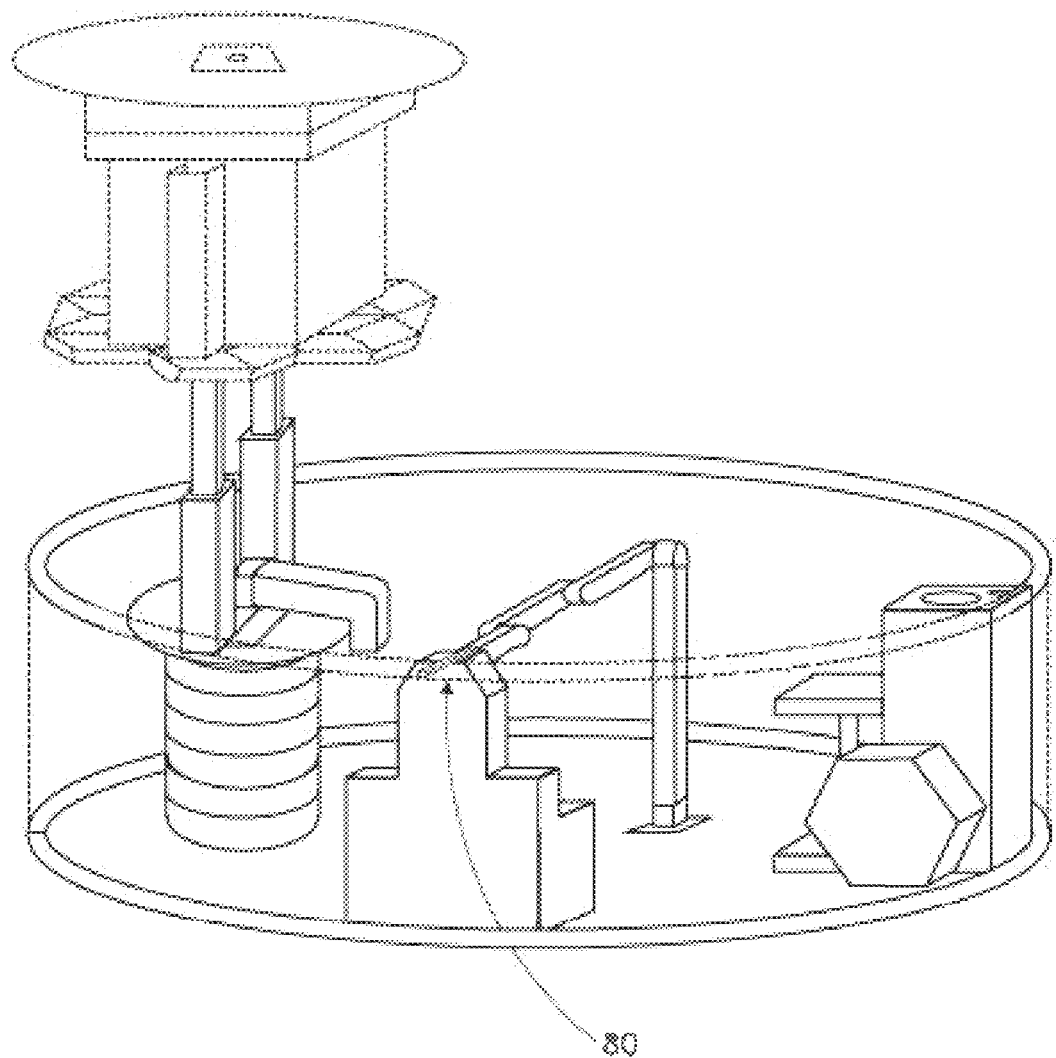
FIG. 7 shows—KRAKEN Arm with Nibbler End-Effector removing material from ESPA Ring in accordance with an embodiment.
Figure 8:
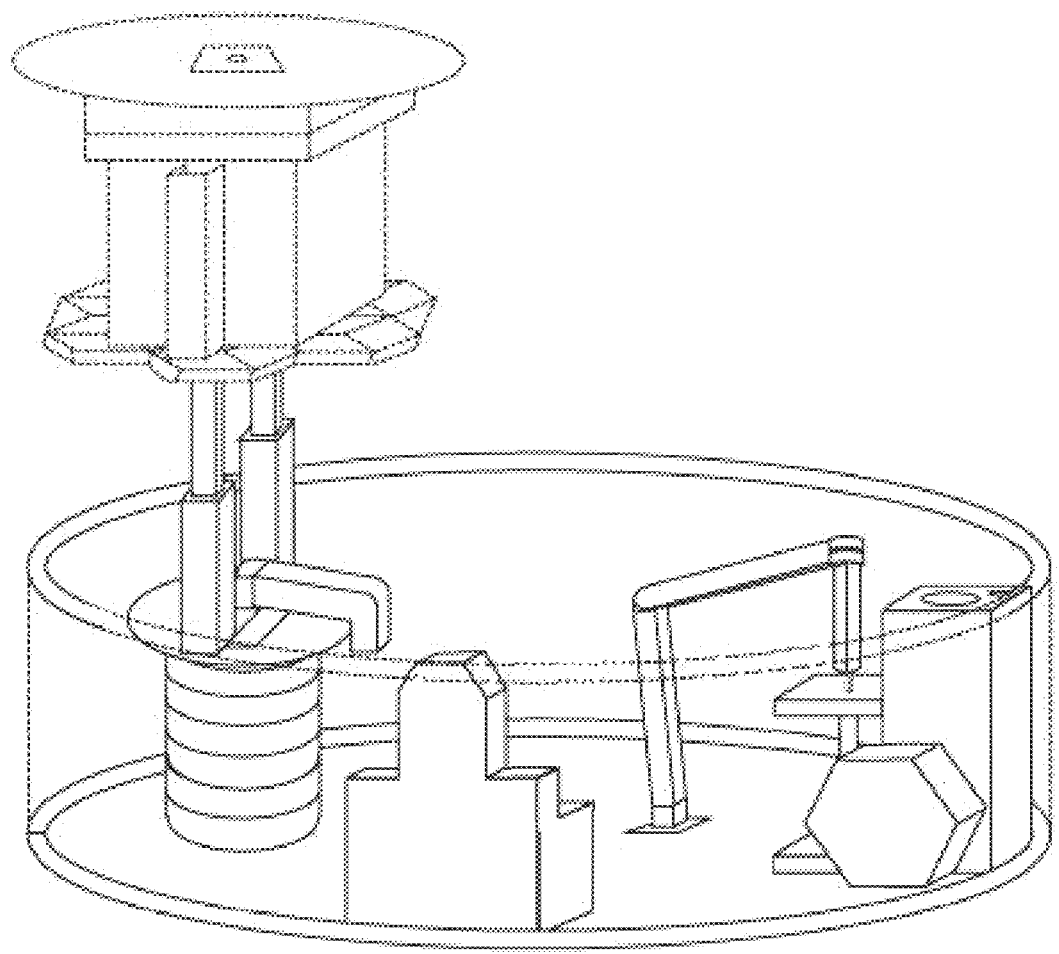
FIG. 8 shows a KRAKEN Arm with a Nibbler End-Effector transferring removed material to Refabricator-Plus in accordance with an embodiment.

ESPA ring 20 Deconstruction and Material Handling The ESPA ring 20 deconstruction and material handling phase is illustrated in FIG. 4 and FIG. 7. This phase comprises: (1) removing material 80 from the ESPA ring 20 using "Nibbler" end effectors 180 positioned by the robotic arms 170 and (2) transferring that material 80 to the input chamber of Refabricator-Plus 50. The Nibbler 180 mechanism is similar in concept to the "air nibbler" tool that machine and body shops use to trim sheet metal, but designed to provide the force needed to shave pieces 80 of the ESPA ring 20, which is made of significantly thicker (¼"-1") aluminum elements, as well as to trap and store all shavings 80 within a contained volume.

Removing material from the ESPA ring 20 is performed by the Nibbler 180 end-effector mounted to the KRAKEN robotic arm 170. The KRAKEN robotic arm 170 provides the localization and placement of the Nibbler 180 at different locations. The Nibbler 180, through its gripping design, provides the forces necessary to remove the material and keep itself firmly engaged with the ring. The Nibbler 180 uses a skirt around the processing area to confine the removed material during deconstruction. The material pieces 80 that are removed from the ESPA ring 20 are collected within the Nibbler 180. When the amount of material collected is sufficient to form a reflector section 70, the KRAKEN arm 170 will transfer the material to the input chamber of Refabricator-Plus 50. The Nibbler 180 end-effector will positively engage itself over the Refabricator-Plus input chamber and, using a piston or other transfer mechanism, force the material 80 into the input chamber. The Refabricator-Plus 50 input chamber will then mechanically trap the input material 80, allowing the KRAKEN arm 170 with the Nibbler 180 end-effector to return to begin removing material 80 from the ESPA ring 20 for the next reflector section 70.

Manufacturing a Reflector Section

Once the material has been transferred to the Refabricator-Plus 50 input chamber, the reflector section 70 forming phase of operation begins. The reflector section 70 forming phase of operation comprises: (1) melting the aluminum 80 and (2) molding/casting the reflector section 70.

Melting aluminum requires approximately 1.2 MJ/kg. The energy required to melt the entire 105 kg ESPA ring 20 is then 126 MJ. However, melting down the entire ESPA ring 20 is not necessary, because of the Refabricator-Plus 50 and its power consumption. However, the above calculation indicates that a larger reflector can be constructed from an ESPA ring 20 in a similar fashion within practical power levels.

The energy required to melt the aluminum can be generated by the PowerCube 30 and transferred to a Refabricator-Plus 50 in an incremental manner as each molded reflector section is fabricated. Any large current draws and power demands will be supported through a battery storage and power conditioning system within the PowerCube 30. The molten aluminum will flow directly into the Hexcaster mold 60 using a positive displacement pump. The pump chamber and piston is heated and geometrically configured to minimize any remaining aluminum on the chamber walls and piston. After cooling, the Hexcaster 60 will be opened mechanically. A semicircular ring along the periphery will keep the reflector section stationary while exposing the two grapple points (center and periphery located) on the molded reflector section. Exposure of the grapple points will allow the KRAKEN arm 170 with the grapple end-effector 190 to grab the molded reflector section prior to its complete release from the mold. After the KRAKEN arm 170 with the grapple end effector 190 has grabbed the reflector section at the peripheral grapple point, the semicircular ring will be mechanically removed and the Reflector Welding and Assembly process started.

Reflector Welding and Assembly

To assemble the antenna reflector, the molded sections 70 need to be: (1) transferred to the SPOT assembly jig 160 and (2) joined to the existing antenna reflector section 200. This 2-step process is performed for each molded section and continues until the entire reflector is fabricated as shown in FIGS. 11, 12, 13, and 14.

Figure 9:
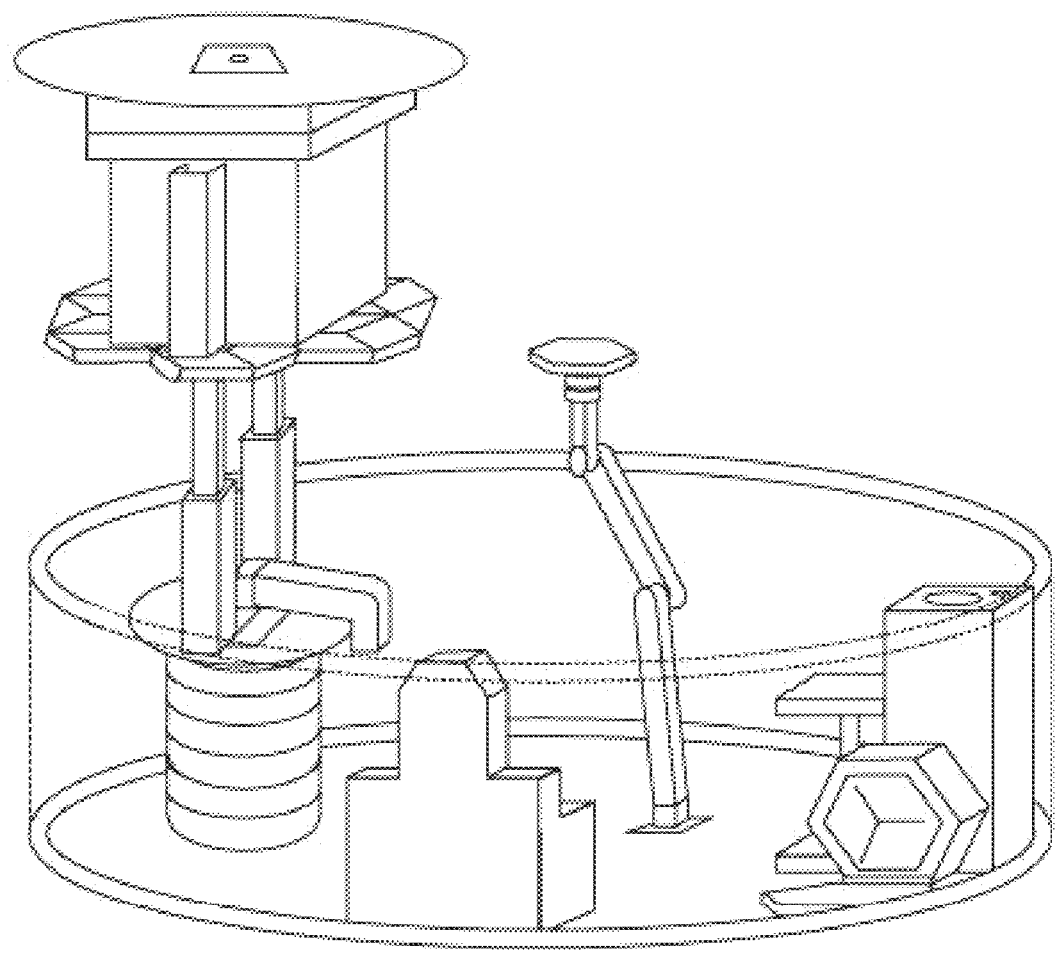
FIG. 9 shows a KRAKEN robotic arm with Grapple end-effector will remove the reflector segment from the HexCaster mold and transfer it to the SPOT assembly subsystem in accordance with an embodiment.
Figure 10:
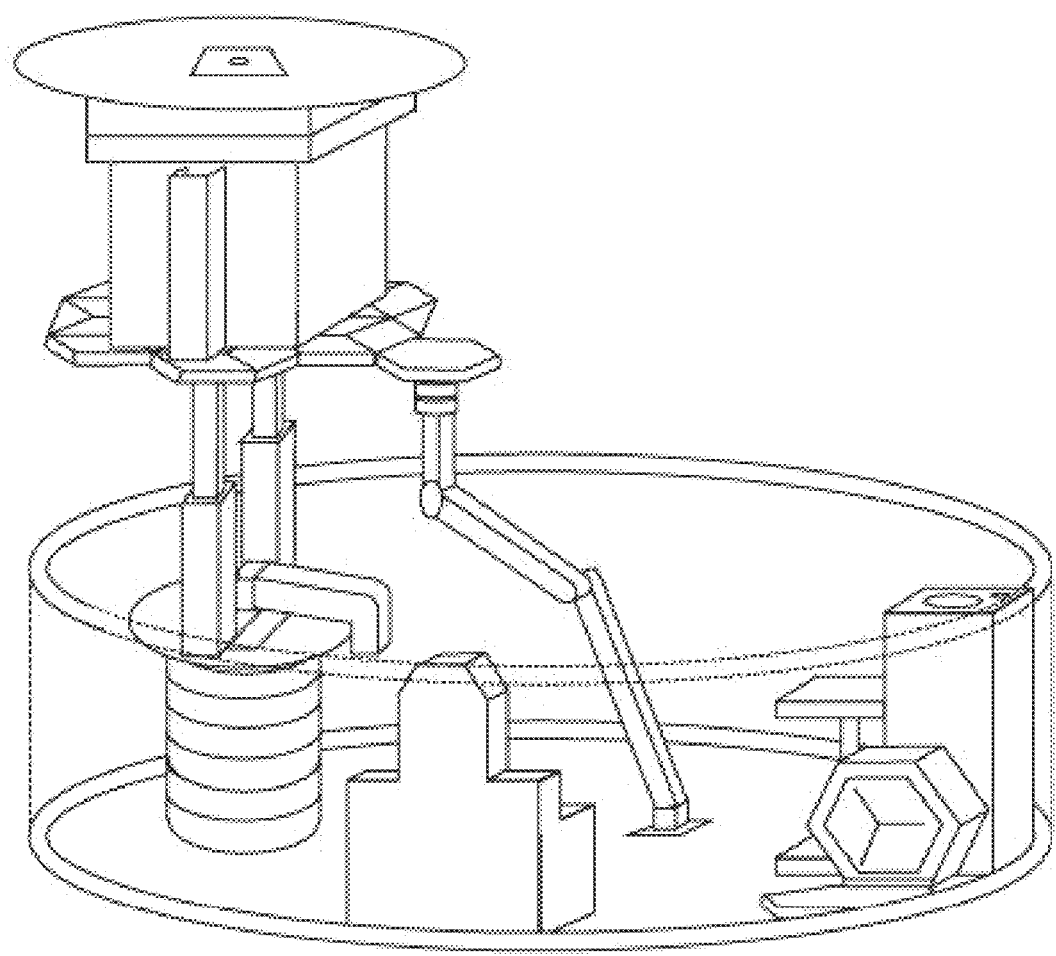
FIG. 10 shows a SPOT Jig assembling the reflector segments to form the primary reflector in accordance with an embodiment.

At the end of the Reflector Section Forming phase of operation, the Grapple end-effector 190 on the KRAKEN robotic arm 170 is holding the molded reflector section 70 at grapple point located at the periphery of the hexagon. The KRAKEN arm 170 will transfer the molded reflector section 70 to the SPOT 160 jig as illustrated in FIGS. 9 and 10. SPOT 160 receives the molded reflector section 70 using its unoccupied positioning arm by grabbing the new reflector section at the center grapple point.

Figure 46:
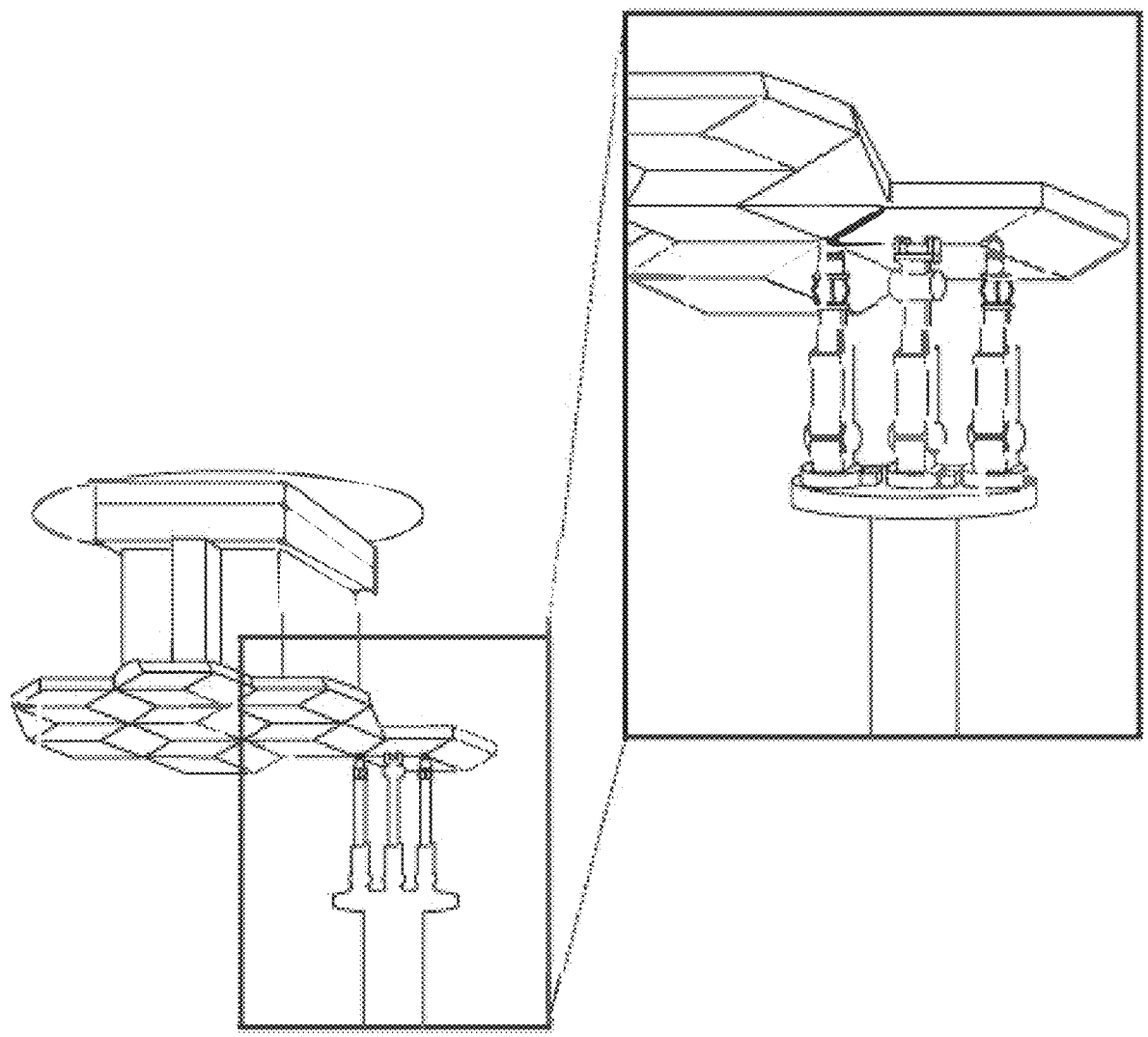
FIG. 46 shows a Self-Positioning and Orienting Tool (SPOT) in accordance with an embodiment.
Figure 48:
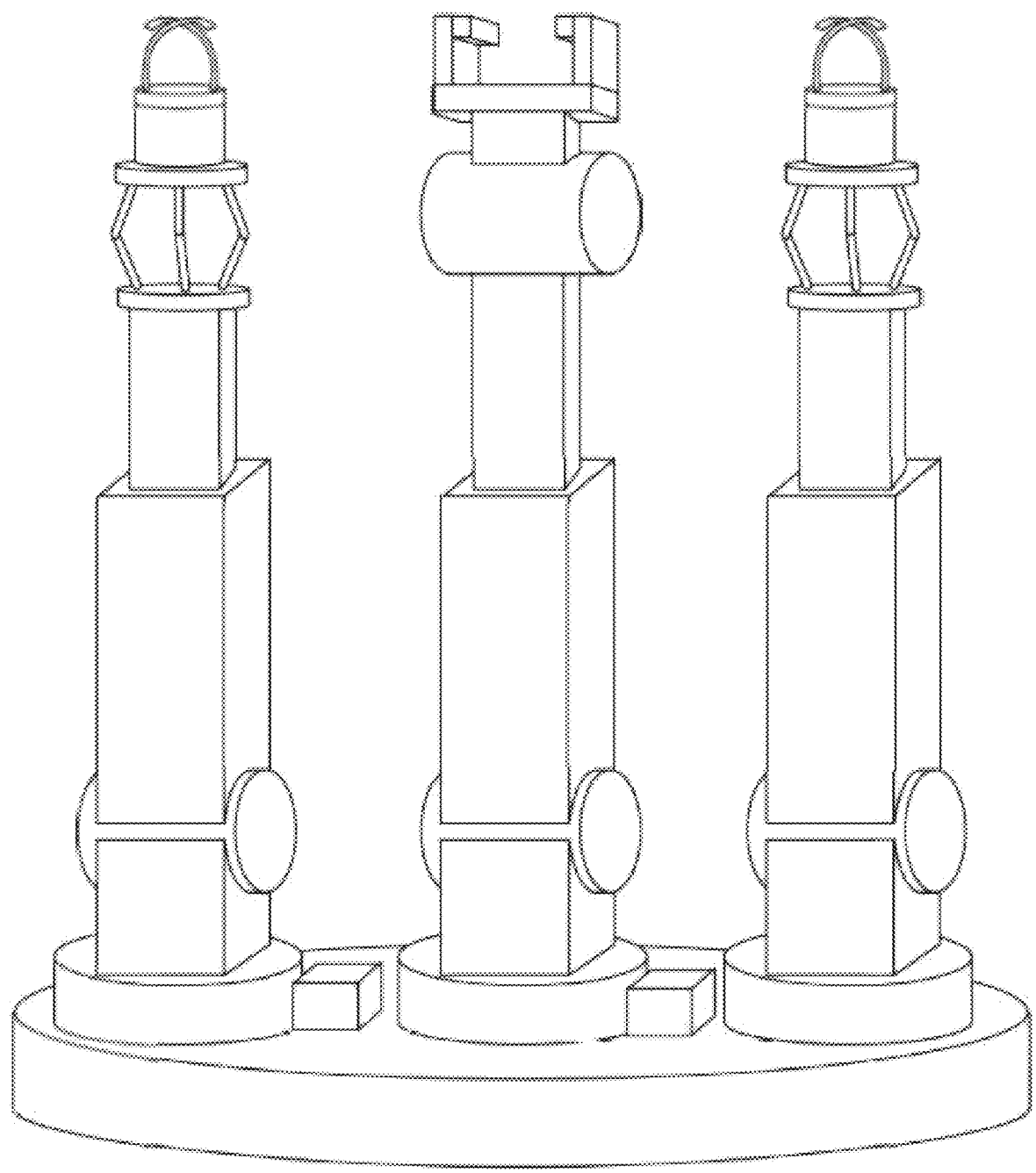
FIG. 48 shows SPOTs Degrees-of-Freedom for Alignment and Welding Operation in accordance with an embodiment.

As shown in FIGS. 12, 46, and 48, SPOT 160 comprises three main elements: (1) two positioning arms, (2) a joining (welding) tool, and (3) an alignment sensing system. The two positioning arms are used to hold the new molded reflector section and the assembled reflector in place for joining. The joining tool is used to perform the joining operation by adjusting and welding the tabs on the sides of the reflector section 70. The alignment sensing system, which consists of cameras and laser range sensors, is used to ensure alignment of the antenna sections pre- and post-joining. All three elements are mounted to a rigid plate and the degrees-of-freedom are minimized to constrain the movement of the jig and enable precision alignment and joining.

Figure 11:
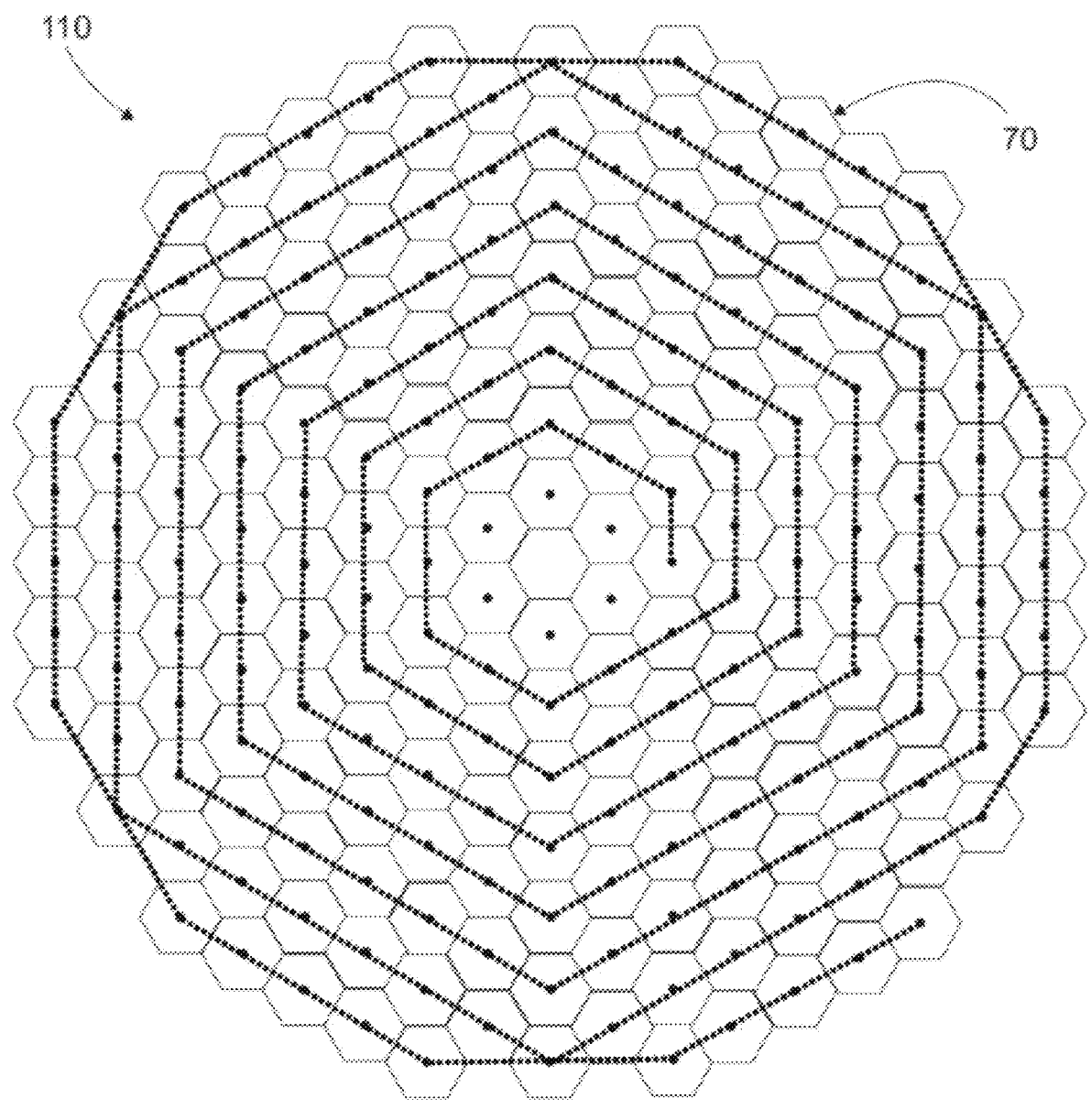
FIG. 11 shows a reflector assembly procedure in accordance with an embodiment.
Figure 13:
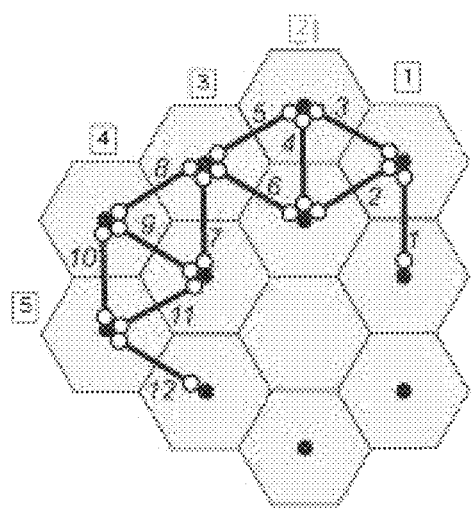
FIG. 13 shows a SPOT positioning arm placement and welding sequence in accordance with an embodiment.

As illustrated in FIG. 11, the reflector will be assembled by adding molded reflector section 70 from the rear of the reflector in a spiraling out sequence. The reflector center section, indicated by blue hexagons in FIG. 11, will be fabricated on the ground prior to launch. As mentioned previously, this prefabricated center section 200 will have the phased array antenna feed and a Trusselator 140 with the antenna sub-reflector 130 mounted to the concave side. The convex side of this prefabricated section 200 will have center grapple locations to allow SPOT's positioning arms to grab the center section at the required locations. Performing the assembly procedure in an outward-spiraling sequence takes advantage of the symmetry of the reflector and results in a robotic jig that requires fewer degrees-of-freedom, which gives a more precise alignment.

The illustrated molded reflector sections are of hexagonal shape, but it should be appreciated that other polygonal shapes can also be reflector sections. Each reflector hexagon 70 is 25 cm from side to side. As can be seen from FIG. 11, the reflector 110 is composed of a total of 199 hexagons 70. Of the 199 hexagons 70, seven are part of the prefabricated center section 200 (blue) and 192 are fabricated and attached in-space. The prefabricated section 200 could be made from 7 hexagons assembled on the ground or from a single curved piece that has the required shape. In either situation, this prefabricated section 200 will have 6 grapple locations as indicated in FIG. 11 to perform assembly. All 192 molded reflector sections 70 will have the center grapple locations for the robotic jig to position them prior to welding.

Prior to performing the assembly procedure of adding a new reflector section 70, one of the positioning arms 170 will be holding the reflector 110 that has already been assembled. The KRAKEN arm 170, which is holding the molded reflector section on the periphery, will hand off the molded reflector section to SPOT 160, which will use one of its positioning arms to grab the molded reflector section at the center grapple location. After this handoff, the joining process of a new reflector section to the reflector will begin.

When a new reflector section is added to the reflector it will be bordered on either two sides or three sides depending on its location in the reflector. The assembly procedure to add a new reflector section to the reflector when the added reflector is bordered on two sides is shown in FIG. 1 below. As can be seen in FIG. 1, when the added reflector section is bordered on two sides, two weld operations and one movement will be necessary. The repetitive operation positioning and welding is performed with a rigid jig as opposed to a robotic arm to allow precision alignment and welding by minimizing the degrees-of-freedom, reducing compliance, and constraining movement. Because of the high degree symmetry of the reflector and reflector section 70 being assembled, movement from one weld to another can be performed in a geometric progression that allows a step-by-step sequence of movement. FIG. 1 shows the sequence of movements of the two positioning arms 170 until the $10^{th}$ weld is performed, which occurs when joining the $5^{th}$ molded reflector section. If the added reflector section is bordered on three sides, then Steps 3 and 4 in FIG. 1 are repeated for the additional side. These repeated steps would result in a total of three weld operations and two movements.

Figure 14:
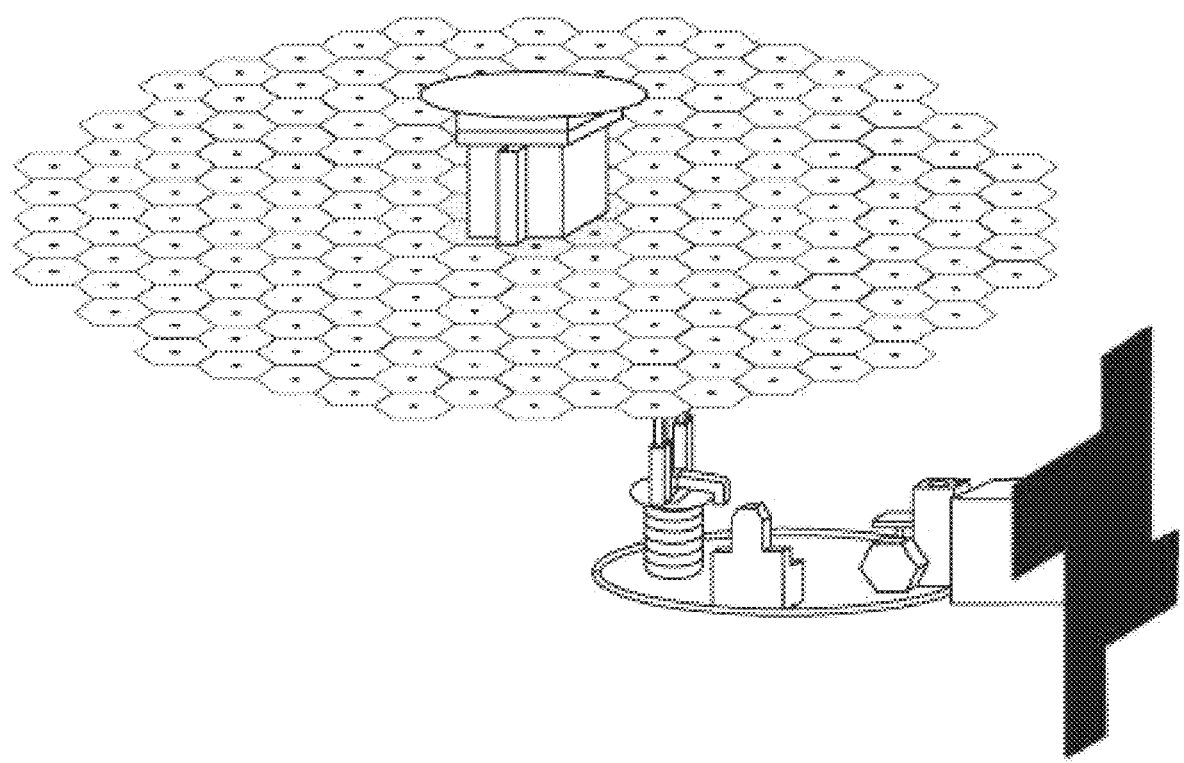
FIG. 14 shows a reflector at the end of a fabrication process in accordance with an embodiment.

The assembly procedure in FIG. 12 is repeated each time a new molded reflector section is available, which, as indicated by FIG. 11, is 192 times. From FIGS. 11 and 13, it can be derived that of these 192 added reflector sections, 60 require 2 welds and 132 require 3 welds, which results in a total of 516 welds to assemble the 3.5 m diameter reflector. The fully assembled reflector is shown in FIG. 14.

Reflector Final Assembly and Deployment

Figure 15:
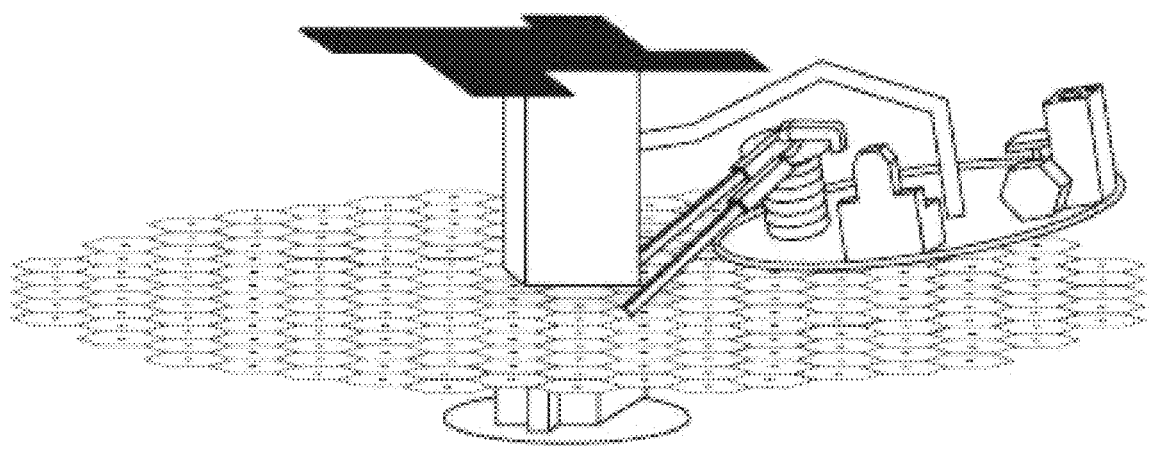
FIG. 15 shows a KRAKEN Robotic Arm Moving a Power Cube to Attach to an Assembled Reflector in accordance with an embodiment
Figure 16:
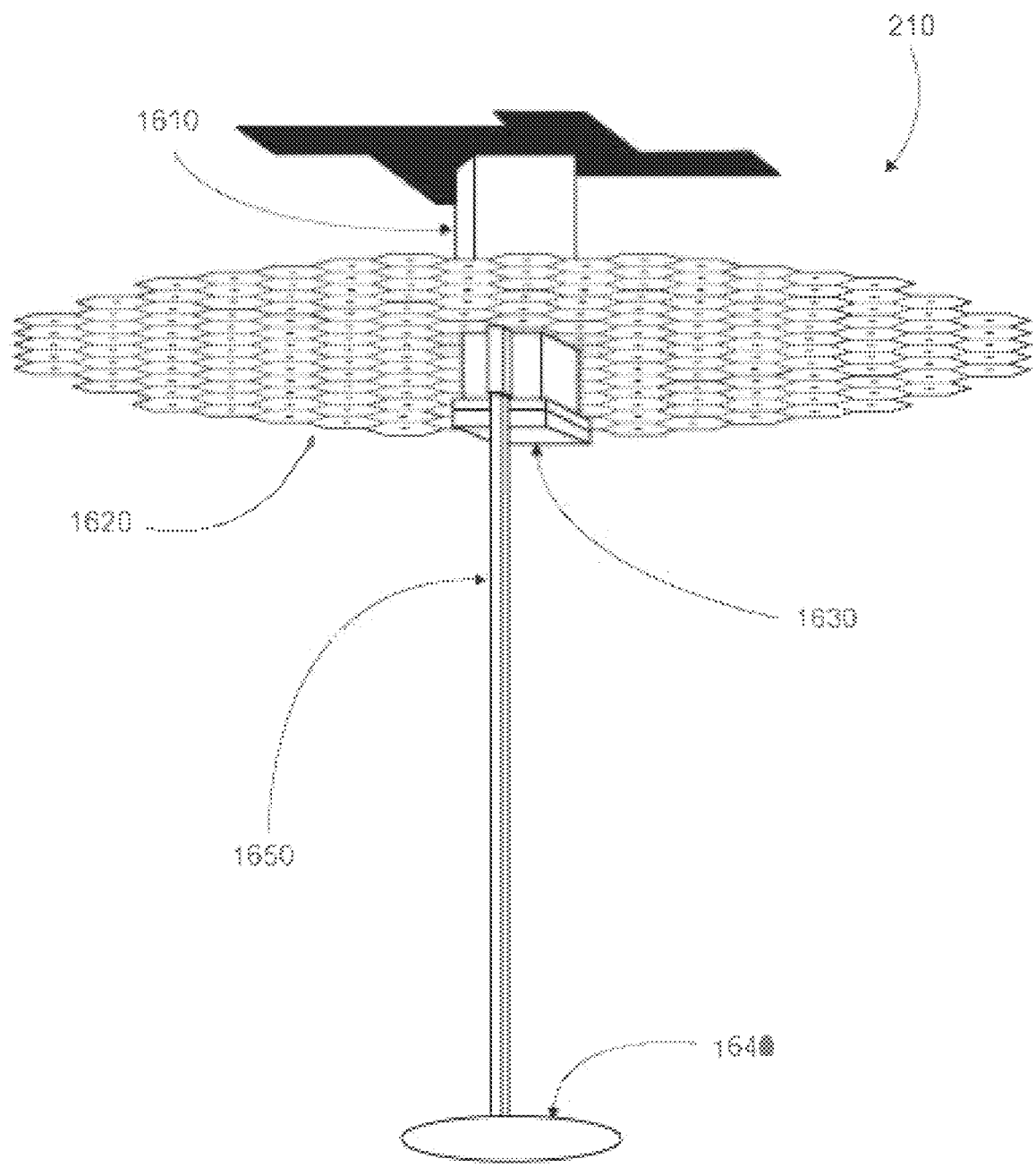
FIG. 16 shows extension of SubReflector to 8.35 m using a Trusselator in accordance with an embodiment.

After all 162 reflector sections 70 have been fabricated and assembled to form the reflector, the Reflector Final Assembly and Deployment operational phase will begin. As shown in FIGS. 6, 15, and 16, during the Reflector Final Assembly and Deployment operational phase: (1) the PowerCube 30 is transferred from the ESPA ring 20 to the assembled reflector 110, (2) the subreflector 130 is deployed, and (3) the completed antenna 100 is released.

At the beginning of the Reflector Final Assembly and Deployment operational phase, SPOT 160 will be holding the assembled reflector 110 at the last added reflector section 70. The KRAKEN robotic arm 170 will assist the SPOT 160 in walking the reflector back closer to the center of the deconstructed ESPA ring 20. Once SPOT 160 is holding the reflector closer to the center, the KRAKEN robotic arm 170 will remove the PowerCube 30 from the only remaining section of the ESPA ring 20 and attach it to the connector on the back of the center hexagon as shown in FIG. 15. During the time of transfer, the required power will be delivered from a battery storage system located in the ESPA ring 20; a small secondary solar panel integrated with the components inside the ESPA ring 20 may be required to ensure the system can maintain battery charge to accommodate any delays that might occur during the PowerCube 30 transfer process. The interface used to attach the PowerCube 30 to the reflector will allow both mechanical and electrical connections to be made using a mechanical/electrical mating interface such as the iBOSS connector developed by DLR.

After the PowerCube 30 is attached to the assembled reflector 110, the subreflector 130 is extended as illustrated in FIG. 16. Launch locks securing the subreflector 130 for launch will be released, and the subreflector 130 will then be deployed below the reflector using TUI's Trusselator 140 system. Trusselator 140 uses spools of composite feedstock to manufacture 1$^{st}$-order truss segments in-space. In the case of OrbWeaver 10, Trusselator 140 and the required feedstock are mounted to the phased array cube at the center of the reflector with the 1$^{st}$-order truss segment partially deployed and the subreflector 130 mounted to the end of the truss segment prior to launch. In this configuration, when it is time to deploy the subreflector 130, Trusselator 140 begins manufacturing truss 150 to extend the subreflector 130 out the required 8.35 m.

Upon completion of the extension of the subreflector 130, the antenna is ready for operation. The KRAKEN robotic arm 170 will take the assembled antenna and deploy it by slowly pushing it away from the deconstructed ESPA ring 20. The remainder of the ESPA ring 20 and OrbWeaver 10 components can then be deorbited or retained on orbit for resupply and re-use, if desired. As an alternative method of deployment, if a free-flying servicing or tug robot is available, the assembled SATCOM system 210 can be handed off to the servicing or tug robot using the multiple grapple points on the reflector. The servicing or tug robot could then transfer the antenna to its operational location.

Aluminum Recycling and Reflector Segment Fabrication Process

The aluminum recycling and fabrication process used in OrbWeaver 10 leverages TUI's Refabricator, which is a combination in-space recycler and 3D printer under development for the ISS, as well as TUI's experience with molding composite and metal parts.

The Refabricator headed for the 155 is designed to melt and recycle high-temperature polymers such as Ultem and PEEK, which have melting temperatures above 300 C. For OrbWeaver 10, the temperature capacity of the technology will be upgraded to enable it to process aluminum. This "Refabricator-Plus" 50 system will consolidate, filter, and melt the aluminum chips fed to it by the Nibbler 180 end effector. Filtering of the aluminum from the ferrous materials such as inserts and non-metallic pieces such as insulation may be accomplished using a combination of an electromagnet and an eddy-current separator technique. To fabricate each molded reflector section requires approximately 350 g of aluminum; to create the 3.5 m primary reflector 110 will thus require only about 70 kg of aluminum, or 64% of the 109 kg ESPA ring 20 mass.

The aluminum chips 80 removed from the ESPA ring 20 by the Nibbler end-effector 180 are pushed into the Refabricator-Plus 50 input chamber with a piston attached to the end-effector. The Refabricator design uses a movable input chamber. After receiving the aluminum chips, this movable input chamber will translate along linear slides to align itself with the Refabricator-Plus 50 drive piston. The Nibbler 180 end-effector will then retract its piston and return to decomposing the ESPA ring 20. This sequence of operations ensures that the metal chips 80 are positively constrained at all times to prevent generation of space debris. The chamber, piston head, and aluminum chips 80 in the Refabricator-Plus 50 will then be heated to 20° C. above melting (680° C.). The 20° C. excess is chosen to accommodate for temperature loss when the molten aluminum is flowed into the Hexcaster mold 60. If it is assumed that the initial temperature of the aluminum chips prior to heating is 25° C. and that the efficiency of the process is 80%, then 433 KJ of energy is required to melt the aluminum and bring it to 680° C. The total amount of energy to melt all the 199 reflector sections 70 is then 86.2 MJ. If all 2 kW of power is available to melt the aluminum, then it will take 3.6 minutes to melt down the aluminum for a segment. The molten aluminum will then be directly flowed into the Hexcaster mold 60 using the piston in the Refabricator-Plus 50.

In-space molding does not require vents to allow air to exit the molding cavity, as the molten aluminum flows through the runners and gates of the mold. However, there are challenges due to the microgravity environment and the inability to manually prep the mold surface. In microgravity, the molten aluminum will not flow to lowest points of the mold and fill up the mold as more aluminum enters. The process must follow more of an injection-molding approach, which is common with plastics. Injection molding aluminum is a challenge because the contractions as the aluminum cools can form voids and defects. To remedy such effects, care must be taken in in the mold design, during the injection process, and in controlling the cooling rate of the mold. Casting and molding process simulation tools can prove very useful when designing the mold while considering the above Issues. Releasing the cast part from the mold is often a challenge. A common approach is often to apply a mold release. The better the mold release, the less frequent it must be applied. The selection of the type of and the application of mold release is complicated by the in-space application.

Orb Weaver 10 System SWaP

Table 1 presents a preliminary estimate of OrbWeaver 10 system mass and power requirements. Including uncertainties, system mass is estimated at 320 kg, and the PowerCube system 30 must generate 2 kW of power. Based upon our preliminary configuration design, the ISM components can fit within the ESPA ring 20 internal volume, and the satellite bus and power components will occupy one of the six microsat payload ports.

TABLE 1

Preliminary Weight and Power Estimates for OrbWeaver 10.

| Sub-System | Quantity | Mass (kg) | CBE Mass | Uncertainty | Est. Mass | Power Draw (W) | Ext Power Draw |
| --- | --- | --- | --- | --- | --- | --- | --- |
| Base Plate | 1 | 30 | 30 | 10% | 33 | 0 | 0 |
| Positrusion | 1 | 20 | 20 | 30% | 26 | 1000 | 1000 |
| Hex Caster | 1 | 10 | 10 | 30% | 13 | 200 | 200 |
| Trusselator 140 | 1 | 6 | 6 | 15% | 6.9 | 100 | 100 |
| Robotic Arms | 4 | 5 | 20 | 15% | 23 | 60 | 240 |
| Power cube 30 | 1 | 100 | 100 | 30% | 130 | −2000 | −2000 |
| Swift Array | 25 | 0.5 | 12.5 | 20% | 15 | 50 | 1250 |
| Feedhorns | 100 | 0.25 | 25 | 10% | 27.5 | 0 | 0 |
| ReflectArray | 1 | 2 | 2 | 20% | 2.4 | 10 | 10 |
| C&DH | 1 | 15 | 15 | 15% | 17.25 | 50 | 50 |

TABLE 1-continued

Preliminary Weight and Power Estimates for OrbWeaver 10.

| Sub-System | Quantity | Mass (kg) | CBE Mass | Uncertainty | Est. Mass | Power Draw (W) | Ext Power Draw |
|---|---|---|---|---|---|---|---|
| SPOT 160 Base | 1 | 10 | 10 | 30% | 13 | 50 | 50 |
| On-board Electronics | 1 | 10 | 10 | 30% | 13 | 100 | 100 |
| | | sum | 260.5 | | 320 | | |

Satcom System Concepts

Presented below are the high level satellite system designs/trades for both the proposed K/Ka-Band to VSAT system specified in the solicitation and the commercial "Global-Fi™" Direct-To-Smartphone-Broad-band system. For both cases a modified Cassegrain reflector antenna system was selected as a design basis.

K/Ka-Band to VSAT System Concept

Design Methodology

The design process employed for the "Orb-Weaver, K/Ka-Band to VSAT" satellite system (and related satellite systems) is present in Table 2, below. The details for each of the design steps are covered in the following sections.

TABLE 2

SATCOM Satellite System Design Methodology

| Step | Process | Notes |
|---|---|---|
| 1 | Define RF Center Frequency | Design Process may need to be repeated twice if Uplink and Downlink frequencies are significantly separated, as in the case or commercial Ka (20/30 GHz) |
| 2 | Define Satellite Altitude | Normally between 650 and 1200 Km |
| 3 | Define Satellite Antenna Aperture Diameter | Normally between 3 and 15 Meters |
| 4 | Calculate Satellite Antenna 3 dB Beam-width | See link (https://www.easycalculation.com/physics/electromagnetism/3db-beamwidth.php) |
| 5 | Calculate Satellite Antenna footprint on the Earth | Approximately, Satellite Altitude * 3 dB Beam-width (in rads) |
| 6 | Scale the Satellite Antenna footprint by the number of transponders (nxm) | Normally between 64 and 120 (e.g. 8 × 8 or 12 × 10) |
| 7 | Select Gain of the Ground Station Antenna | 0 dB for hand held, 40 dB for Satellite TV dish |
| 8 | Balance Modulation and Coding (MODCOD) with available Transmitter Power with available Bandwidth to Optimize Data Throughput | Both Power and Bandwidth are limited and "expensive" quantities |

K/Ka-Band frequency ranges

The K/Ka Band frequency range covers a very large part of the RF spectrum from 17 to 40 GHz. For the analysis presented, the following frequencies were selected. These frequencies represent the "band edges" for the K/Ka spectrum allocations in use today.

17.3, 20.2, 21.2, 25.5, 26.5, 27.5, 29, 30, 31 GHz

Note: It is common for K/Ka-band systems to use two "very different" frequency ranges for satellite uplink and downlink bands. An example of this is commercial satellite Internet services that downlink at approximately 20 GHz and uplink and approximately 30 GHz.

Aperture sizing and Antenna Beam Footprints

Figure 17:
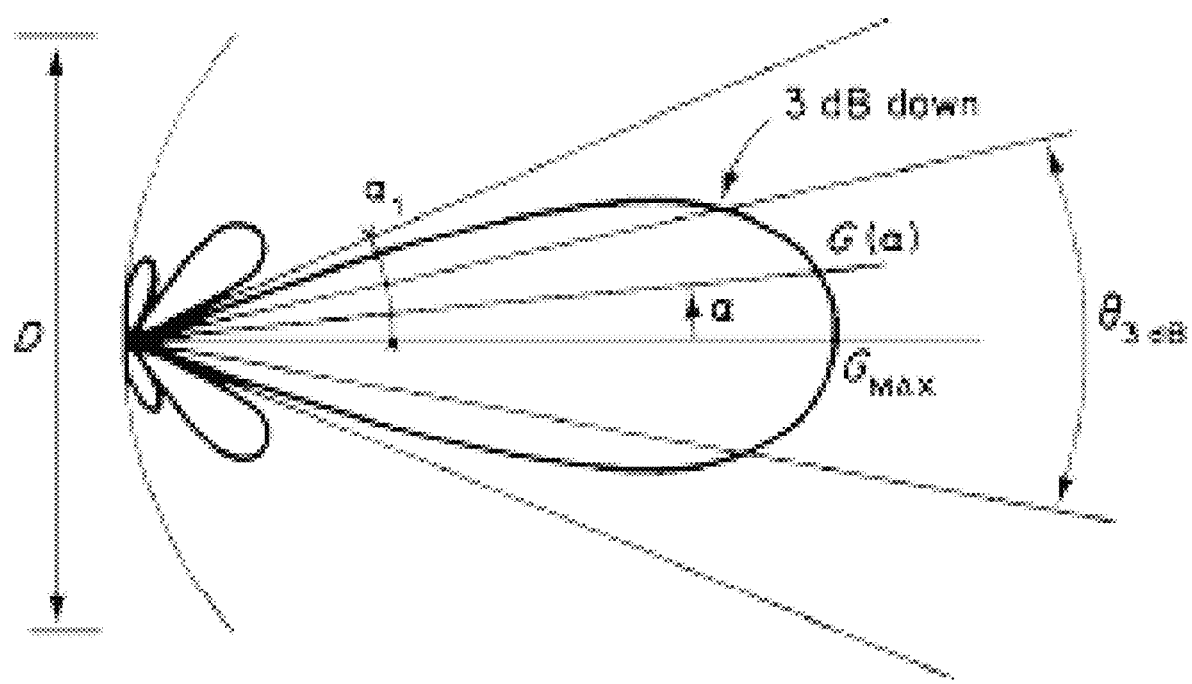
FIG. 17 shows the mathematical definition for antenna beam-width.

The mathematical definition for antenna beam width is illustrated in FIG. 17. Beam footprint on the ground is calculated using the 3 dB beam width and the satellite altitude.

Antenna Beam-width Calculations

Table 3 tabulates the antenna 3 dB beam-widths (in degrees) as a function of antenna diameter (in meters), rounded to 2 decimal places. The calculations assume an aperture efficiency of 65%.

TABLE 3

Antenna 3 dB Beam-width (in degrees) as a function of Antenna Diameter (in Meters)

| | Operating Frequency: | | | | | | | | |
|---|---|---|---|---|---|---|---|---|---|
| | 17.3 GHz | 20.2 GHz | 21.2 GHz | 25.5 GHz | 26.5 GHz | 27.5 GHz | 29 GHz | 30 GHz | 31 GHz |
| 3 Meter | 0.39 | 0.33 | 0.32 | 0.26 | 0.25 | 0.25 | 0.23 | 0.22 | 0.22 |
| 5 Meters | 0.23 | 0.20 | 0.19 | 0.16 | 0.15 | 0.15 | 0.14 | 0.13 | 0.13 |
| 7 Meters | 0.17 | 0.14 | 0.14 | 0.11 | 0.11 | 0.11 | 0.10 | 0.10 | 0.09 |
| 9 Meters | 0.13 | 0.11 | 0.11 | 0.09 | 0.08 | 0.08 | 0.08 | 0.07 | 0.07 |
| 11 Meters | 0.11 | 0.09 | 0.09 | 0.07 | 0.07 | 0.07 | 0.06 | 0.06 | 0.06 |
| 13 Meters | 0.09 | 0.08 | 0.07 | 0.06 | 0.06 | 0.06 | 0.05 | 0.05 | 0.05 |
| 15 Meters | 0.08 | 0.07 | 0.06 | 0.05 | 0.05 | 0.05 | 0.05 | 0.04 | 0.04 |

Antenna Footprint Calculations

Figure 18:
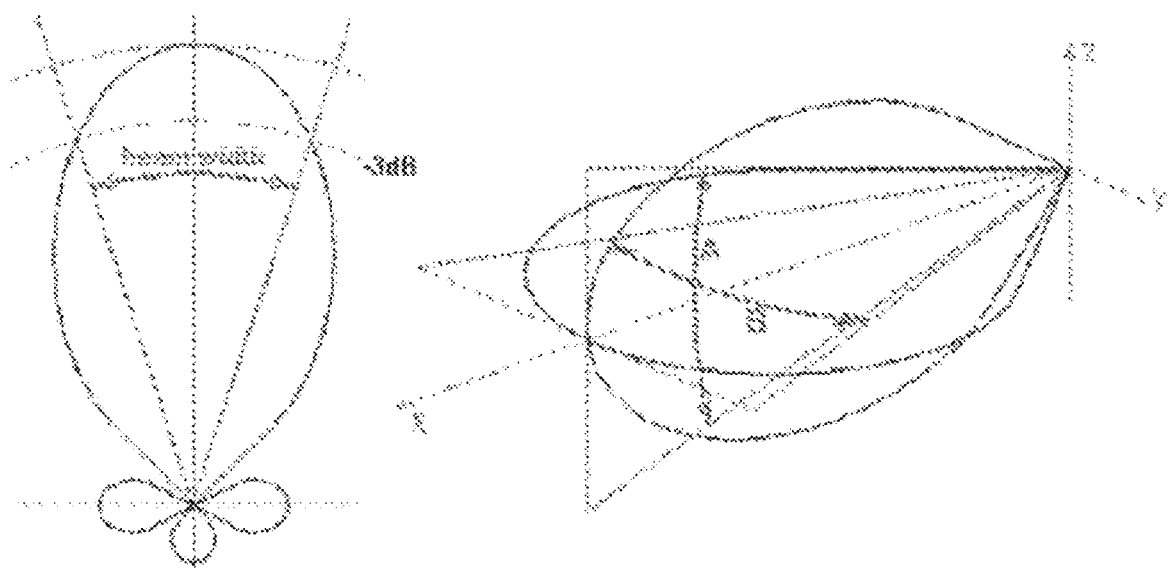
FIG. 18 shows projection of antenna spot-beam on Earth's Surface.

FIG. 18 shows how the antenna spot-beam is projected on to the Earth's surface. For this analysis, the angles A and B are assumed to be the same, and the small angle approximation is used for the tangent function. Thus, the projected footprint is given by:

Satellite Altitude*3 dB Beam-width (in rads)

Tabulated footprint sizes for satellite orbits of 1000 Km and 650 Km are provided in Table 4 and Table 5, respectively.

TABLE 4

Antenna Footprint (in Km) as a function of Antenna Diameter (in m)-Satellite Orbit 1000 Km

| | Operating Frequency | | | | | | | | |
|---|---|---|---|---|---|---|---|---|---|
| | 17.3 GHz | 20.2 GHz | 21.2 GHz | 25.5 GHz | 26.5 GHz | 27.5 GHz | 29 GHz | 30 GHz | 31 GHz |
| 3 Meters | 6.81 | 5.76 | 5.59 | 4.54 | 4.36 | 4.36 | 4.01 | 3.84 | 3.84 |
| 5 Meters | 4.01 | 3.50 | 3.32 | 2.79 | 2.62 | 2.62 | 2.44 | 2.27 | 2.27 |
| 7 Meters | 2.97 | 2.44 | 2.44 | 1.92 | 1.92 | 1.92 | 1.74 | 1.74 | 1.57 |
| 9 Meters | 2.27 | 1.92 | 1.92 | 1.57 | 1.40 | 1.40 | 1.40 | 1.22 | 1.22 |
| 11 Meters | 1.92 | 1.57 | 1.57 | 1.22 | 1.22 | 1.22 | 1.05 | 1.05 | 1.05 |
| 13 Meters | 1.57 | 1.40 | 1.22 | 1.05 | 1.05 | 1.05 | 0.87 | 0.87 | 0.87 |
| 15 Meters | 1.40 | 1.22 | 1.05 | 0.87 | 0.87 | 0.87 | 0.87 | 0.70 | 0.70 |

TABLE 5

Antenna Footprint (in Km) as a function of Antenna Diameter (in m)-Satellite Orbit 650 Km

| | Operating Frequency | | | | | | | | |
|---|---|---|---|---|---|---|---|---|---|
| | 17.3 GHz | 20.2 GHz | 21.2 GHz | 25.5 GHz | 26.5 GHz | 27.5 GHz | 29 GHz | 30 GHz | 31 GHz |
| 3 Meter | 4.42 | 3.74 | 3.63 | 2.95 | 2.83 | 2.83 | 2.61 | 2.50 | 2.50 |
| 5 Meters | 2.61 | 2.28 | 2.16 | 1.81 | 1.70 | 1.70 | 1.59 | 1.48 | 1.48 |
| 7 Meters | 1.93 | 1.59 | 1.59 | 1.25 | 1.25 | 1.25 | 1.13 | 1.13 | 1.02 |
| 9 Meters | 1.48 | 1.25 | 1.25 | 1.02 | 0.91 | 0.91 | 0.91 | 0.79 | 0.79 |
| 11 Meters | 1.25 | 1.20 | 1.02 | 0.79 | 0.79 | 0.79 | 0.68 | 0.68 | 0.68 |
| 13 Meters | 1.02 | 0.91 | 0.79 | 0.79 | 0.68 | 0.68 | 0.56 | 0.56 | 0.56 |
| 15 Meters | 0.91 | 0.79 | 0.68 | 0.56 | 0.56 | 0.56 | 0.56 | 0.45 | 0.45 |

Figure 19:
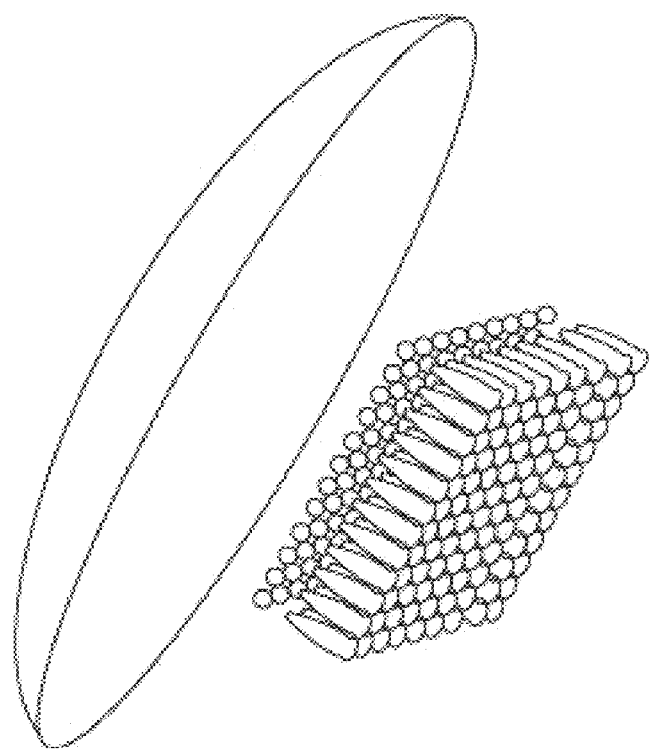
FIG. 19 shows a Phased-Array Fed Reflector Configuration for Satellite System in accordance with an embodiment.
Figure 20:
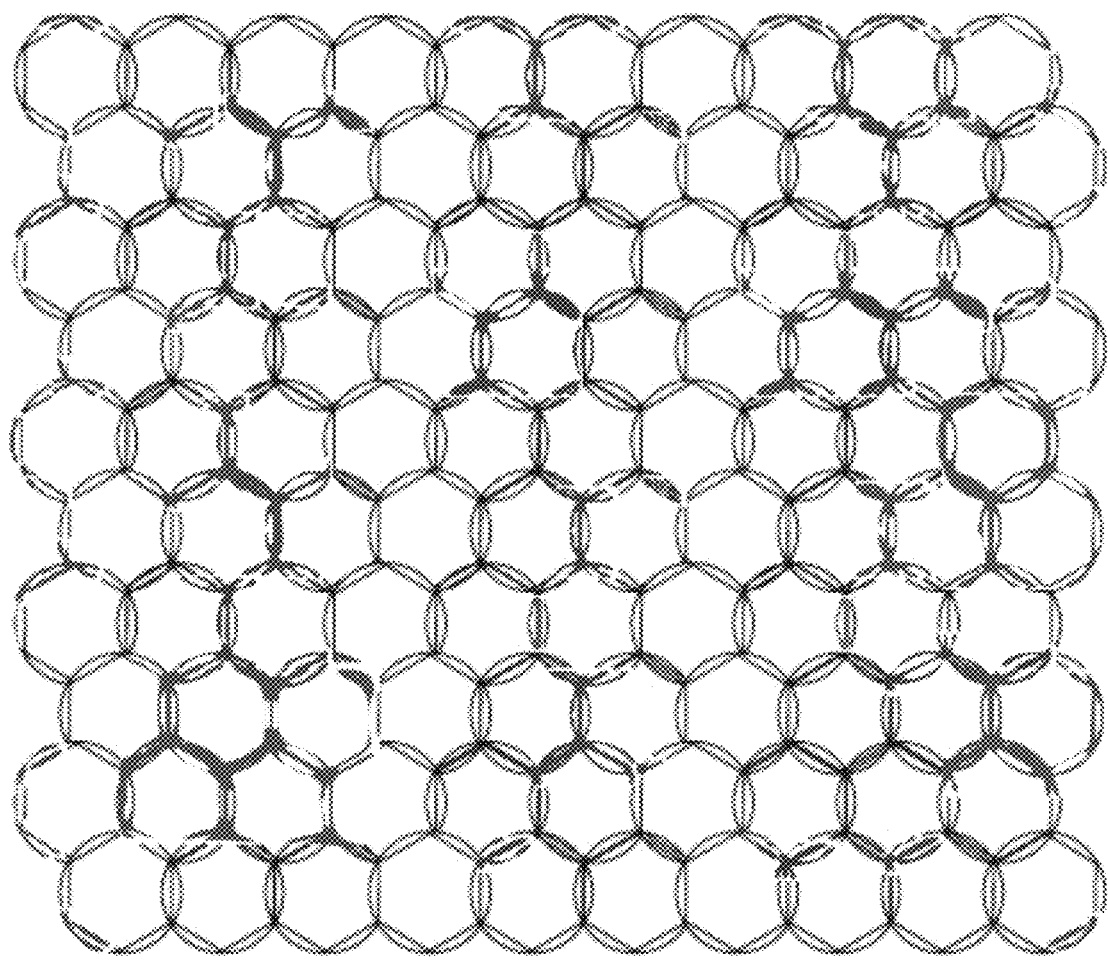
FIG. 20 shows a 4-Color. Frequency Reuse Plan.

An OrbWeaver 10 Satellite RF can be based upon an array of software defined radios (SDRs) feeding a large aperture as illustrated in FIG. 19. It should be appreciated that a satellite system in accordance with an embodiment can also be implanted in a more advanced Cassegrain design; however, for the analysis present, the concept shown in FIG. 19 is sufficient. Consider a 100 element SDR array (10×10) each having a spot-beam/foot print calculated in the previous section. The arrayed footprint on the Earth's surface can be approximated by a hexagonal "honeycomb" mesh as shown below. The 4-color (Red, Green, Violet and Blue) circulars represent a "basic" 4-color frequency reuse plan. The "basic" frequency reuse plan is provided in FIG. 20. While different land more advanced) frequency reuse plans do exist and are in use, the "basic" 4-color reuse plan is sufficient for this first-order analysis.

To better understand the impact of satellite footprints on satellite system designs and give a sense of the scale involved, the satellite footprints (for systems operating at 26.5 GHz) are overlaid on maps of Washington State (Seattle and Spokane), Washington DC, New York City, and locations in the UAE. For reference, Washington State is about 360 miles (580 Km) long and 240 miles (450 Km) wide.

Antenna Gain Calculations

Table 6 shows the antenna gain (per spot-beam) as a function of antenna diameter (in Meters), rounded to 1 decimal place. The calculations assume an aperture efficiency of 65%.

TABLE 6

Antenna Gain (dBi) as a function of Antenna Diameter (in Meters)

| | Operating Frequency | | | | | | | | |
|---|---|---|---|---|---|---|---|---|---|
| | 17.3 GHz | 20.2 GHz | 21.2 GHz | 25.5 GHz | 26.5 GHz | 27.5 GHz | 29 GHz | 30 GHz | 31 GHz |
| 3 Meters | 49.8 | 51.2 | 51.6 | 53.2 | 53.5 | 53.9 | 54.3 | 54.6 | 54.9 |
| 5 Meters | 54.3 | 55.6 | 56.0 | 57.6 | 58.0 | 58.3 | 58.8 | 59.0 | 59.3 |
| 7 Meters | 57.2 | 58.5 | 59.0 | 60.6 | 60.9 | 61.2 | 61.7 | 62.0 | 62.3 |
| 9 Meters | 59.4 | 60.7 | 61.1 | 62.7 | 63.1 | 63.4 | 63.9 | 64.2 | 64.4 |
| 11 Meters | 61.1 | 62.5 | 62.9 | 64.5 | 64.8 | 65.1 | 65.6 | 65.9 | 66.2 |
| 13 Meters | 62.6 | 63.9 | 64.3 | 66.3 | 66.3 | 66.6 | 67.1 | 67.4 | 67.6 |
| 15 Meters | 63.8 | 65.2 | 65.6 | 67.2 | 67.5 | 67.8 | 68.3 | 68.6 | 68.9 |

Satellite Transmitter Power and Bandwidth Availability

For the following analysis, the satellite transmitter power (per spot beam) was assumed to be between 2 and 5 Watts. Similarly, the available bandwidth (per spot beam) was assumed to be between 20 and 120 MHz.

These numbers aggregate to a maximum power of 2,500 Watts for a 10×10 antenna feed array operating at 20% efficiency; and a total bandwidth of 480 MHz for a 4-color frequency reuse plan. The aggregate totals are consistent with the current upper limits for the current Ka-Band satellite industry.

Figure 21:
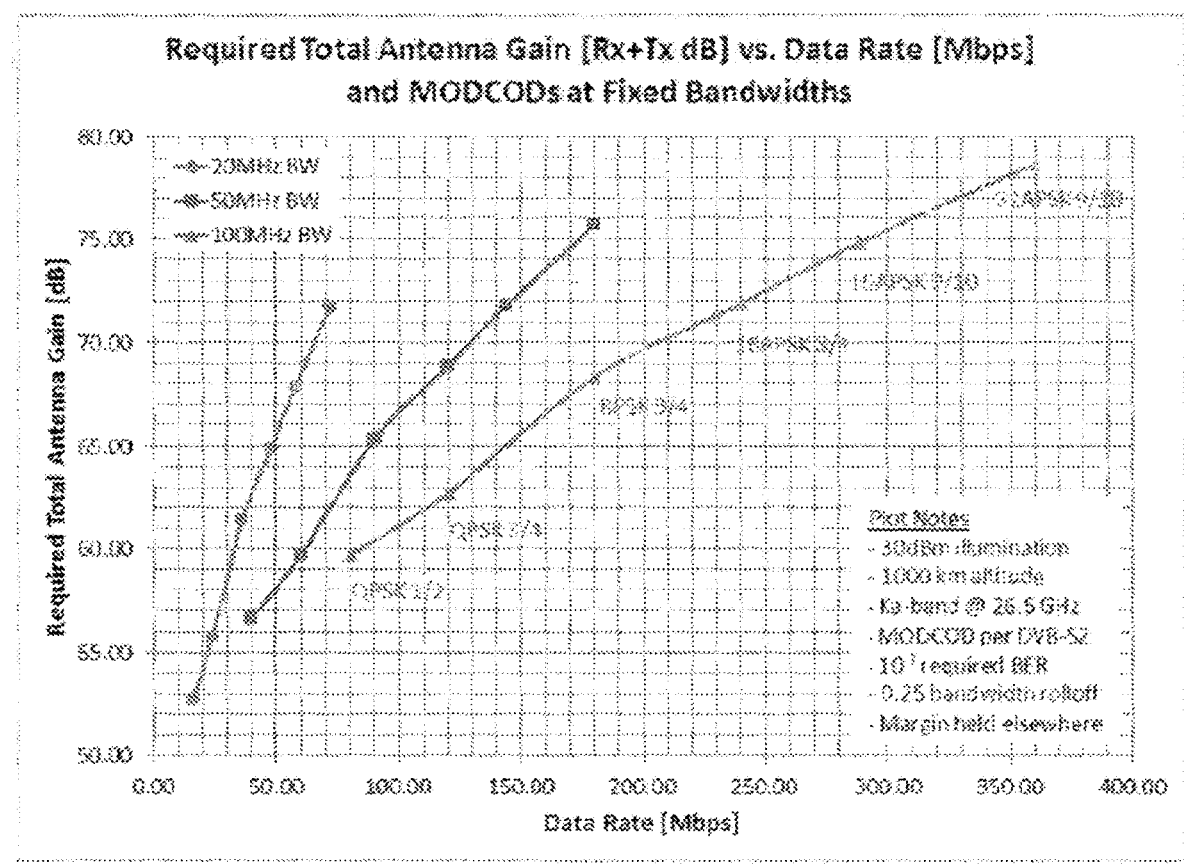
FIG. 21 shows Total Antenna Gain vs. Data Rate and MODCOD for Fixed Bandwidths

For an assumed operating center frequency of 26.5 GHz (a potentially available frequency band), the required Total Antenna System Gain vs. Data Rate is plotted for various allocated bandwidths FIG. 21. Note: All the design curves are normalized to a 1 Watt transmitter and there is no margin included in the design curves.

Thus, consider the following link margin calculation; the proposed system design "will close."

TABLE 7

Link Margin Calculation for Proposed K-band VSAT System Design

| Link Margin Component | dB |
|---|---|
| Spot Beam Transmitter Power | 3 dB (power above 1 Watt) |
| 3 Meter Tx Dish Antenna Gain | 53.5 dB |
| 0.5 Meter Rx Dish Antenna Gain | 41 dB |
| Total Antenna System Gain Required | −65 dB (middle point on design graph) |
| System Design Operating Margin | −30 dB (Rain Fade, Pointing Errors, etc.) |
| Link Closure Margin | 2.5 dB (link will close) |

Assuming the actual System Operating Margin varies around the System Design Operation Margin by +/−10 dB, then the system designed can cost-effectively utilize 50 MHz of bandwidth. Appling this same design methodology, it can be shown that the system design is overpowered for a 20 MHz bandwidth selection and underpowered for a 120 MHz bandwidth selection.

A detailed link analysis at both uplink and downlink frequencies is presented in Section 1.5.3.

GlobalFi™ System Concept

Figure 22:
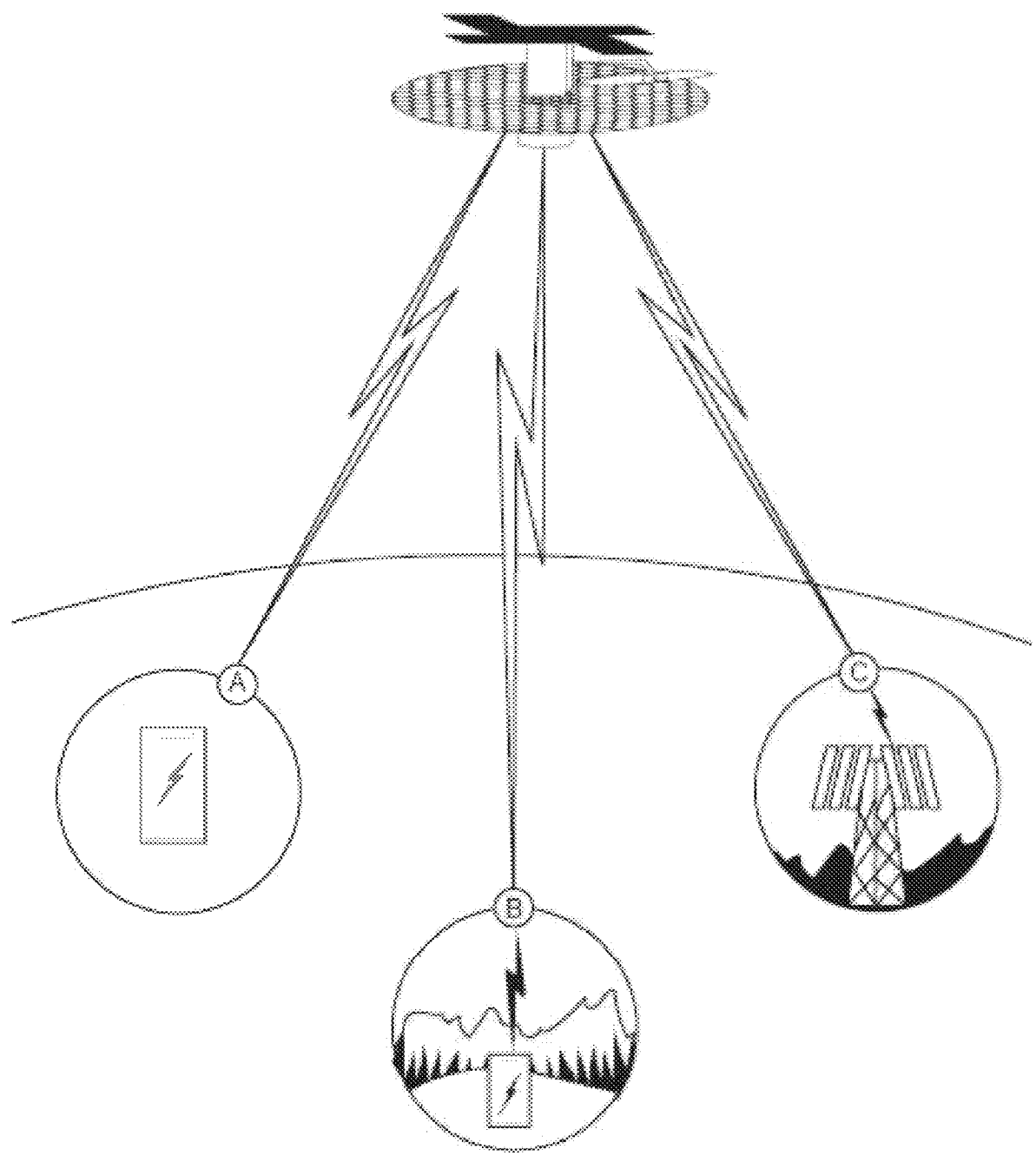
FIG. 22 shows GlobalFi DTSB System in accordance with an embodiment.

FIG. 22 illustrates the GlobalFi concept for using large apertures in LEO to deliver broadband data connections directly to smartphones and other mobile devices.

Design Methodology

The design process employed for the "Global-Fi™" satellite system (and related satellite systems) is present in Table 8, below. The details for each of the design steps are covered in the following sections. This process is similar to the previous process used in the above analysis of the K/Ka-Band to VSAT.

TABLE 8

Satellite Design Methodology

| Step | Process | Notes |
|---|---|---|
| 1 | Define RF Center Frequency | Design Process may need to be repeated twice if Uplink and Downlink frequencies are significantly separated, as in the case or commercial Ka (20/30 GHz) |

TABLE 8-continued

Satellite Design Methodology

| Step | Process | Notes |
|------|---------|-------|
| 2 | Define Satellite Altitude | Normally between 600 and 1200 Km |
| 3 | Define Satellite Antenna Aperture Diameter | Normally between 5 and 20 Meters |
| 4 | Calculate Satellite Antenna 3 dB Beam-width | See link (https://www.easycalculation.com/physics/electromagnetism/3db-beamwidth.php) |
| 5 | Calculate Satellite Antenna footprint on the Earth | Approximately, Satellite Altitude * 3 dB Beam-width (in rads) |
| 6 | Scale the Satellite Antenna footprint by the number of transponders (nxm) | Normally between 60 and 120 (e.g. 8 × 8 or 12 × 10) |
| 7 | Select Gain of the Ground Station Antenna | 0 dB for hand held, 30 to 40 dB for Satellite TV dish |
| 8 | Balance Modulation and Coding (MOD-COD) with available Transmitter Power with available Bandwidth to Optimize Data Throughput | Both Power and Bandwidth are limited and "expensive" quantities |

L-Band Frequency Range

The L-Band frequency range was selected as a basis for the creation of Global-Fi due to the overarching requirement/goal of direct satellite communications with a Smart-Phone. The L-Band frequency range is defined as frequencies from 1-2 GHz. This frequency band offers the significant advantages listed below.

Low Cost Electronics
Limited Propagation Distortion due to Atmosphere and Terrain
Easily Managed Manufacturing Tolerances
Is Widely used in Existing Mobile Communications Systems The primary disadvantage is that the frequency band is limited in availability and must be divided between uplink and downlink. GPS also operates in this frequency band. Our baseline concept is to negotiate with existing cell phone service providers to allow re-use of their frequency allocations in regions that they do not currently serve. The GlobalFi service would thus be an augmentation of existing cell networks that extends their coverage maps to full global coverage.

Antenna Beam-width Calculations

Table 9 lists the antenna 3 dB beam-widths (in degrees) as a function of antenna diameter (in meters), rounded to 2 decimal places. The calculations assume an aperture efficiency of 65%.

TABLE 9

Antenna 3 dB Beam-width (in degrees) as a function of Antenna Diameter (in Meters)

| Operating Frequency: | 1.0 GHz | 1.5 GHz | 2.0 GHz |
|---|---|---|---|
| 3 Meters | 6.75 | 4.50 | 3.37 |
| 5 Meters | 4.05 | 2.70 | 2.02 |
| 7 Meters | 2.89 | 1.93 | 1.45 |
| 9 Meters | 2.25 | 1.50 | 1.12 |
| 11 Meters | 1.84 | 1.23 | 0.92 |
| 13 Meters | 1.56 | 1.04 | 0.78 |
| 15 Meters | 1.35 | 0.90 | 0.67 |
| 17 Meters | 1.19 | 0.79 | 0.60 |
| 19 Meters | 1.07 | 0.71 | 0.53 |

Antenna Footprint Calculations

Tabulated footprint sizes for satellite orbits of 1000 Km and 650 Km are provided in Table 10 and Table 11, respectively.

TABLE 10

Antenna Footprint (in Km) as a function of Antenna Diameter (in m)-Satellite Orbit 1000 Km

| Operating Frequency: | 1.0 GHz | 1.5 GHz | 2.0 GHz |
|---|---|---|---|
| 3 Meters | 117.8 | 78.54 | 58.82 |
| 5 Meters | 70.86 | 47.12 | 35.26 |
| 7 Meters | 50.44 | 33.68 | 25.31 |
| 9 Meters | 39.27 | 26.18 | 19.55 |
| 11 Meters | 32.11 | 21.47 | 16.06 |
| 13 Meters | 27.23 | 18.15 | 13.61 |
| 15 Meters | 23.56 | 15.71 | 11.69 |
| 17 Meters | 20.76 | 13.79 | 10.47 |
| 19 Meters | 18.68 | 12.39 | 9.25 |

TABLE 11

Antenna Footprint (in Km) as a function of Antenna Diameter (in m)-Satellite Orbit 650 Km

| Operating Frequency: | 1.0 GHz | 1.5 GHz | 2.0 GHz |
|---|---|---|---|
| 3 Meters | 76.57 | 51.05 | 38.23 |
| 5 Meters | 46.06 | 30.63 | 22.92 |
| 7 Meters | 32.79 | 21.89 | 16.45 |
| 9 Meters | 25.52 | 17.02 | 12.71 |
| 11 Meters | 20.87 | 13.96 | 10.44 |
| 13 Meters | 17.70 | 11.80 | 8.85 |
| 15 Meters | 15.31 | 10.21 | 7.60 |
| 17 Meters | 13.49 | 8.96 | 6.80 |
| 19 Meters | 12.14 | 8.05 | 6.01 |

As in the K/Ka-Band to VSAT Satellite design, the Global-Fi Satellite design is based upon an array of software defined radios (SDRs) feeding a large aperture. Note: the actual satellite system will most likely be implemented in a more advanced Cassegrain design; however, for the analysis present, the concept shown in FIG. 19 is sufficient. Consider a 100 element SDR array (10×10) each having a spot-beam/foot print calculated in the previous section. Again, the satellite's beam is approximated by a hexagonal "honeycomb" and a 4-color "basic" frequency reuse plan. The "basic" frequency reuse plan is assumed.

To better understand the impact of satellite footprints on satellite system designs, the satellite footprints (for systems operating at 1.5 GHz) are overlaid on maps of Washington State (Seattle and Spokane), Washington D.C., New York City, and locations in the UAE.

Note that these footprint plots do not assume beam steering capabilities. Beam Steering could increase the footprint area addressable by each satellite by a factor of approximately 9.

Antenna Gain Calculations

Table 12 shows the antenna gain (per spot-beam) as a function of antenna diameter (in Meters), rounded to 1 decimal place. The calculations assume an aperture efficiency of 65%.

TABLE 12

Antenna Gain (dBi) as a function of Antenna Diameter (in Meters)

| Operating Frequency | 1.0 GHz | 1.5 GHz | 2.0 GHz |
| --- | --- | --- | --- |
| 3 Meters | 25.1 | 28.6 | 31.1 |
| 5 Meters | 29.5 | 33.0 | 35.5 |
| 7 Meters | 32.4 | 35.9 | 38.4 |
| 9 Meters | 34.6 | 38.1 | 40.6 |
| 11 Meters | 36.4 | 39.9 | 42.4 |
| 13 Meters | 37.8 | 41.3 | 43.8 |
| 15 Meters | 39.0 | 42.6 | 45.1 |
| 17 Meters | 40.1 | 43.7 | 46.2 |
| 19 Meters | 41.1 | 44.6 | 47.1 |

Satellite Transmitter Power and Bandwidth Availability

For the following analysis, the satellite transmitter power (per spot beam) was assumed to be between 2 and 5 Watts. Similarly, the available bandwidth (per spot beam) was assumed to be between 5 and 50 MHz.

These numbers aggregate to a maximum power of 2,500 Watts for a 10×10 antenna feed array operating at 20% efficiency; and a total bandwidth of 200 MHz for a 4-color frequency reuse plan. The aggregate totals are consistent with the current upper limits for the current L-Band satellite industry.

Smart-Phone Antenna Gain

For the analysis presented below, a "Smart-Phone" is assumed to have an average antenna gain of 0 dBi.

Link Margin Analysis

Figure 23:
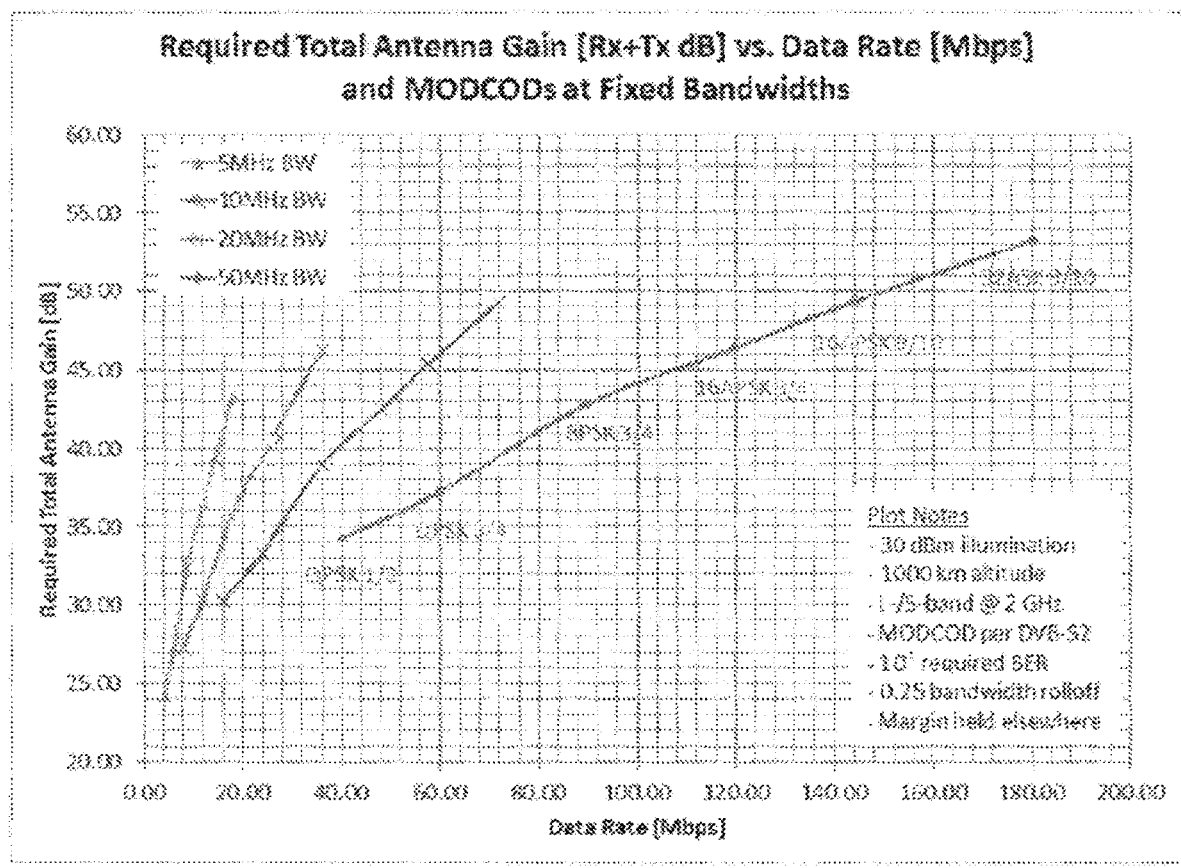
FIG. 23 shows Total Antenna Gain vs. Data Rate and MODCOD for Fixed Bandwidths.

For an assumed operating center frequency of 2.0 GHz (a potentially available frequency band), the required Total Antenna System Gain vs. Data Rate is plotted for various allocated bandwidths in FIG. 23. Note: All the design curves are normalized to a 1 Watt transmitter and there is no margin included in the design curves.

Thus, consider the following link margin calculation; the proposed system design "will close."

TABLE 13

Link Margin Calculation for Proposed System Design

| Link Margin Component | 1 dB |
| --- | --- |
| Spot Beam Transmitter Power | 7 dB (power above 1 Watt) |
| 9 Meter Tx Dish Antenna Gain | 40.6 dB |
| Smart-Phone Rx Dish Antenna Gain | 0 dB |
| Total Antenna System Gain Required | −37 dB (middle point on design graph) |
| System Design Operating Margin | −10 dB (Atmospheric Effects, Pointing Errors, etc.) |
| Link Closure Margin | 0.6 dB (link will close) |

Assuming the actual System Operating Margin varies around the System Design Operation Margin by +/−5 dB, then the system designed can cost effectively utilize 10 MHz of bandwidth. Appling this same design methodology, it can be shown that the system design is overpowered for a 5 MHz bandwidth selection and underpowered for a 50 MHz bandwidth selection. The System Design is questionable as to whether the system design can cost-effectivity utilize 20 MHz of bandwidth.

A detailed link analysis at both uplink and downlink frequencies is presented in Section 1.5.3.

Summary of Link Analyses for VSAT and GlobalFi Concepts Table 14 summarizes detailed link analyses for uplink and downlink of the VSAT and GlobalFi system concepts. Both designs close with available symbol margin >15 dB.

TABLE 14

Link Analysis for VSAT and GlobalFi System Concepts.

| | | V-sat Terminal | | GlobalFi-Smartphone | |
| --- | --- | --- | --- | --- | --- |
| Spectral Content | | Uplink | Downlink | Uplink | Downlink |
| Center Frequency | MHz | 26,500 | 26,500 | 1,800 | 1,800 |
| Data Rate | Mbit/s | 100 | 100 | 20 | 20 |

TABLE 14-continued

Link Analysis for VSAT and GlobalFi System Concepts.

| Spectral Content | | V-sat Terminal | | GlobalFi-Smartphone | |
|---|---|---|---|---|---|
| | | Uplink | Downlink | Uplink | Downlink |
| Coding Rate | | 0.875 | 0.875 | 0.875 | 0.875 |
| Symbol Density | bits/sym | 3 | 3 | 3 | 3 |
| Symbol Rate | MSym/s | 38.10 | 38.10 | 7.62 | 7.62 |
| Allocated Bandwidth | MHz | 53.33 | 53.33 | 10.67 | 10.67 |
| Handset | | | | | |
| Power | dBm | 30 | | 24 | |
| Antenna Diameter | m | 0.8 | 0.8 | | |
| Antenna Efficiency | | 65% | 65% | | |
| Antenna Gain | dBi | 45.06 | 45.06 | 0.00 | 0.00 |
| Geometry | | | | | |
| Altitude | km | 1000 | 1000 | 1000 | 1000 |
| Elevation Angle | deg | 90 | 90 | 90 | 90 |
| Slant Range | km | 1,000 | 1,000 | 1,000 | 1,000 |
| Free Space Path Loss | dB | −180.91 | −180.91 | −157.56 | −157.56 |
| Atmospheric/Rain Loss | dB | 0.00 | 0.00 | 0.00 | 0.00 |
| Spacecraft | | | | | |
| Antenna Diameter | m | 3 | 3 | 10 | 10 |
| Antenna Efficiency | % | 65% | 65% | 65% | 65% |
| Transmit Power | dBm | | 30 | | 30 |
| Antenna Gain | dBi | 56.54 | 56.54 | 43.64 | 43.64 |
| Link Margin | | | | | |
| Noise Temperature | km | 270 | 270 | 270 | 270 |
| Carrier Margin | dBHz | 124.98 | 124.98 | 84.37 | 90.37 |
| Available Symbol Margin | dB | 49.17 | 49.17 | 15.55 | 21.55 |

Communications System Trade Analyses for Tactical K-Band Satcom and GlobalFi™ DTSB
Parabolic Dish Reflectors, Reflect Arrays and Phased Arrays Dish Reflectors, Reflect Arrays and Phased Arrays all represent a class (or family) of large aperture antennas. In general, these large aperture antennas are design to provide a highly focused, pencil beam, in a particular direction. Many times they are also required to maintain a tight angular tolerance (e.g. 0.3 degrees) for their pointing direction. Furthermore, it is often required to move the pointing direction of the antenna at high speeds or subdivide the main beam of the aperture into multiple points of focus. Depending upon the requirements of any large aperture antenna system, the decision to use Dish Reflectors, Reflect Arrays or Phased Arrays is directly tied to the C-SWaP (Cost, Size, Weight and Power) available. The general capabilities and C-SWaP of each large aperture antenna type is discussed below.

Dish Reflectors

Generally speaking, Parabolic Dish Reflector Antennas represent the greatest "performance per dollar" for stationary Point-to-Point communication systems. The basic antenna can be manufactured very inexpensively using a stamped metal reflector and a bolt-on feed structure. Additional costs can be incurred when the reflector antenna needs to be protected from environmental effects, such as by adding a protective radome.

Hidden costs associated with Parabolic Dish Reflector Antennas are primary associated with the installation and pointing of the antenna itself. The antenna's large surface area makes it vulnerable to wind and vibrations. Parabolic Dish Reflector Antennas are also subject to motions of their mounting platforms.

Costs for activity (mechanically) pointed (steered) Parabolic Dish Reflector Antennas increase between one and two orders of magnitude depending on the level of pointing accuracy required. For an "On the Move" communications antenna, the pointing and tracking mechanisms easy overshadow the mechanical aspects of the Parabolic Dish Reflector Antenna.

Finally, multiple beams from a single Parabolic Dish Reflector Antenna requires multiple feed elements that are normally mechanically fixed into position. This again significantly increase the cost and limits flexibility.

In general, Parabolic Dish Reflector Antennas start out incredibly simple and inexpensive and rapidly increase in cost and complexity as their operational requirements become more demanding. Because of this steep curve in cost and complexity, users often look to Phased Array antenna technology as an alternative solution to Parabolic Dish Reflector Antennas. Unfortunately, Phased Arrays have their own cost and complexity issues that often direct users back to Parabolic Reflector Antennas.

Phase Arrays

RF Phased Arrays use numerous small antennas (elements) to steer RF beams without mechanical movement. Their lack of moving parts enables them to look in several directions at once. However, this technology is extremely expensive and can take many years to engineer and build. The primary cost driver of Phased Arrays is the packing density of the elements necessary to enable a Phased Arrays' full capabilities. The general "rule of thumb" is 4-elements per square wavelength of aperture area. For Ka-Band frequencies, the wavelength is on the order of 1 cm; hence 4-elements are required for each square centimeter of antenna aperture. This is equivalent to 40,000 elements per square meter of antenna aperture. Furthermore, Phased Arrays experience a cosine roll-off performance factor as a function of scan angle, forcing apertures to be oversized by as much as a factor of two, to maintain performance levels. Thus, worse case, a Ka-Band Phased Array would require 160,000 elements per equivalent square meter of aperture. Over the years, various methods have been tried to reduce the element count, each with their own unique constraint on the Phased Array's performance.

In addition to the element count, there are the ancillary components associated with exciting and controlling each antenna element (e.g. waveguides, phase shifters, diplexers, controllers and low noise amplifiers). Each of these ancillary components adds cost, adds weight and generates heat. With a multiplication factor of 160,000, the marginal effects of any of these additional components are significant.

For satellite applications, an additional concern is that phased arrays generate significant side lobes across a wide range of angles, and as the arrays steer the main beam, these side beams also move. These side lobes pose a significant risk for causing interference with other satellites, such as neighboring satellites in a SATCOM constellation.

Reflect Arrays

Use of Reflect Arrays as Sub-Reflectors for Cassegrain Antenna Systems One promising use of Reflect Arrays is as sub-reflectors for Cassegrain antenna systems. Since the sub reflector of a Cassegrain antenna system is normally small (less than a square meter), the number of reflecting elements and associated control circuits remains manageable (as compared to that of the large Cassegrain reflector), while most of the benefits of Phased Arrays/Reflect Arrays are imparted on the Cassegrain system (Beam steering and Multi Beam capability). It is this hybrid Reflect Array-Cassegrain Antenna System that we proposed to implement the OrbWeaver 10 system.

This choice of antenna system design is consistent with related DARPA development efforts such as DARPA-BAA-14-53: Advanced Scanning Technology for Imaging Radars (ASTIR)

"The goal of the Advanced Scanning Technology for Imaging Radars (ASTIR) program is to demonstrate a new imaging radar architecture using an electronic sub-reflector to produce a more readily available, cost effective sensor solution that does not require platform or target motion as In SAR or ISAR. The ASTIR concept will minimize system complexity by using a compound antenna with an electronic sub-reflector and a single transmit/receive chain. The sub-reflector would work in concert with a large primary aperture that would define the angular resolution of the radar."

Cost and Capabilities Comparison

A direct cost and capabilities comparison between Dish Reflector Antennas, Reflect Arrays and Phased Arrays is complicated by the need to develop ASIC and other specialized electronic circuitry for Reflect/Phased Arrays. Dish Reflector Antenna technology is a mature technology where many of the necessary components are commodity items. Reflect Array and Phased Arrays are newer technologies and hence significant amounts of custom component developments need to happen from them to become commodity items. While Reflect/Phased Arrays can (and are) fabricated from discrete components, their cost and SWaP make them impractical for all but the most specialized applications. However, once the initial investments in ASIC and other specialized electronic circuitry have been made, they appear to be a preferred option to Dish Reflector Antennas. For this proposed effort, the assumption has been made that the necessary Phase Array ASIC technology will not be available in a timely manner and thus we will pursue a Hybrid Reflect Array Cassegrain Antenna with Dish Reflector configuration.

Parabolic vs. Spherical Reflector

Figure 24:
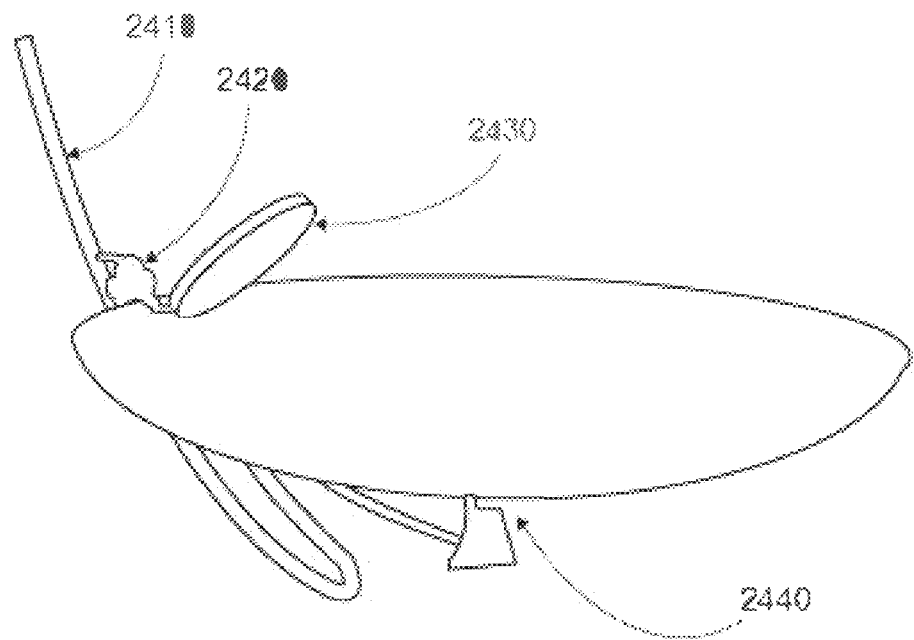
FIG. 24 shows 'AntennaFab' additive manufacturing system configured to manufacture parabolic antenna reflectors in accordance with an embodiment.

TUI is currently developing additive manufacturing systems designed to perform ISM (In-Space Manufacturing) of parabolic and shaped beam reflector antennas. FIG. 24 illustrates one such concept of TUI's family of "Antenna Printer" technologies. The objective of this work is to enable GEO communication satellites (and other high throughput satellites) to fabricate and integrate larger or additional reflectors thus increasing their capabilities and capacities. An overview of TUI's reflector antenna printers is given in Volume II—Part II.

Since 2008, TUI has been working to develop an ecosystem of technologies to enable ISM of key elements of space systems. Our intention is to build upon the architecture and component technologies developed in our SpiderFab NIAC and Trusselator 140 SBIR efforts to implement a family of "Constructible" technologies that will supplant current deployable technologies by enabling space programs to field larger, higher performance systems with lower life-cycle costs.

Figure 25:
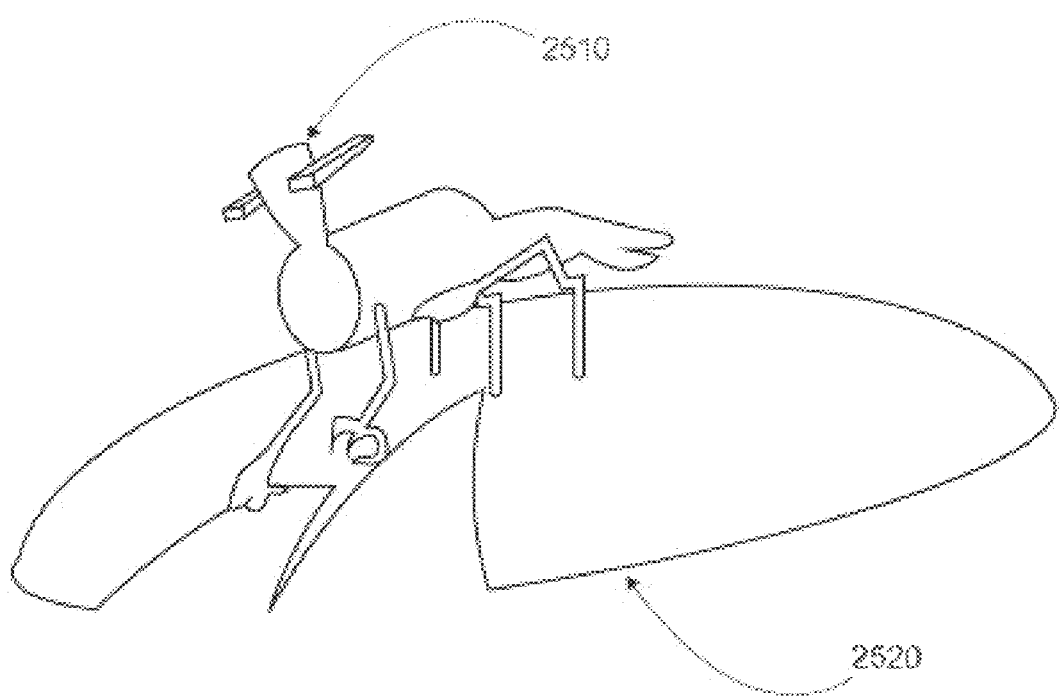
FIG. 25 shows a SpiderFab System for In-Space Manufacturing (ISM) of large antennas in accordance with an embodiment.

One of the many interesting ISM architecture questions is how does the reflector dish printing mechanism scale with the size of the reflector being printed. Ideally, one would like the "Antenna Printer" mechanism size to remain constant and "small", independent of the size of the antenna being printed. While the example device presented in FIG. 24 benefits from being essentially a 2D device, the mechanism's size scales with the size of the reflector antenna under fabrication; hence, making the architecture less desirable. This is not the case for the more complex mechanism presented in FIG. 25, where the size of the mechanism is, for the most part, independent of the size of the reflector antenna under fabrication. Unfortunately, the complexity of the second mechanism also makes it a less desirable architecture.

Figure 26:
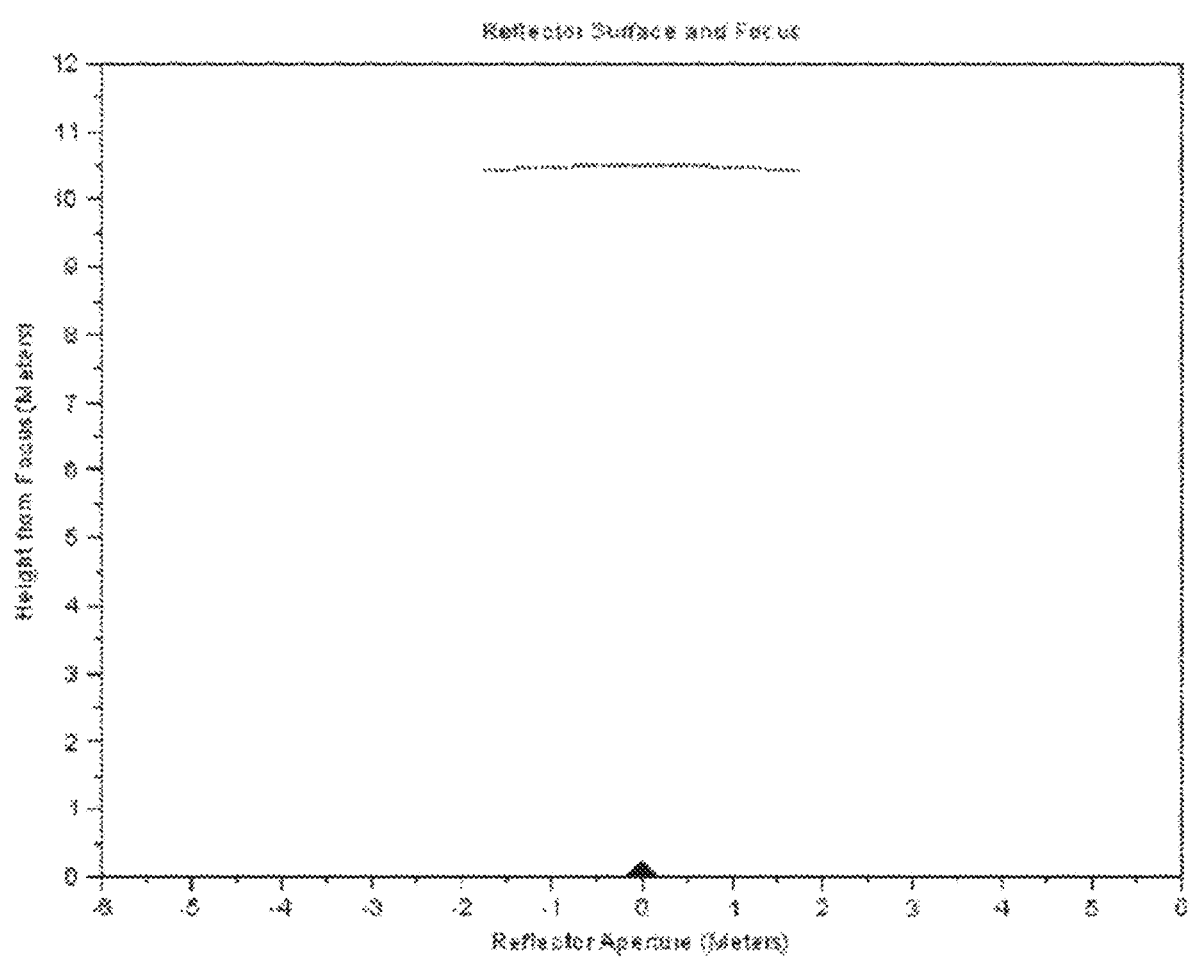
FIG. 26 shows 3.5 Meter Reflector Antenna with a F/D Ratio of 3 in accordance with an embodiment.

A solution to this problem is found in the examination of the curvatures of large reflector antennas. FIG. 26 shows the "minimal" curvature associated with a large reflector surface having a high F/D (Focal Length to Diameter) ratio. As can be seen from the figure, the change in curvature over the reflector's aperture is very slight.

In addition, it is known from conic section theory that all parabolas can be approximated by a circle at their vertex. In fact, the radius of curvature at the vertex of a parabola is simply twice the focal length of the parabola as shown in FIG. 27.

Figure 27:
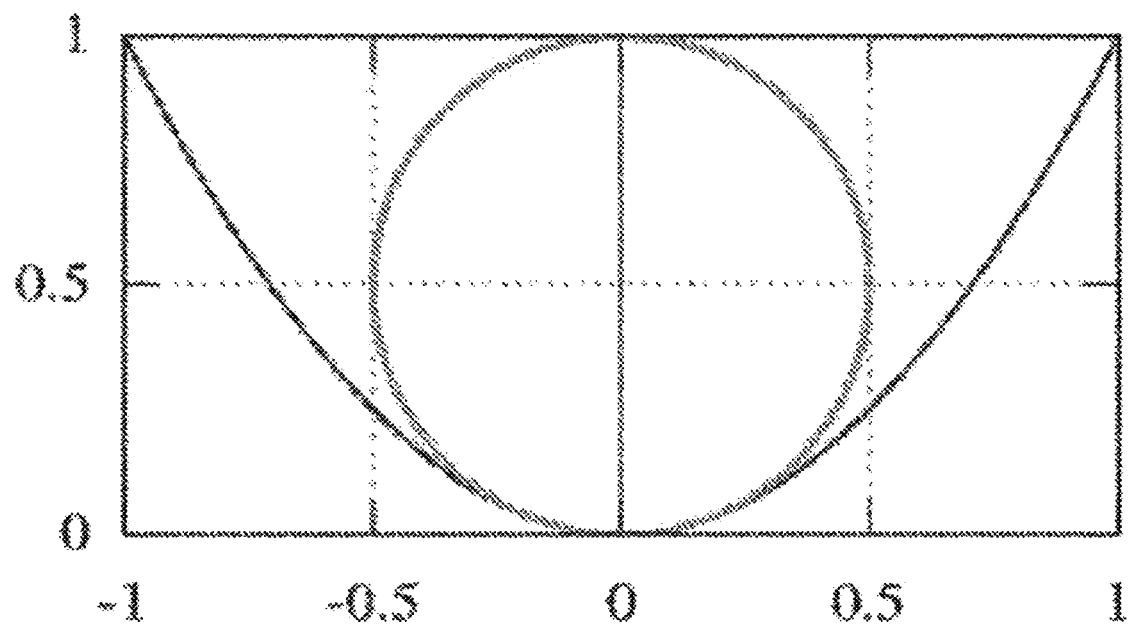
FIG. 27 shows Radius of Curvature for a Parabola at its Vertex.

As can be inferred from FIG. 27, a circular approximation of a parabola is valid for a "usable" region of a reflector aperture. This usable region also increases as the F/D ratio of the parabola increases. For F/D ratios on the order of 2 to 3, this usable region of the aperture increase to a point where the aperture can close a "meaningful" RF Space to Ground link.

Figure 28:
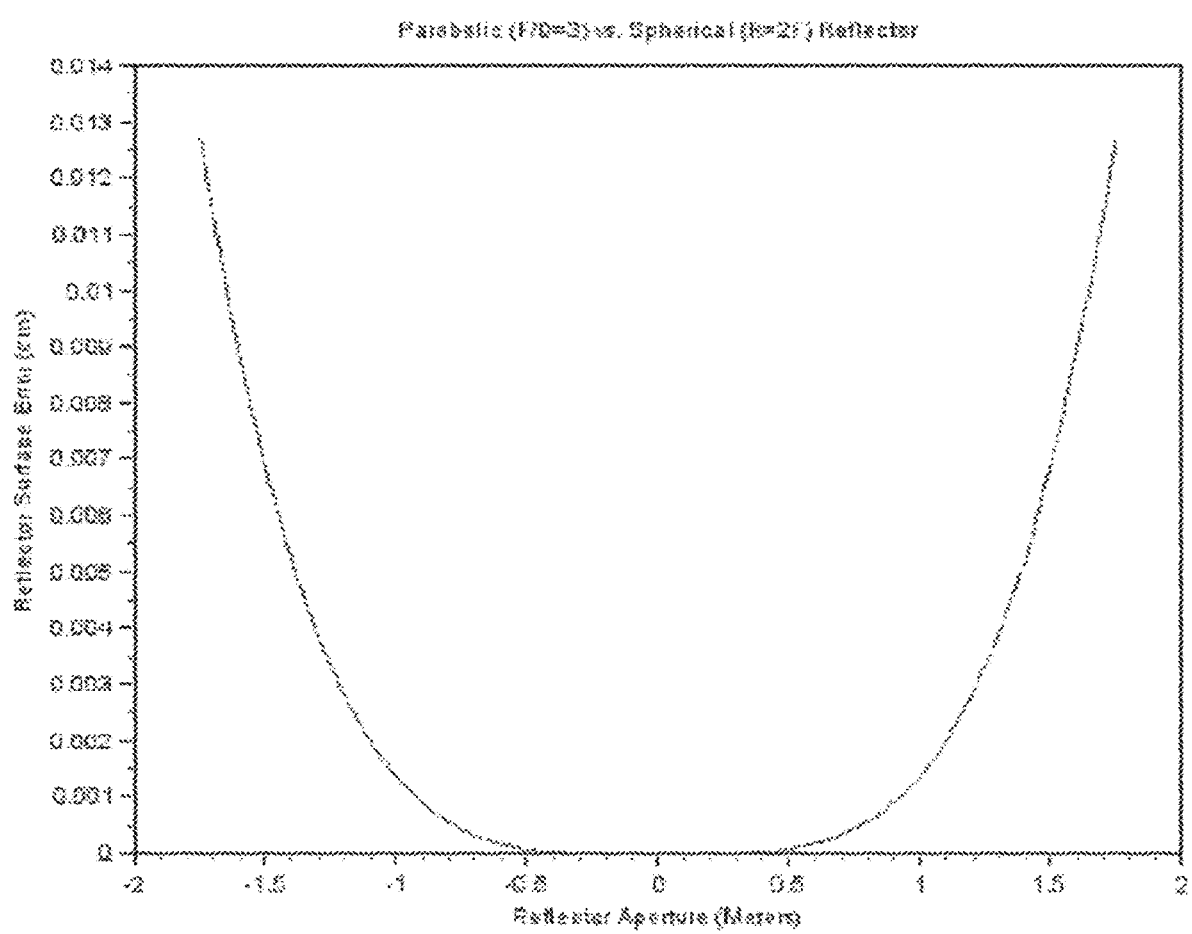
FIG. 28 shows Approximation Error for 3.5 Meter Reflector Antenna with F/D=3.

FIG. 28 shows the approximation error associated with using a constant radius of twice the focal length for a 3.5 Meter aperture with a F/D ratio of 3. As can be seen from the figure, the surface error is sufficient to support operating frequencies well above Ka-Band (error<<1 cm).

Phase Error Correction and Beam Steering

While parts of the analysis present throughout this proposal use a simplified, focal point feed, parabolic reflector as a reference design, an actual instantiation of the proposed satellite system would most likely employ a Cassegrain antenna design, where the large parabolic reflector is approximated by a spherical reflector and the small focal plane reflector is replaced with a ReflectArray. This configuration is preferable for the following reasons:

The spherical main reflector allows for highly scalable fabrication processes and tooling The Reflect Array allows for real time correction of manufacturing and alignment errors The Reflect Array allows for various types of antenna beam steering Each of these features is discussed in detail below.

Spherical Main Reflector

From a mechanical standpoint, a spherical surface can be constructed from a series of hexagonal sub-surfaces that can either be manufactured on-orbit or packaged in a tight volume for launch. From an electrical/RF prospective, the constant radius of curvature greatly simplifies the complexities associated with electronic beam steering in conjunction with a highly parabolic surface. Provided that "space" is available to support the long focal lengths necessary for the spherical approximate to remain valid; a spherical main reflector is most likely the best choice for the proposed satellite system.

Real Time Correction of Manufacturing and Alignment Errors

The most difficult part of any on-orbit fabrication or deployment activity is the "one time" nature of the process. Once the on-orbit fabrication or deployment has happened, there is rarely an opportunity to go back and correct unintended issues found with the end product. In most cases the end user has to live with the end product, like it or not.

The inclusion of a ReflectArray into the satellite system design provides end users the rare ability to "correct" for unintended issues that may occur during the on-orbit fabrication process. The key benefit that a ReflectArray brings is the ability to "locally" adjust the phase of the wave front to "pre-correct" for any anomalies associated with the spherical reflector surface. Hence, large reflectors that may have been manufactured incorrectly can be accounted and corrected for allowing the satellite system to perform at its "full" potential.

The ReflectArray also has the potential to correct for thermal effects and CTE issues as well as external forces such as solar pressure and atmospheric drag. The ability to electronically control the antenna's beam pointing direction, to correct for minor pointing errors, greatly reduces the requirements on the satellite's ACS (Attitude Control System).

Beam Steering

Figure 29:
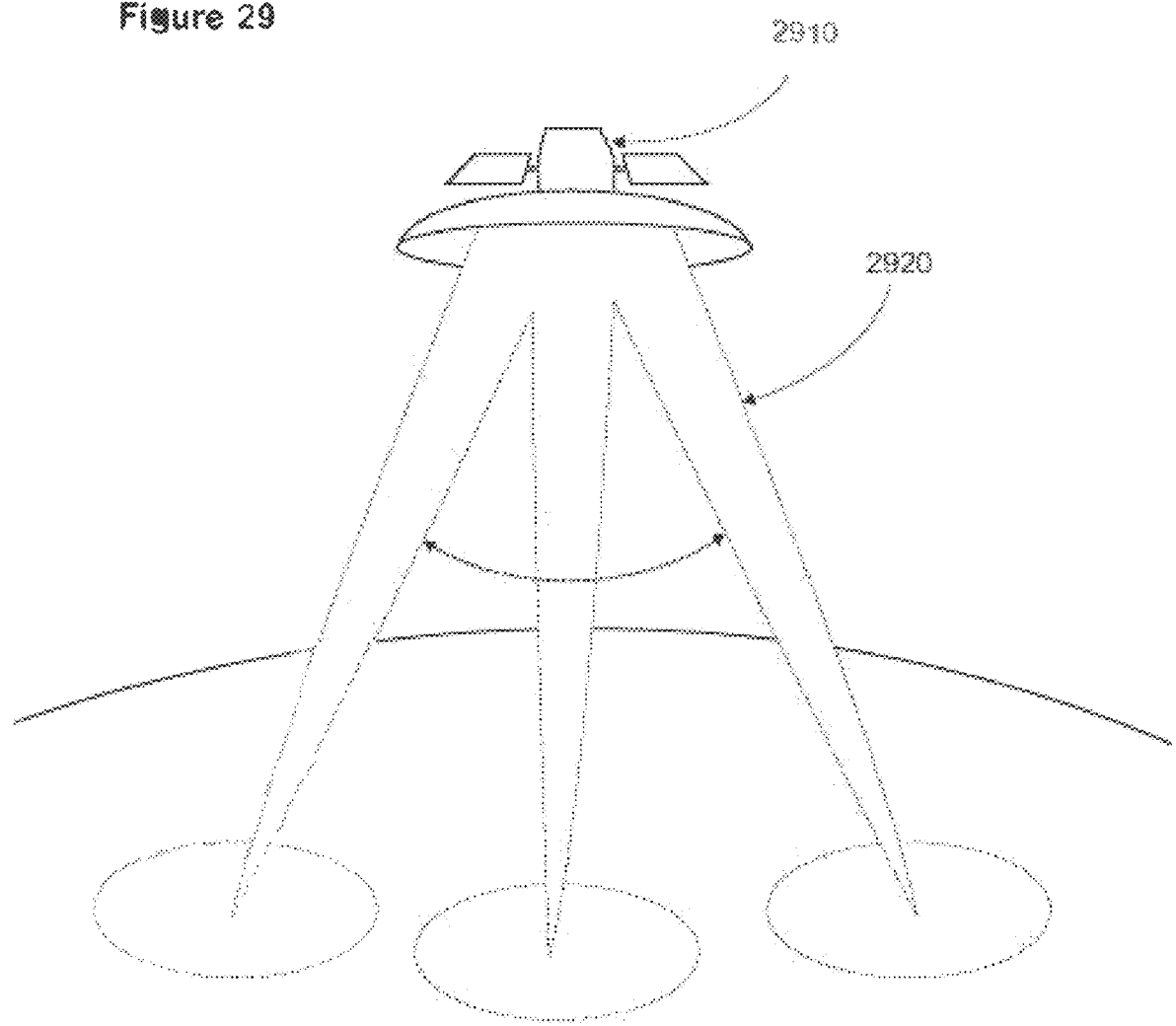
FIG. 29 shows Dynamic Main Beam Pointing in accordance with an embodiment.
Figure 30:
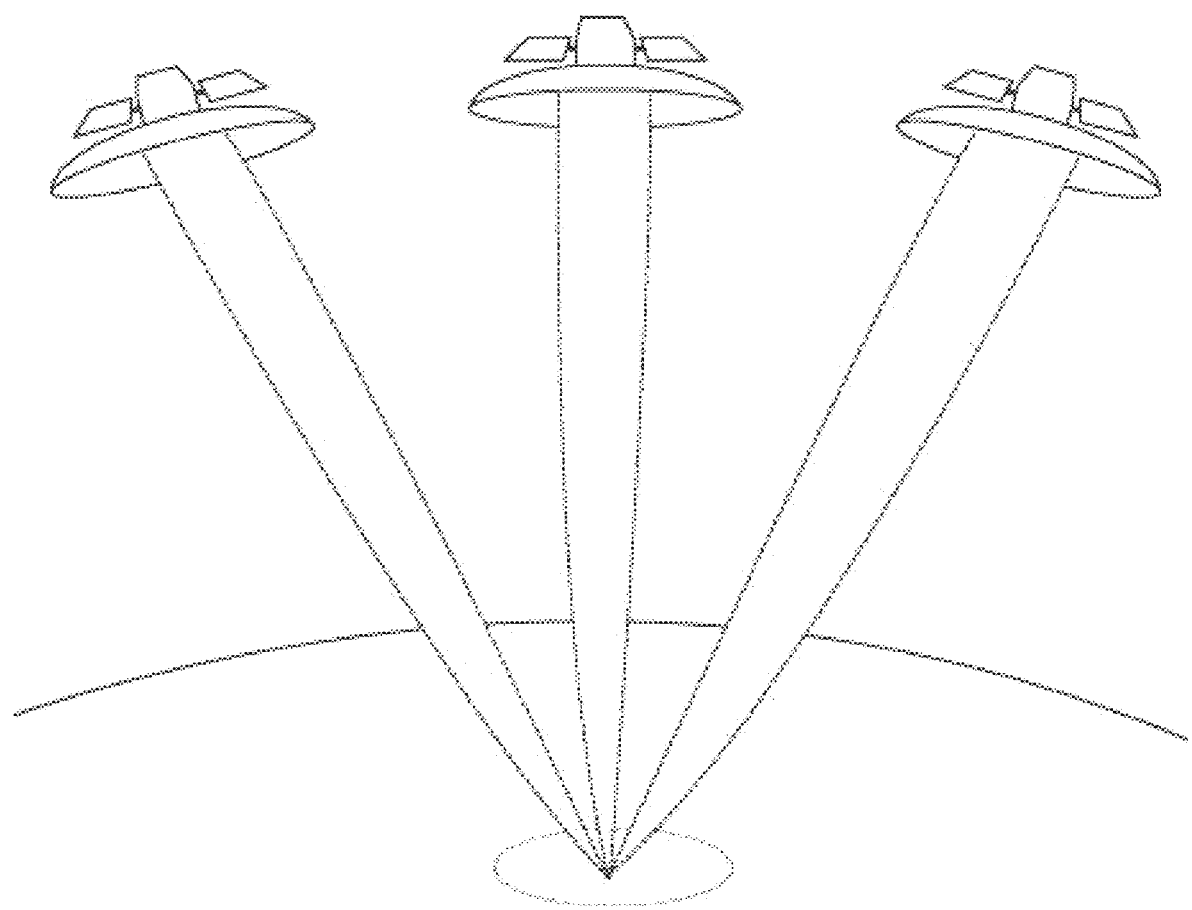
FIG. 30 shows Extended Dwell Beam Steering in accordance with an embodiment.
Figure 31:
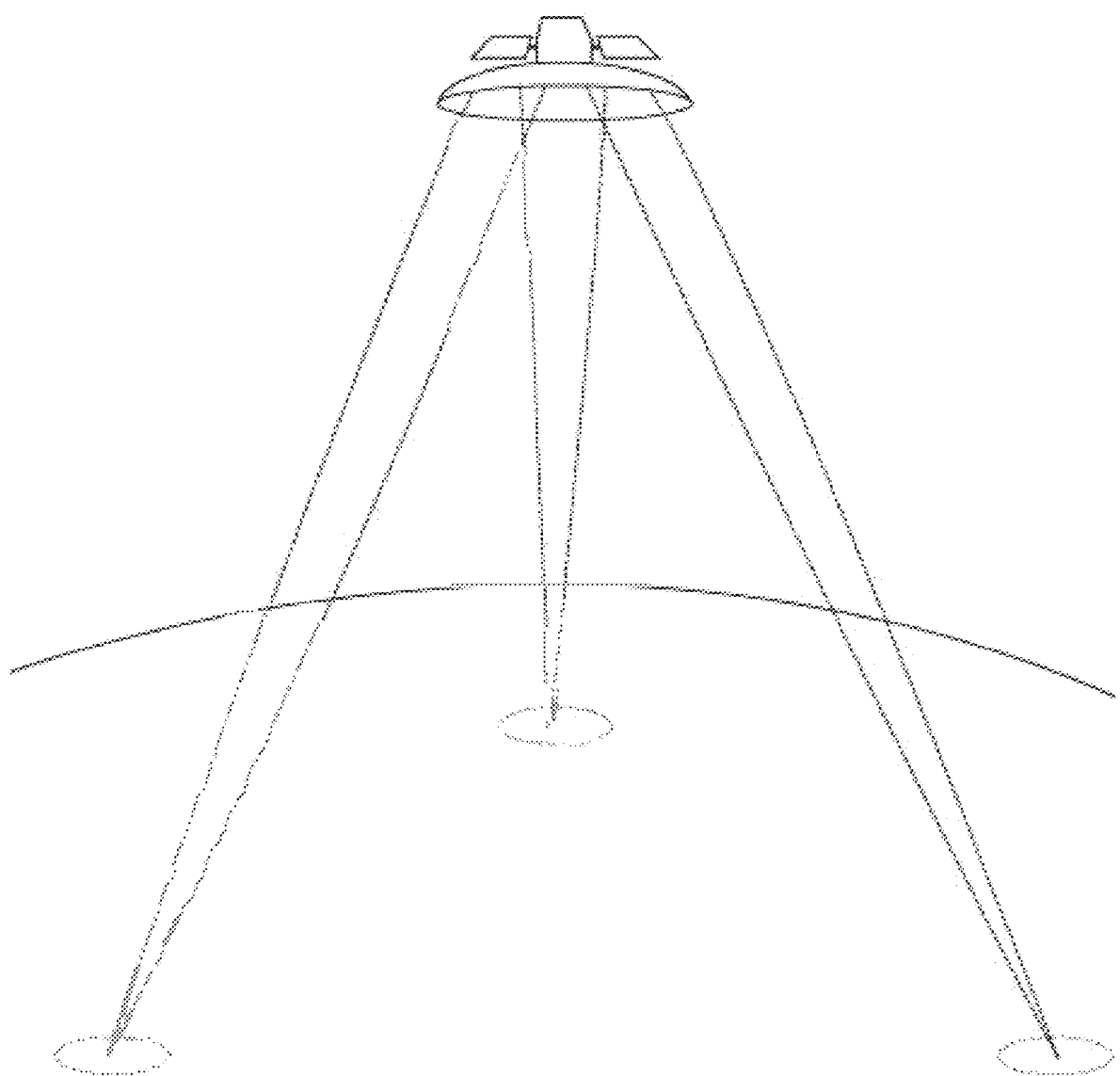
FIG. 31 shows Simultaneous Multiple Spot Beams in accordance with an embodiment.

A Cassegrain antenna design employing a Reflect Array as its sub-aperture offers three types of electronic beam steer that are beneficial to the overall satellite mission. First, the antenna design can offer "dynamic" main beam locations (the switching of the satellite's main beam from one geo-location to another) in real time without any satellite maneuvering. Second, the antenna design can offer extended "dwells" on a given geo-location if required by the ground user. Finally, when working in conjunction with the reflector antenna's feed array, the antenna design can offer simultaneous- multiple spot beams at various geo-locations. Each of these three types of beam steering is illustrated in FIGS. 29, 30, and 31, respectively.

Reflect Array Feed Structure

Figure 32:
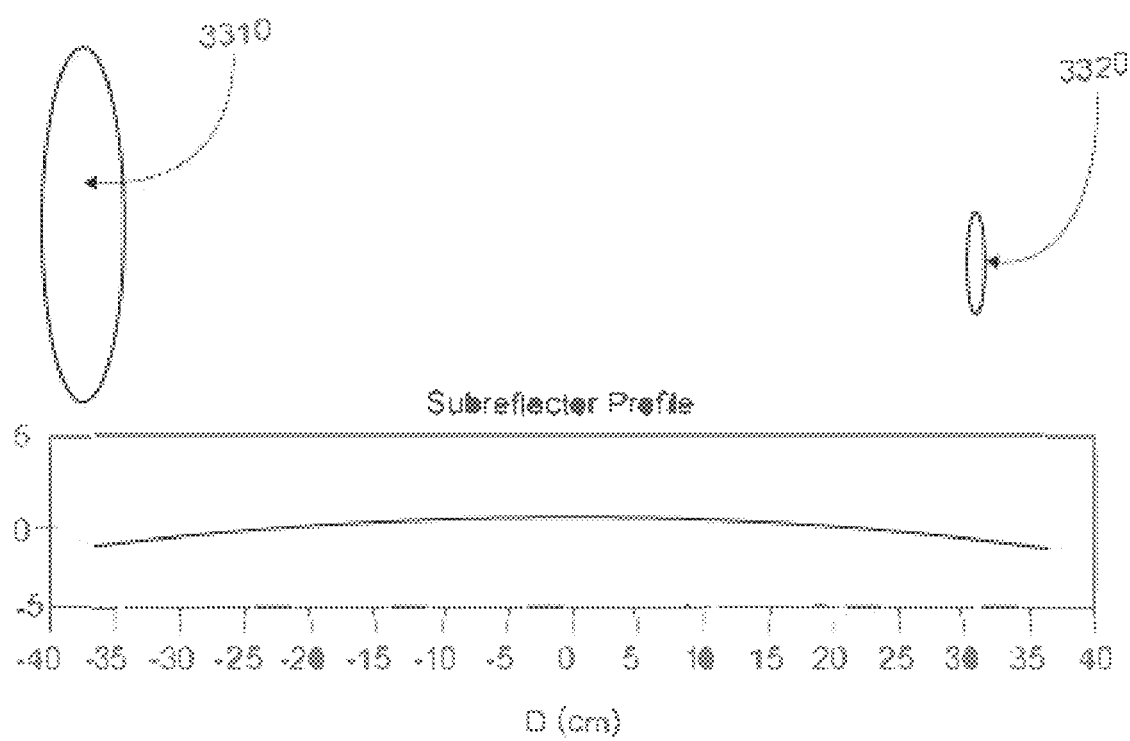
FIG. 32 shows Reflector geometry and subreflector profile in accordance with an embodiment

FIG. 32 illustrates a simplified representation of the dual-reflector optics, where the main and subreflector 130 are shown along with a blowup of the subreflector 130 profile. The desired hyperbolic subreflector 130 shape is nearly planar, approximately 70 cm in diameter and 1.1 cm deep. Given the shallow depth of the subreflector 130, it is possible the reflect-array can be fabricated on a flat surface to simplify manufacturing, with fixed delay lines added to the elements to account for the deviation off of planar.

Figure 33:
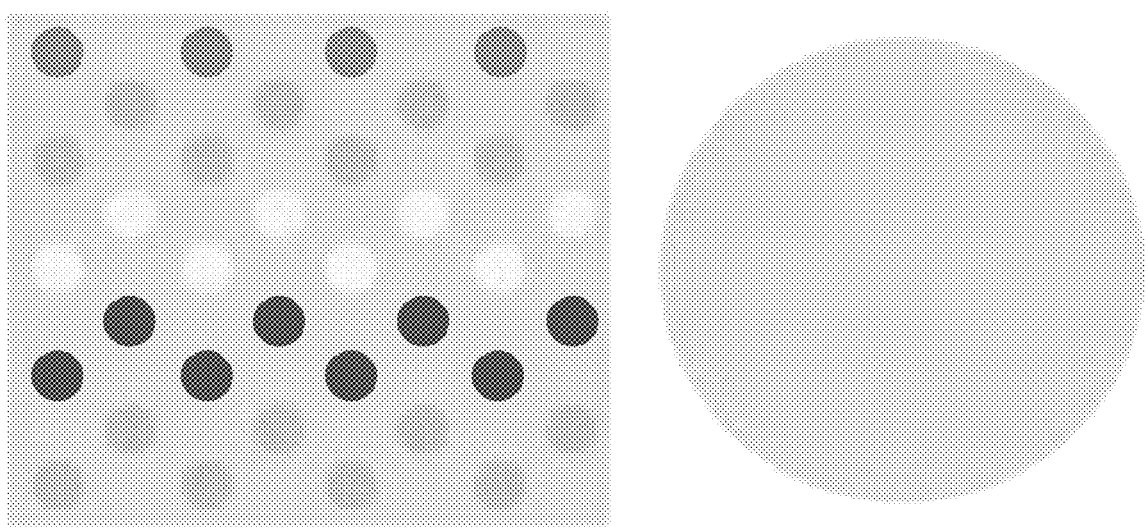
FIG. 33 shows an example of subset of DRA elements in reflectarray (left) and ~5000 elements on the subreflector profile (right).

Given the expected slowly varying phase gradient across the aperture, the current premise is the reflect-array will require an element spacing of approximately 0.9 wavelengths at 30 GHz; as a result the required reflect-array element count will number on the order of 5000 elements as illustrated in FIG. 33. To account for arbitrary polarization, the elements will be dual-polarized where each polarization has separate phase control.

In general, the performance of properly designed arrays with large element counts tends to degrade gracefully with randomly distributed element failures. As part of the design process, the reflectarray performance verses requirements will include a 1-2% (50-100) element failure potential to mitigate this risk.

Reflectarray Element Phase Control

Element phases will be adjusted using low-loss switches tied to a number of discrete reactive loads. For the switch network, high efficiency, wideband switches are readily available from commercial sources. Alternatively, surface mount single-pole/dual throw switches can be chained to create wideband, arbitrarily large switch networks as needed. Once the switching structure has been developed the control circuitry can be designed easily using standard electronics components and tied to a predefined interface. Initial analysis shows as few as 8 impedance states (equivalent to an SP8T switch) to control the elements phase appropriately. Each impedance state will be designed using chip mount inductors and capacitors.

Figure 34:
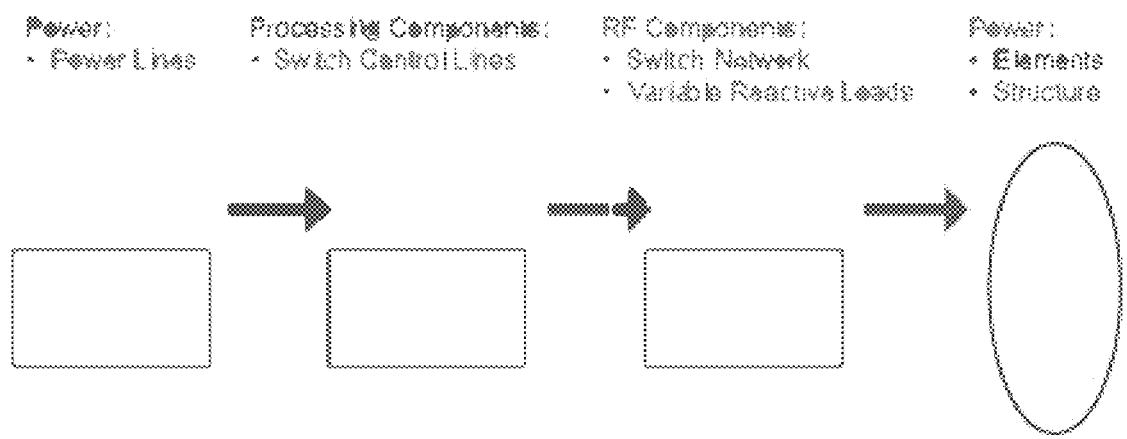
FIG. 34 shows a ReflectArray architecture diagram in accordance with an embodiment.
Figure 35:
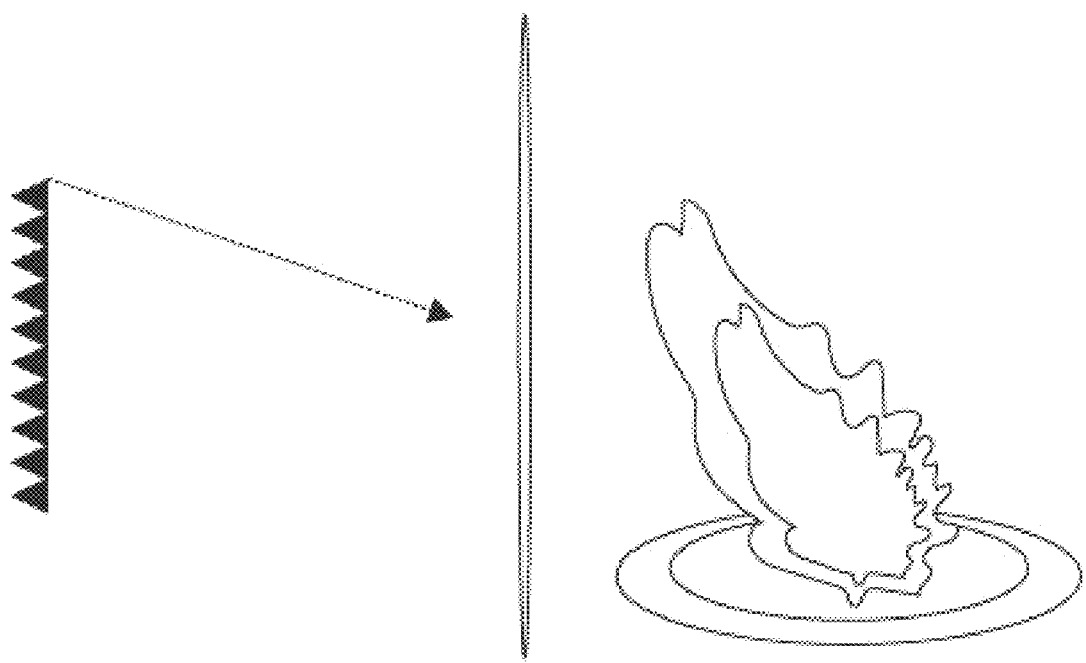
FIG. 35 shows Feed cluster illuminating reflect-array subreflector (left) and subsequent reradiation (right).

The notional architecture for the reflectarray is shown in FIG. 34. An RF switch network is used to terminate each element in the reflectarray. The switch will have multiple impedance states (reactive loads) used to terminate the elements. Each load state will allow the elements to reradiate with a unique phase. By adjusting the phase states, the reflectarray can engage in limited scan and be used to compensate the imperfect optics of the main reflector. Given an approximate element count of 5000, for dual-polarized phase control the baseline implementation will utilized 10,000 switch networks (two per element). Independent control of each switch network will result in 10,000 control and power lines.

ReflectArray Operation

The primary purpose of the reflect array will be to correct for manufacturing defects in the main reflector surface. An algorithm will be developed to actively adjust the reflect-array phases to compensate for the as-build geometry deformations; the maximum reflector distortions are expected to be on the order of a wavelength.

During normal operation, the feed cluster will allow for discrete scanned beams based upon the individual feed locations within the cluster. For example, FIG. 34 illustrates a beam scanned off of the reflectarray using the outermost feed element as the source (results in a scanned system beam through the main reflector optics). Additional scan will be possible with the reflect-array phase control, where for instance the same scanned beam shown in FIG. 34 can be generated using a central feed element and the appropriate reflect-array phasing.

Dish Reflector Feed Structure The baseline design for the OrbWeaver 10 Cassegrain satellite utilizes a 10×10 transmit array and a 10×10 receive array each located at the center of the primary reflector 1 W. The two arrays are interweaved in structure. The 10×10 structure provides 100 independent transmitting and 100 independent receiving spot beams, each projected on the Earth's surface.

In addition, each of the transmitters in the transmit array and each of the receivers in the receiver array will be phased locked. This allows multiple transmitters and/o receivers to work in conjunction with one another to dynamically adjust their spot beam's shape and pointing direction.

An example embodiment of these antenna feed arrays comprises TUI's K/Ka-Band SWIFT Software Defined Radios (SDRs). TUI's K/Ka-Band SWIFT SDRs have phased locked, dual channel transmit and dual channel receive, systems included in their base design. The dual channel transmit and receive systems allows the baselined 10×10 transmit array and the 10×10 receive array to be realized in one 5×5 array of SWIFT K/Ka-Band Radios.

5×5 Phase-Locked Regular Feeder Array

Figure 36:
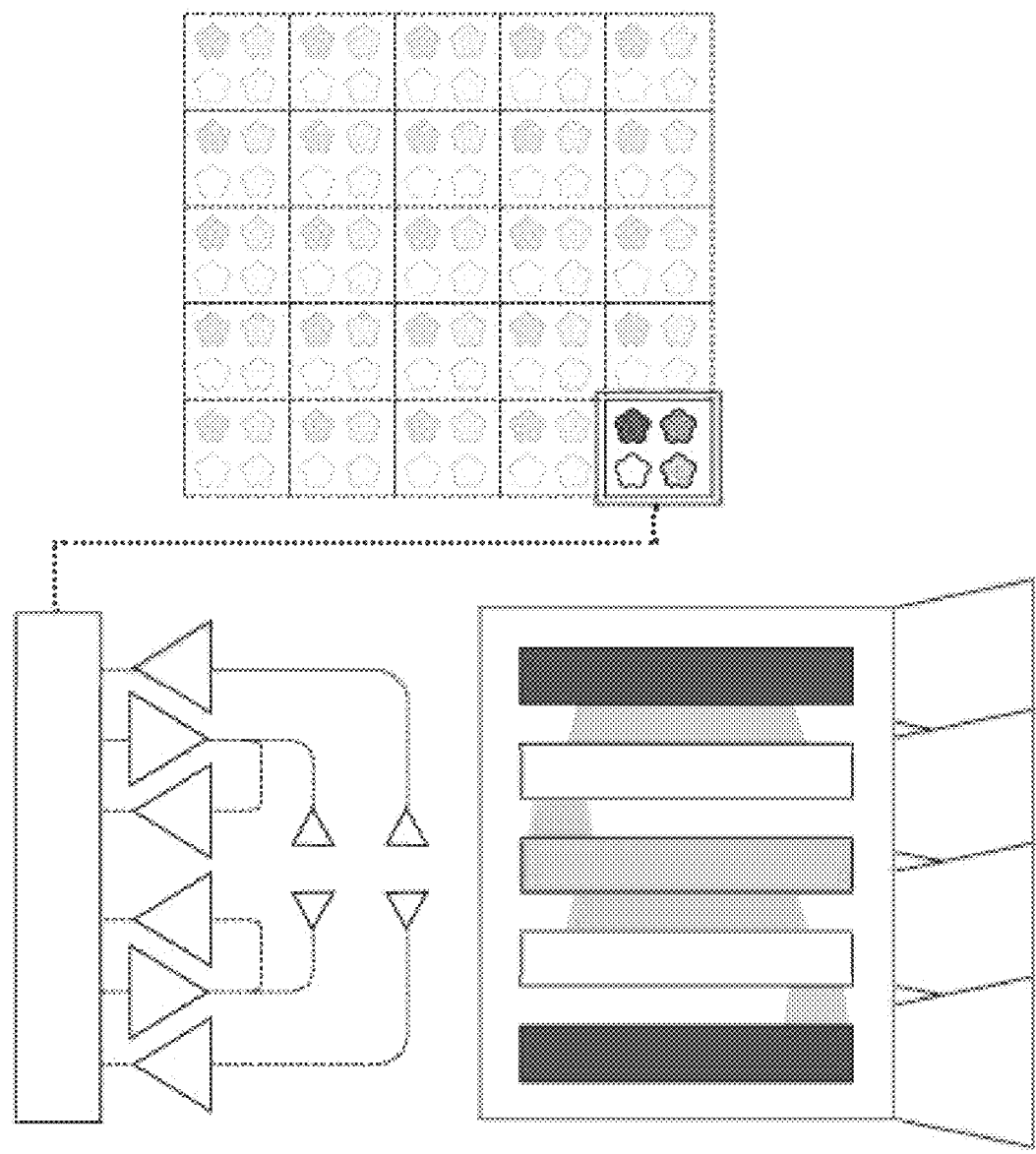
FIG. 36 shows A 5×5 phase-locked regular tile array of radio blocks will be used to feed the antenna.

The feed for the fabricated antenna will be constructed as a regular array of identical software-defined radio blocks based on TUI's high-maturity SWIFT software-defined radio platform. TUI has high-TRL SWIFT SDR solutions at UHF, S, L, and X-bands, and is currently developing K/Ka solutions under funding from Army/SMDC. The SWIFT platform consists of a modular selection of plug-n-play digital baseband processors and RF frontend up/down converters, all designed and built specifically for micro-satellite applications. The SWIFT SDRs are designed to enable phase-coherent operation of multiple SDR units, to accomplish beam steering or multi-ball collection applications. The 5×5 regular tile array architecture is depicted in FIG. 36. Each tile will consist of four feed horns and monolithic radio block that is itself constructed with five key elements:

2× K-/Ka-band 1 W transmitters (30 dBm output)
2× dual-channel K-/Ka-band receivers (4 receivers per tile)
1× digital baseband processor The interface to the baseband processor will include both Gigabit Ethernet (for both data and command/control) and time/frequency synchronization signaling.

Two key features will be leveraged to maintain phase-lock of the entire tile array. The first will be a daisy-chained distribution (w/local delay compensation) of time and frequency signaling. This time and frequency synchronization signaling will be used as a local phase reference for each radio block and then redistributed to the next tile in the array. The second will be the use of a dedicated receiver connected to the output of each transmitter to auto-calibrate the phase offsets introduced during up-conversion and compensate for non-linearities in the power amplifiers.

TABLE 15

SWaP characteristics of the SWIFT K-band 5 × 5 regular tile array.

| Power | 50 W (Tx: 15 W/ea, Rx: 5 W/ea.) | 1250 W |
|---|---|---|
| Mass | 1 kg | 25 kg |
| Volume | 10 × 10 × 10 cm (1,000 cm$^3$) | 250 × 250 × 10 cm (25,000 cm$^3$) |

Figure 37:
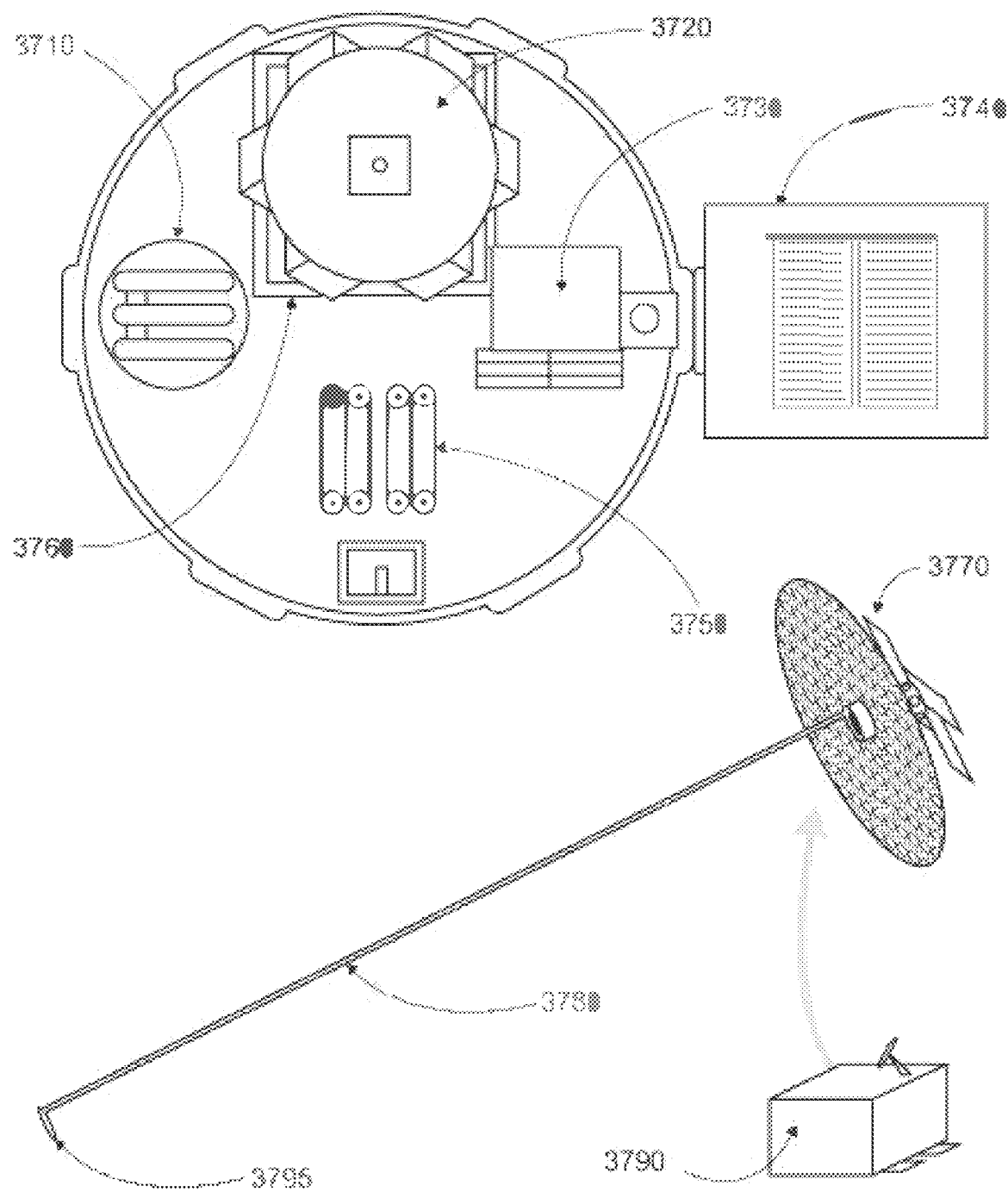
FIG. 37 shows an OrbWeaver embodiment.

FIG. 37 presents an overview of the OrbWeaver 10 concept. An example method comprises steps comprising de-construction of an ESPA ring 2D, use of its material to manufacture and assemble a large antenna system 100, and integration of the antenna with RF and satellite bus components to create a small satellite system capable of closing a multiple high-bandwidth data links to K-band VSAT terminals. The RF payload and in-space manufacturing and assembly components can be packaged within the ESPA ring 20, and the satellite bus and power supply will occupy one payload port on the ESPA. Total system launch mass (not including ESPA ring 20) is 320 kg.

An OrbWeaver 10 embodiment can enable in-space manufacture of large aperture RF systems to provide transformative communications capabilities, such as a K-band smallsats to provide resilient tactical SATCOM to VSAT terminals and the GlobalFi Direct-to-Smartphone Broadband system.

An OrbWeaver embodiment 10 can provide resiliency and surge capacity for DoD SATCOM services, and to do so at a cost point lower than traditional SATCOM system architectures. It will serve as a cost-leverage deterrent against emerging anti-satellite threats to existing SATCOM assets. This is a critical need because our nation's tactical, strategic, and intelligence operations are highly reliant upon SATCOM services provided primarily by a handful of large satellites located in geosynchronous orbit (GEO), and these GEO SATCOM satellites are vulnerable to adversarial anti-satellite capabilities. The many-year development timelines and many-hundred-million-dollar costs of traditional large GEO comsats pose obstacles to responsive reconstitution or augmentation of these systems in times of need, and so a radically different approach is required.

An OrbWeaver 10 embodiment can 'recycle' and re-purpose components of launch vehicles on-orbit to create the steered RF apertures necessary for SATCOM missions. In-space recycling of the mass available on launch vehicles, such that adapter rings such as the ESPA, interstage components, shrouds, or tanks will dramatically reduce the launch costs required to deploy high-performance SATCOM systems. It will also provide a solution for repurposing the many tons of mass available in spent upper stages and other space debris, creating a commercially viable path towards self-funding active remediation of the space debris environment. An OrbWeaver 10 embodiment provides on-orbit manufacturing and assembly of large RF antennas. This in-space manufacturing (ISM) capability enables creation of very large antenna apertures at lower cost and with significantly smaller launch volume requirements than existing deployable antenna solutions. These advances, combined with emerging high-performance small-satellite platforms and software-defined radio technologies, will enable an OrbWeaver 10 to fly as a secondary payload on an ESPA ring 20 and then responsively create a smallsat SATCOM system able to close the link to VSAT terminals on the ground at total system costs nearly two orders of magnitude lower than traditional SATCOM systems. OrbWeaver 10 embodiments enable the DoD to affordably populate low Earth orbit with 'discarded ESPA rings' that, upon command, can responsively transform into highly-capable SATCOM systems to reconstitute or augment military SATCOM capabilities.

Commercial Direct-to-Mobile SATCOM

The capability to affordably create very large RF apertures on-orbit will also enable OrbWeaver 10 embodiments to address a significant commercial opportunity, that of providing ubiquitous broadband data services to mobile users. In the commercial sector, there is currently significant interest and investment in developing constellations of low Earth orbit (LEO) communications satellites to provide broadband data services to customers that are underserved by existing terrestrial cable and wireless data services (e.g. OneWeb and SpaceX constellation), as well as to provide low-latency communications links (e.g. BridgeSat, LeoSat, SkyFi) for financial markets. A key limitation of all broadband constellations under development is that they rely upon traditional fixed or deployable antennas on the satellites, which are limited in gain due to size and cost constraints. As a result, closing the link to the LEO satellite requires a bulky and expensive satellite terminal or 'hotspot'. This requirement limits the potential market of these services to customers able to afford costs of the 'hotspot' antenna. If, however, the satellite side of the system had sufficient gain to close the data link directly to an unmodified mobile device, the potential market of such a system could be every smartphone user on the planet, a market size expected to exceed 2.5 billion customers by 2018. Although deployable antenna technologies exist at the sizes necessary, their costs are an order-of-magnitude too high for the business case for such a venture to close. An OrbWeaver 10 system in accordance with an embodiment will enable creation of a smallsat platform with the 10 meter antenna necessary to close the link directly to mobile devices, and do so with the tenfold reduction in antenna cost necessary for the 'Direct-to-Smartphone Broadband' (DTSB) business case to close.

Figure 38:
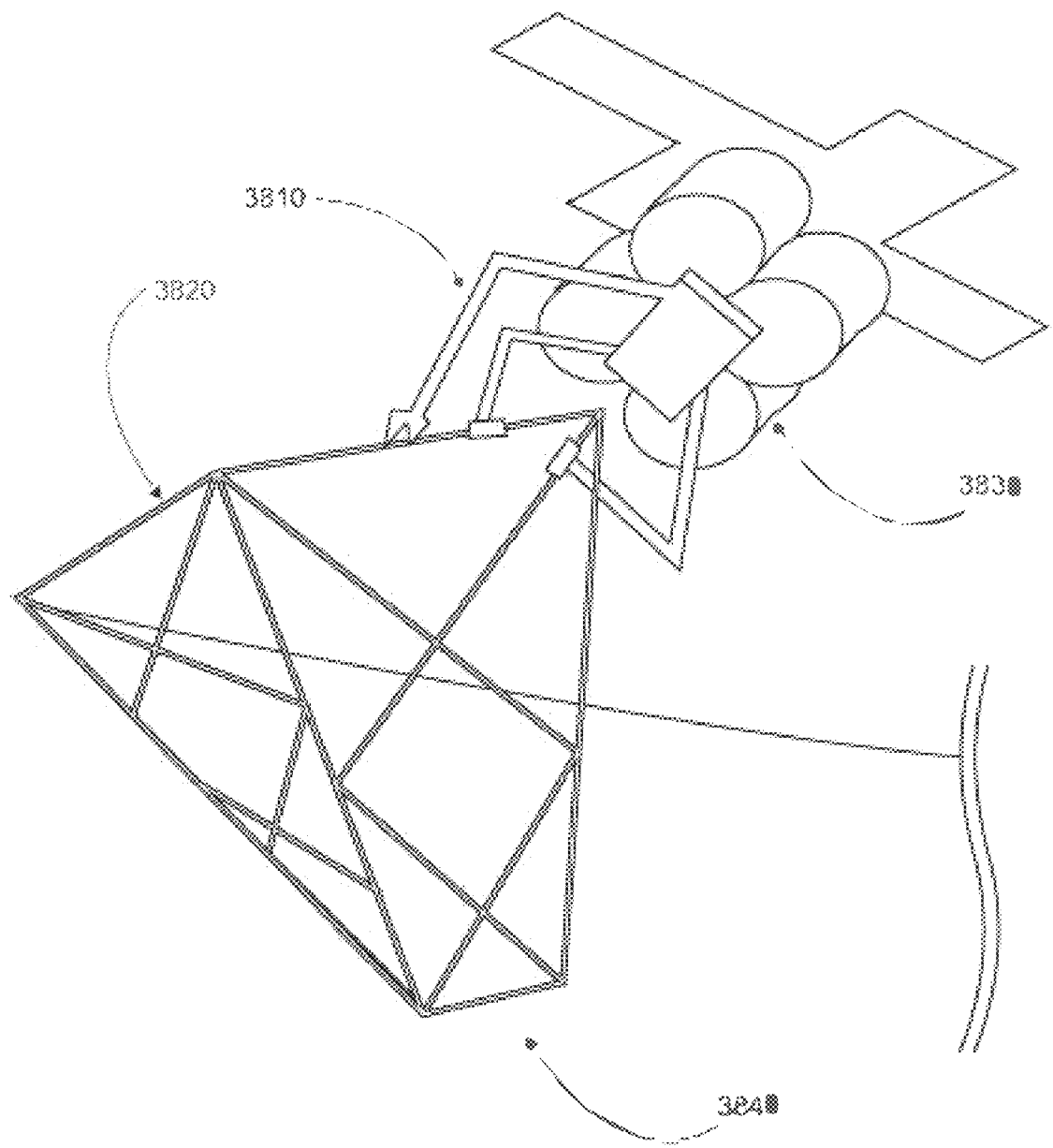
FIG. 38 shows assembly of a support structure for a parabolic reflector by a mobile 'SpiderFab' robot in accordance with an embodiment.
Figure 39:
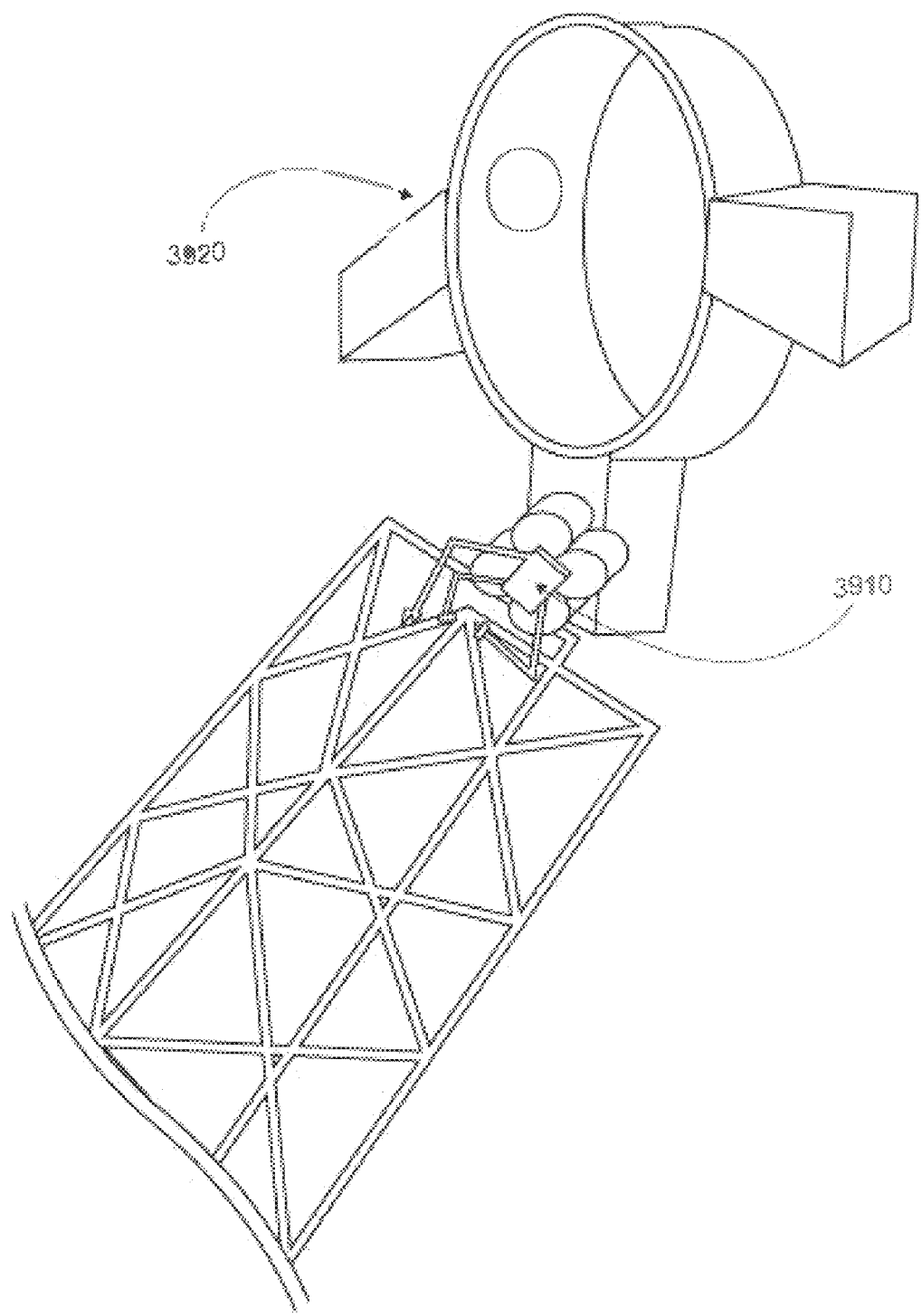
FIG. 39 shows in-space manufacture of a large phased array antenna using a SpiderFab robot hosted on an ESPA ring in accordance with an embodiment.

In-space manufacturing in accordance with an embodiment can enable creation of apertures dramatically larger than can be packaged within a rocket shroud using state-of-the-art deployable technologies, enabling significant improvements in space system power, data throughput, sensitivity, and resolution. Embodiments combine additive manufacturing techniques with robotic assembly methods, as illustrated in FIG. 38 and FIG. 39. Embodiments comprise devices and methods for in-situ manufacture of high-performance composite truss 150 structures that can be used to support long-baseline sensors, antennas, arrays, and other large spacecraft components.

An embodiment comprises a Trusselator, a mechanism capable of taking feedstock in the form of spools of carbon fiber reinforced thermoplastic (CFRTP) tape and forming it into carbon fiber trusses. The Trusselator 140 provides a means to position the antenna sub-reflector at the focal point of the main reflector.

Figure 40:
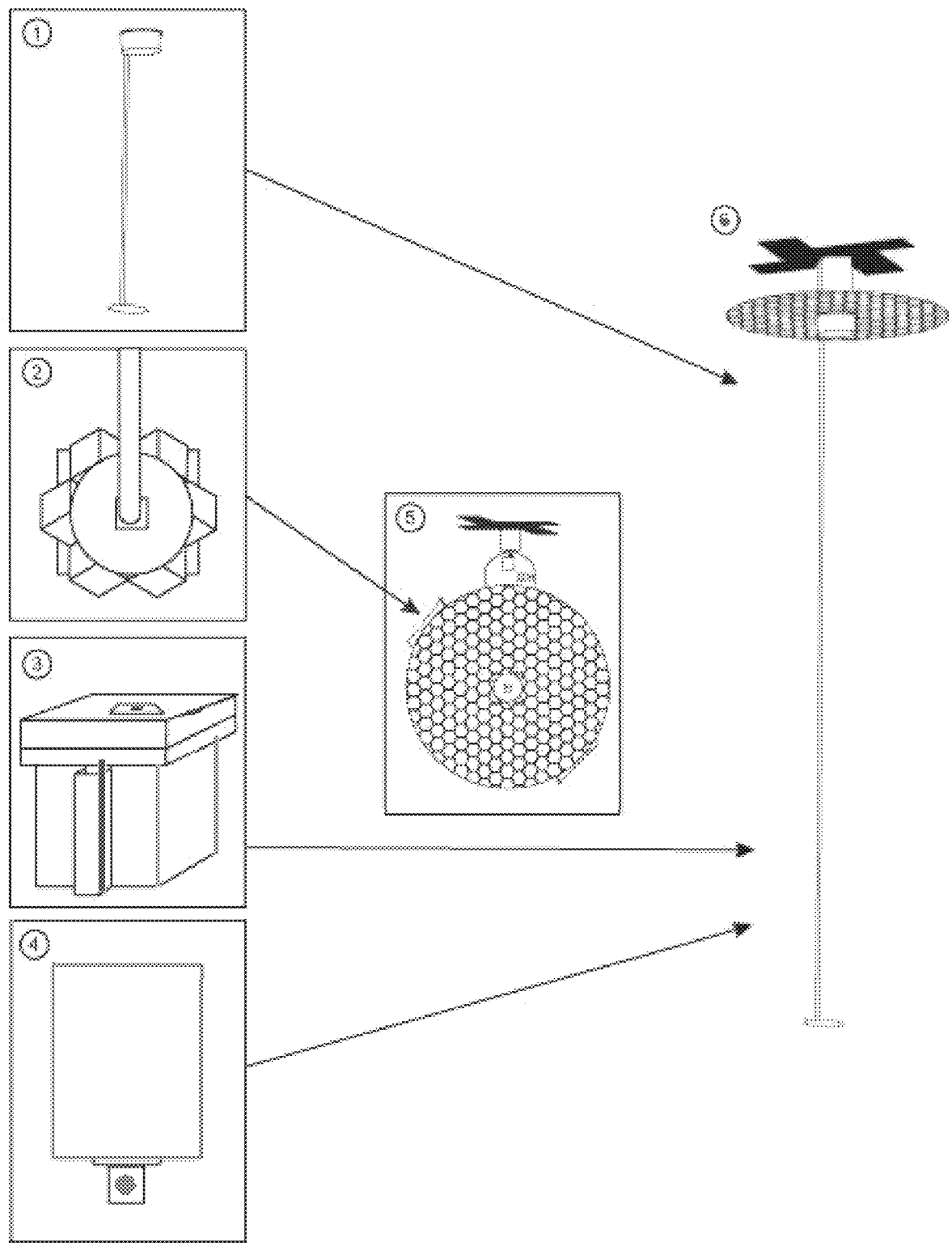
FIG. 40 shows a roadmap for developing and commercializing technologies for in-space manufacturing and construction of SATCOM systems in accordance with an embodiment.
Figure 41:
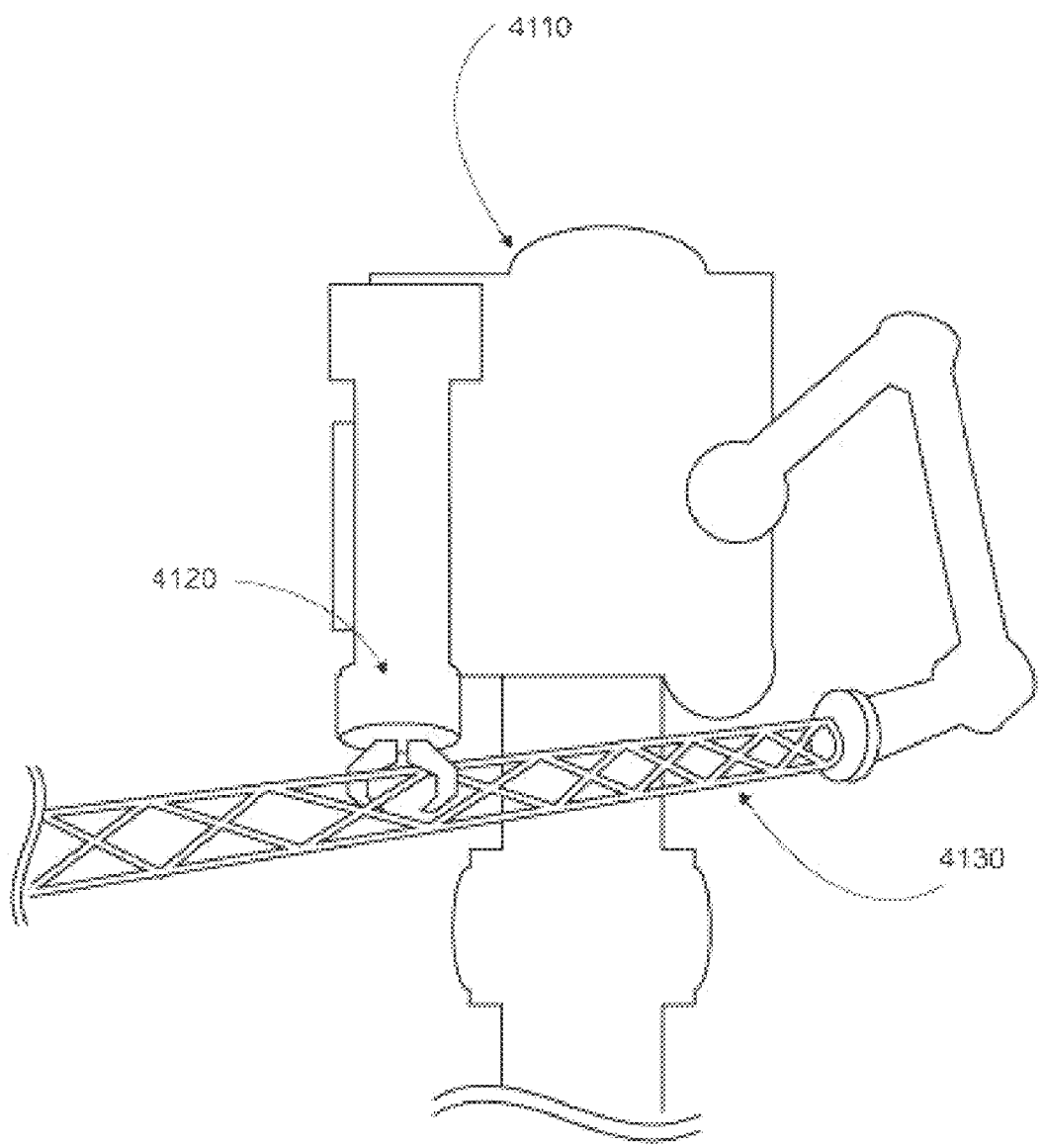
FIG. 41 shows Carbon Fiber Truss to Custom Joint End-Effector Robotic Assembly in accordance with an embodiment.

FIG. 40 illustrates a technical roadmap in accordance with an embodiment. Embodiments of Orbweaver systems 10 comprise ISM devices and methods combined with software defined radio (SDR) such as TUI's SWIFT SDR and smallsat component technologies for in-space construction of a DTSB satellite constellation.

Nibbler 180 and Grapple End-Effectors 190

An embodiment's Grapple end-effector 190 is used by a KRAKEN robotic arm 170 to: transfer the RF Assembly 120 from its initial location in the ESPA ring 20 to SPOT 160, transfer hexagonal reflector section 70 from the Hexcaster 60 to SPOT 160, support the reflector during assembly, and transfer the PowerCube 30 to the assembled reflector 110.

The mold used to make the antenna reflector section 70 will comprise 2 grapple points, one in the center and one on the periphery. The grapple point on the periphery is used for transferring the reflector section to the jig. The grapple point in the center is used by the jig for assembly. The grapple points at the center and periphery have unique geometries that allow a camera mounted on the end-effector to identify and locate the grapple points. The grapple end-effector 190 is designed to be compatible with both the center located and periphery located grapple points. This design allows the robotic arm and jig to use either grapple point. For the KRAKEN robotic arm 170, the grapple end-effector is a detachable end-effector that will be located in an end-effector changer for changing. For the jig positioning arms, the grapple end-effector is permanently mounted to the arms.

For an example embodiment, the Nibbler 180 end-effector is used by the KRAKEN robotic arm 170 to remove material from the ESPA ring 20 and transfer that material to the Refabricator-Plus 50 for fabrication of each 250 mm hexagon reflector section. Each 250 mm reflector section 70 has a thickness of 2 mm. Based on this volume, 327 g of aluminum is required. Inclusion of the welding tabs, grapple points, and margin bumps this mass of aluminum for each hexagonal reflector section to 350 g.

Figure 42:
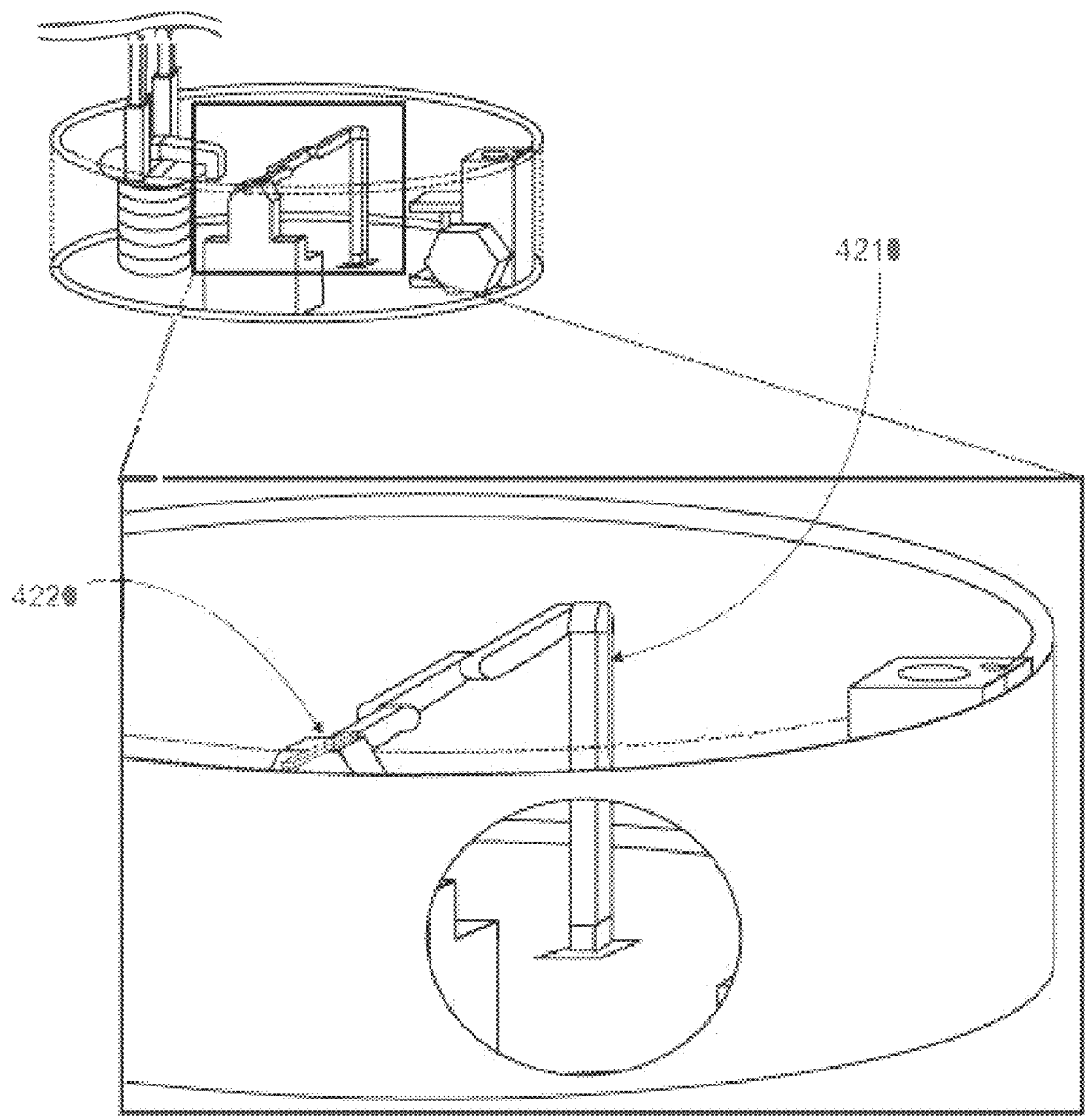
FIG. 42 shows a Nibbler End-Effector in accordance with an embodiment.

An example Nibbler 180 end-effector as shown in FIG. 42 uses a pinching type material removal tool. This type of material removal tool has high cutting capacity and similar commercial nibblers can remove material of removing material from aluminum up to 12.7 mm. An embodiment could employ a material capture system that would trap the nibbled pieces 80 of aluminum as they were removed and store the aluminum 80 in a thin material containment chamber. Pieces 80 of removed material could be forced into this tube through mechanical action or eddy current separation. Eddy current separation is used in the separation of aluminum cans from other metals. In eddy current separation the induced currents from a varying magnetic field produce diamagnetic-like repulsion properties that force non-ferrous conductors like aluminum away from the magnet while the ferrous materials are attracted to the magnet. A bristle boundary, flap, or piston type mechanism could be used to help retain the pieces in the tube. A critical aspect of the design is to ensure that no debris can be released during the deconstruction process. If the material can be compacted in the tube using eddy current separation or other technique, the amount of material could be sensed with distributed light source on one side of the transparent tube and a photodetector strip on the other. After the approximate 350 g grams of aluminum have been captured, the KRAKEN arm 170 will transfer the material to the input chamber of the Refabricator-Plus 50. A piston internal to the Nibbler 180 end-effector will then be used to drive the aluminum chips Into the melt chamber of the Refabricator-Plus 50.

Figure 43:
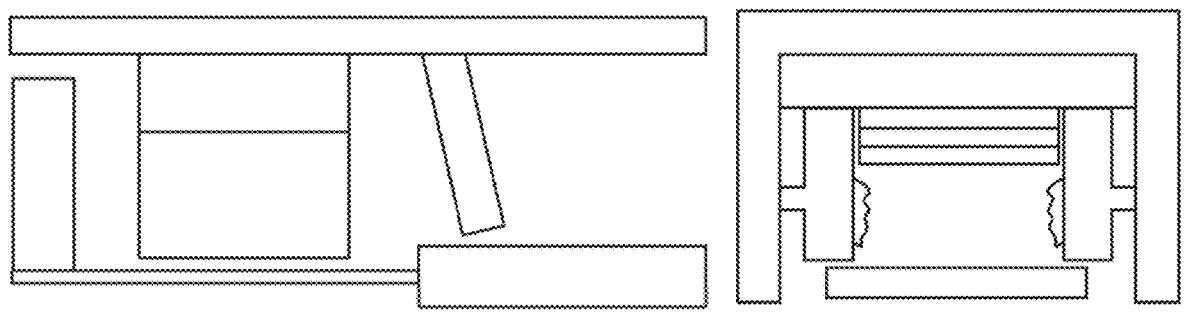
FIG. 43 shows a Nibbler End-Effector in accordance with an embodiment.

The second concept design shown in FIG. 43 uses an end mill cutting bit to remove the material from the ESPA ring 20. The end mill cutting bit will tend to jump off the cutting surface unless a positive engagement force is applied. Using the KRAKEN robotic arm to apply this force would require large joint torques because of the increasing distances away from the point of application of the force. Using a mechanical clamping engagement around the piece 80 being cut such that the clamping action pulls the rotating end mill into the piece 80 could produce this force with less effort. This action could be realized using teeth mounted on the side of the cutting tool that bite down and pull the tool into the material as like the holding teeth in FIG. 43. A skirt around the cutting section can be used to confine the material. To move the material into the material containment chamber, a sweeping mechanism or eddy-current motivation device could be used. This sweeping mechanism could remove the chips from the cutting area and pull them past the containment bristles into the material containment chamber. Similar strategies to determine the amount of material in the material containment chamber and deliver the material to the input chamber of the Refabricator-Plus 50 as identified in the first concept could be used.

Figure 44:
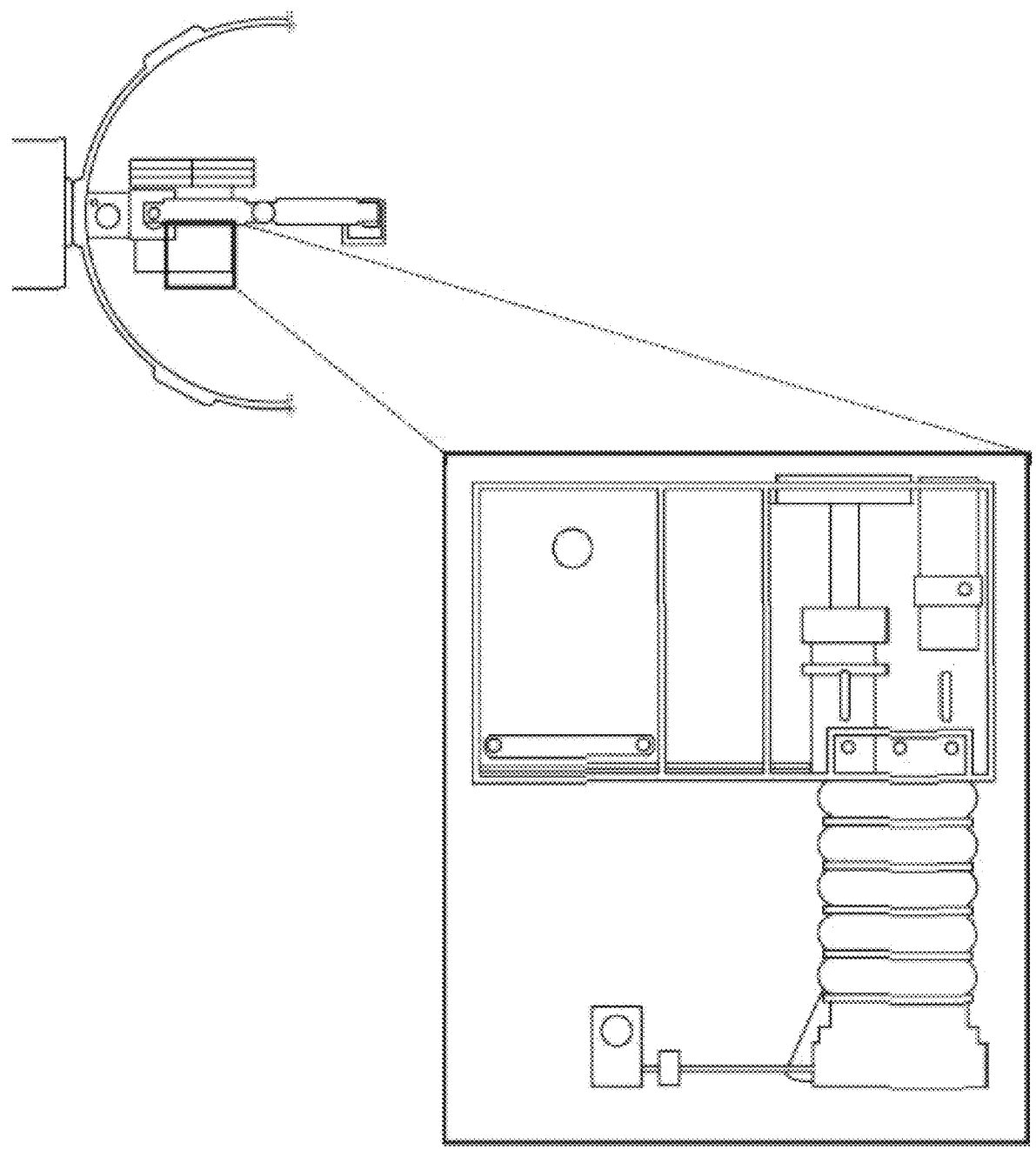
FIG. 44 shows a Refabricator-Plus in accordance with an embodiment.

Refabricator-Plus and Hexcaster A Refabricator-Plus 50 in accordance with an OrbWeaver embodiment extends a Refabricator's 3D printing and recycling capabilities beyond space-grade polymers to aluminum. In accordance with an embodiment, FIG. 44 shows a Refabricator-Plus 50 based on the configuration of the current Refabricator. The Refabricator-Plus 50 comprises an input chamber where the 350 g of aluminum chips 80 required to fabricate a hexagonal reflector section will be inserted. When these aluminum chips are inserted the melt chamber will be aligned with the input chamber. The piston inside the Nibbler end-effector 180 will then be used to push the aluminum chips 80 into the melt chamber. The melt chamber will then translate to be aligned with drive piston as shown by the configuration in FIG. 44. The piston in the Nibbler 180 end-effector will then be withdrawn from the input chamber and Nibbler end-effector 180 will return to dissecting the ESPA ring 20. With the melt chamber aligned with the drive piston and the 350 g of aluminum chips 80 in the melt chamber, the 433 kJ required to raise the temperature to 680° C. and melt the aluminum 80 will be supplied to the melt chamber. The molten aluminum will then be driven through ducting by the drive piston into the Hexcaster mold 60. This ducting will be heated with the rest of the melt chamber to ensure a steady flow rate of molten aluminum.

The improvements to a Refabricator that must be made to handle aluminum include: (1) determination and approach to prepare molten aluminum including separation of impurities, (2) designing the geometry of the melt chamber and drive piston to push all molten aluminum out of the chamber and into the mold and (3) identifying materials and coatings to eliminate adhesion and sticking of molten aluminum to the walls. The first improvement stems from the operations required to prepare molten aluminum for casting. Depending on the amount of impurities and type of aluminum, may be necessary to skim off slag, which contains the impurities, and add bonding additives to the molten aluminum.

Because of microgravity, in-space casting of aluminum is best performed through some form of injection or centrifugal process to create the necessary casting forces. In accordance with an embodiment, a Hexcaster mold 60 uses an injection process to form the hexagon shaped reflector section 70. A method to perform in-space injection molding could comprise one or more of the following steps:
  Control the pressure in the mold to prevent under-fill or under-pressure conditions.
  Control the cooling of the mold to prevent voids and defects in the molded part
  Apply a material or coating that allows effective release of the molded part.

Figure 45:
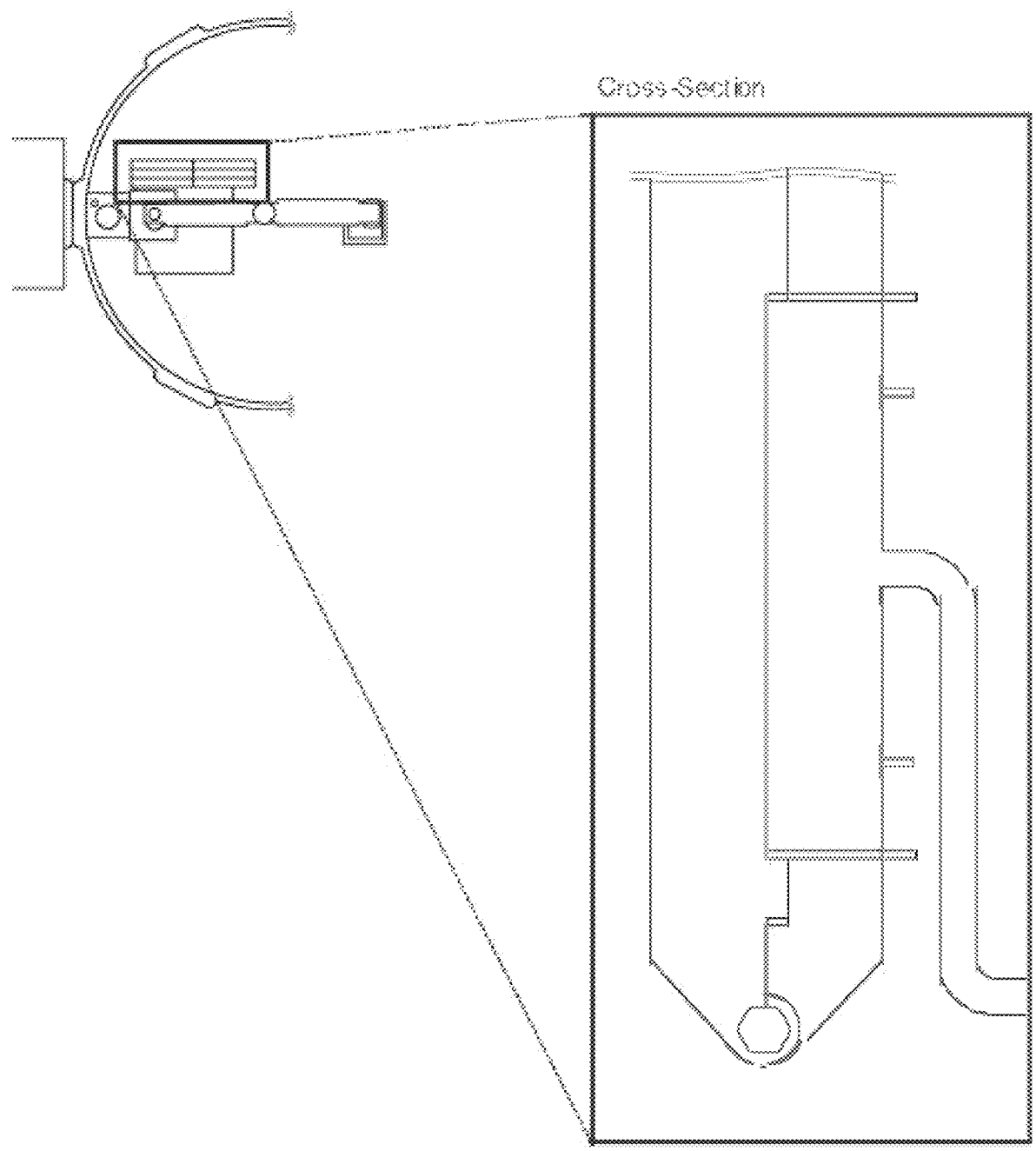
FIG. 45 shows a HexCaster in accordance with an embodiment.

An embodiment's Hexcaster mold 60 can comprise different materials and geometries as well as different closed-loop pressure and temperature control hardware. FIG. 45 shows a cross-section of one of an embodiment of a Hexcaster mold 60, wherein molten aluminum travels from the Refabricator-Plus 50 to the Hexcaster 60 through the ducting on the right and flows into the mold through the gate in the center. Backpressure from the drive pump in the melt chamber of the Refabricator-Plus 50 causes the molten aluminum to flow from the center of the hexagon out to the edges and up the flange volume as indicated by the blue section in FIG. 45. One of the benefits of this configuration is that the flash does not need to be removed prior to assembly of the hexagonal reflector section 70. This is because the flash is confined to flow parallel to tabs on the sides, as opposed to perpendicular as would be the case with a typical parting plane.

Self-Positioning and Orienting Tool (SPOT 160)

An embodiment's Self-Positioning and Orienting Tool (SPOT) 160 is used to precisely position two hexagonal reflector sections 70 and join them by welding their peripheral tab sections together as shown in FIG. 46. For effective reflector operation, less than 2 mm of variation over the 250 mm hexagon reflector section is required. This tolerance range does not require ultra-precision, but high precision should be employed to ensure that these tolerances are well met. Robotic arms 170, such as TUI's KRAKEN robotic arm 170, are well suited for tasks that are not well-bounded. That is, tasks that will change over time, require a large amount of dexterity, and/or are being performed in active environments that will change. When confronted with a well-bounded repetitive task that requires high precision, a robotic jig is generally favored over a robotic arm. Due to the large amount of symmetry in assembling the reflector from hexagonal sections and the required tolerances, the assembly process is a well-bounded repetitive task that requires high precision. SPOT 160, shown in FIG. 46, is a robotic jig designed to perform this well-bounded high precision task.

Figure 47:
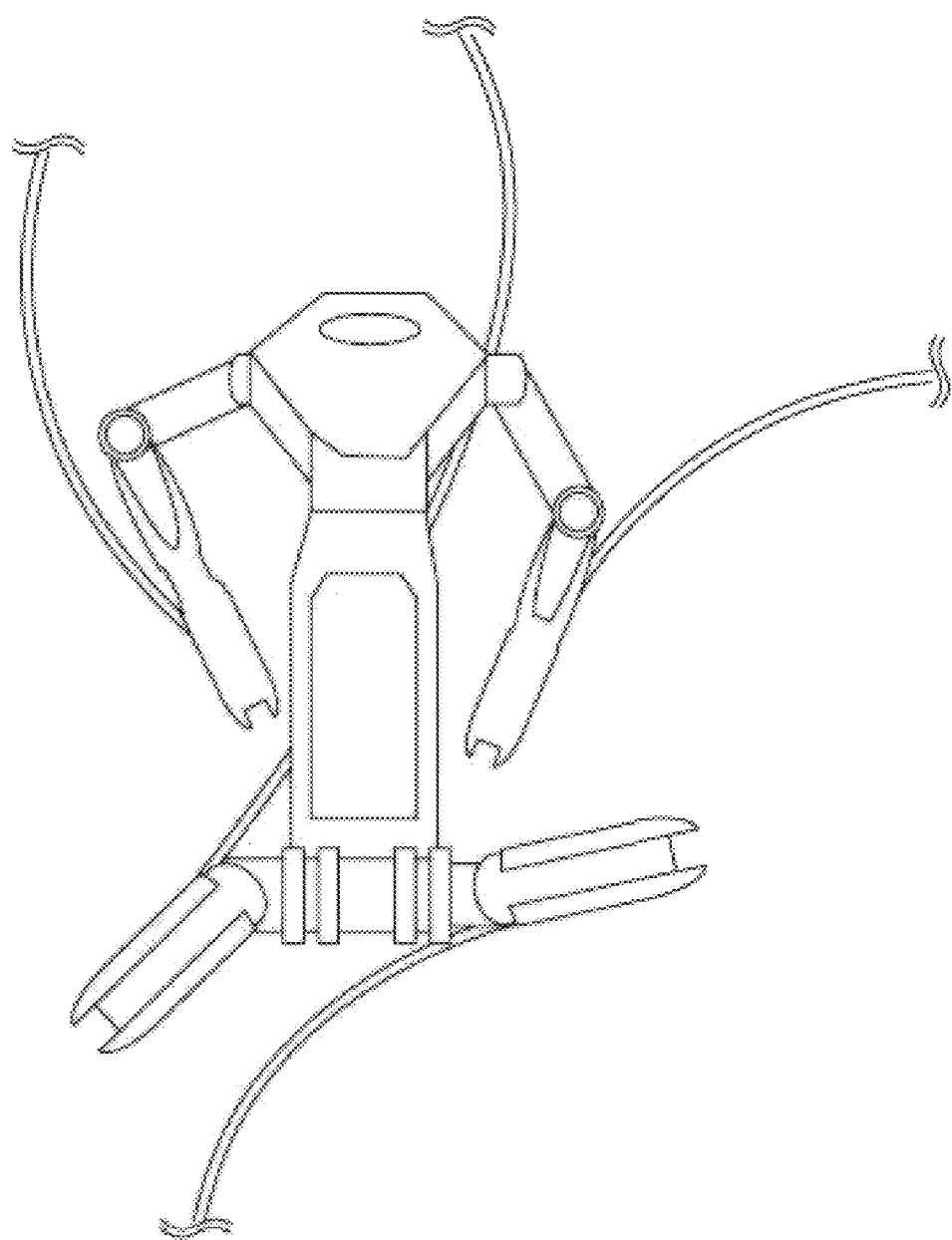
FIG. 47 shows a COBRA Gimbal in accordance with an embodiment.

As shown in FIG. 48, SPOT 160 comprises two positioning arms and a joining arm located between the positioning arms. Each positioning arm holds one of the two hexagonal sections that are going to be joined. The positioning arms each have three degrees-of-freedom (DoFs) in a rotation-rotation-prismatic (RRP) configuration. The first rotational DoF controls the roll of the arm, the second rotational DoF controls the pitch of the arm, and the prismatic DoF controls the vertical translation. The combination of these three DoFs of the positioning arms allow placement of the center of each hexagonal section rigidly in the appropriate position relative to each other. At the tip of each positioning arm is a TUI COBRA gimbal. TUI's COBRA gimbal, shown in FIG. 47 is an implementation of a carpal wrist mechanism that TUI developed for small satellite pointing applications. In a SPOT 160 in accordance with an embodiment, the COBRA gimbal is used to perform the precision manipulation of the hexagonal reflector's orientation around the center point positioned by the positioning arms three DoFs. At the tip of the COBRA gimbal is a grapple end effector 190 that is designed to grab a hexagonal reflector section 70 at its center grapple point.

In accordance with an embodiment a SPOT's joining arm welds two hexagonal reflector sections 70 after positioning. The joining arm also has three DoFs but in a rotation-prismatic-rotation (RPR) configuration. The first rotational DoF controls the pitch of the arm along the joining axis, the prismatic DoF controls the translational distance along the length of the arm, and the second rotational DoF controls the angle of the welding tool. The location and assignment of these joints allows the center joining arm to sweep down the desired weld line while keeping its welding mechanism perpendicular to the surface. An embodiment's welding tool can comprise a pinching spot welder. An embodiment's welding tool can also comprise a welding tool for a filling weld process, such as MIG or TIG welding. An embodiment's welding tool is mounted at the tip of the center joining arm.

In accordance with an embodiment, a method to join two hexagonal reflector sections 70 comprises steps wherein:
1. The three DoFs of the positioning arms are used to place the center points of the two hexagonal reflector sections 70 relative to the linear translation path of the center joining arm, while the sensor on the center joining arm (camera or LIDAR) is used to help alignment
2. The three DoFs of the COBRA gimbal are used to precisely orient hexagonal reflector sections 70 relative to each other, while the sensing system is used to assist in this alignment.
3. The three DoFs of the center joining arm are actuated to move the welding tool along the joining line of the hexagonal reflector sections 70, and while this actuation is taking place, the welding tool is performing it's welding operation and the sensing system is used to inspect the weld operation.

Because of the minimization of compliance in both the arms and joints of the robotic jig, knowledge of the position of one hexagon relative to the other is known with higher precision. This means that reliance on a vision-based sensing system for closed-loop control of the alignment is not imperative. This is a significant benefit because closed-loop control using vision-based sensing to align components without identification tags can be computationally expensive. An embodiment's SPOT sensing system will, in general, provide verification of alignment and welding operations but not significant dosed-loop sensing. The sensing system will comprise a combination of cameras and LIDAR sensors mounted on the base and welding tool.

Additionally, one of the benefits of using a robotic jig, which has well-bounded operation, compared to a robotic arm is that a robotic jig does not require complex mathematical transformations inverse kinematics with many DoFs. As seen from the sequence of control steps above, step 1 only requires the solution of a three DoF positioning problem, step 2 requires only the solution of a three DoF orientation problem, and step 3 can be a preprogrammed trajectory of a linear translation with constant orientation. An embodiment's COBRA gimbal provides the required inner-loop and kinematic control required in Step 2. An embodiment's KRAKEN robotic arm 170 provides inner-loop control of the two rotational DoFs in Step 1 and a large percentage of the sensing system.

The invention claimed is:

1. An apparatus for manufacture and in-space assembly of antennas comprising: a prefabricated primary reflector center section; a trusselator truss assembler; a phased feed array; wherein said prefabricated reflector center section, trusselator, and phased feed array are fixedly connected to one another; a self-positioning and orienting tool; a truss extending from said trusselator; a secondary reflector attached to said truss; robotic arms; a nibbler end effector mounted on one of said robotic arms; a grapple end effector mounted on one of said robotic arms; a mold for casting a piece of a primary reflector; a power cube; a solar array providing power to said power cube; a refabricator plus; and an ESPA ring.

* * * * *